(12) United States Patent
Durney

(10) Patent No.: US 7,534,501 B2
(45) Date of Patent: May 19, 2009

(54) PRECISION-FOLDED, HIGH STRENGTH, FATIGUE-RESISTANT STRUCTURES AND SHEET THEREFOR

(75) Inventor: Max W. Durney, San Francisco, CA (US)

(73) Assignee: Industrial Origami, Inc., San Francisco, CA (US)

( * ) Notice: Subject to any disclaimer, the term of this patent is extended or adjusted under 35 U.S.C. 154(b) by 0 days.

(21) Appl. No.: 11/384,216

(22) Filed: Mar. 16, 2006

(65) Prior Publication Data

US 2006/0207212 A1    Sep. 21, 2006

Related U.S. Application Data

(63) Continuation-in-part of application No. 10/672,766, filed on Sep. 26, 2003, now Pat. No. 7,152,449, which is a continuation-in-part of application No. 10/256,870, filed on Sep. 26, 2002, now Pat. No. 6,877,349, which is a continuation-in-part of application No. 09/640,267, filed on Aug. 17, 2000, now Pat. No. 6,481,259.

(60) Provisional application No. 60/663,392, filed on Mar. 17, 2005.

(51) Int. Cl.
*B21D 28/00* (2006.01)
*B32B 3/24* (2006.01)

(52) U.S. Cl. .......................... 428/596; 428/597; 428/43; 428/122; 428/130; 428/136; 72/324; 72/379.2

(58) Field of Classification Search ........................ None
See application file for complete search history.

(56) References Cited

U.S. PATENT DOCUMENTS 975,121 A    11/1910    Carter (Continued)

FOREIGN PATENT DOCUMENTS

DE    298 18 909 U1    2/1999

(Continued)

OTHER PUBLICATIONS

Derwent Abstract Accession No. 1995-280162/37, M21, JP 3474242, Dec. 8, 2003 (Amada Co Ltd).

(Continued)

*Primary Examiner*—John J Zimmerman
(74) *Attorney, Agent, or Firm*—Morgan, Lewis & Bockius LLP; David J. Brezner; Victor E. Johnson

(57) ABSTRACT

Precision-folded, high strength, fatigue-resistant structures and a sheet therefore are disclosed. To form the structures, methods for precision bending of a sheet of material along a bend line and a sheet of material formed with bending strap-defining structures, such as slits or grooves, are disclosed. Methods include steps of designing and then separately forming longitudinally extending slits or grooves through the sheet of material in axially spaced relation to produce precise bending of the sheet when bent along the bend line. The bending straps have a configuration and orientation which increases their strength and fatigue resistance, and most preferably slits or arcs are used which causes edges to be engaged and supported on faces of the sheet material on opposite sides of the slits or arcs. The edge-to-face contact produces bending along a virtual fulcrum position in superimposed relation to the bend line. Several slit embodiments suitable for producing edge-to-face engagement support and precise bending are disclosed. With these teachings, forming numerous three-dimensional load-bearing structures from a two dimensional sheet are enabled. Examples of straight and curved beams, chassis, and exoskeletons are disclosed.

28 Claims, 50 Drawing Sheets

U.S. PATENT DOCUMENTS

| | | | |
|---|---|---|---|
| 1,295,769 A | | 2/1919 | Kux |
| 1,405,042 A | | 1/1922 | Kraft |
| 1,698,891 A | | 1/1929 | Overbury |
| 2,127,618 A | | 8/1938 | Riemenschneider |
| 2,480,034 A | * | 8/1949 | Lapp .......................... 285/333 |
| 2,560,786 A | | 7/1951 | Wright et al. |
| 3,039,414 A | * | 6/1962 | Rosanes .................. 29/897.35 |
| 3,258,380 A | | 6/1966 | Fischer et al. |
| 3,341,395 A | | 9/1967 | Weber |
| 3,353,639 A | | 11/1967 | Andriussi |
| 3,361,320 A | * | 1/1968 | Bobrowski ................. 228/17.5 |
| 3,538,982 A | * | 11/1970 | Fiori ............................. 165/7 |
| 3,756,499 A | | 9/1973 | Giebel et al. |
| 3,779,282 A | * | 12/1973 | Klees .................... 137/625.46 |
| 3,788,934 A | | 1/1974 | Coppa |
| 3,854,859 A | | 12/1974 | Sola |
| 3,882,653 A | * | 5/1975 | Ollman ......................... 52/694 |
| 3,938,657 A | | 2/1976 | David |
| 3,963,170 A | | 6/1976 | Wood |
| 4,004,334 A | * | 1/1977 | Greenley ..................... 29/897 |
| 4,058,813 A | * | 11/1977 | Risko ......................... 343/786 |
| 4,166,565 A | * | 9/1979 | Webinger .................. 229/120 |
| 4,215,194 A | | 7/1980 | Sheperd |
| 4,289,290 A | | 9/1981 | Miller |
| 4,559,259 A | | 12/1985 | Cetrelli |
| 4,628,661 A | | 12/1986 | St. Louis |
| 4,837,066 A | | 6/1989 | Quinn et al. |
| 5,148,900 A | | 9/1992 | Mohan |
| 5,157,852 A | | 10/1992 | Patrou et al. |
| 5,225,799 A | | 7/1993 | West et al. |
| 5,239,741 A | | 8/1993 | Shamos |
| 5,390,782 A | | 2/1995 | Sinn |
| 5,524,396 A | | 6/1996 | Lalvani |
| 5,568,680 A | | 10/1996 | Parker |
| 5,692,672 A | | 12/1997 | Hunt |
| 5,701,780 A | | 12/1997 | Ver Meer |
| 5,709,913 A | | 1/1998 | Andersen et al. |
| 5,789,050 A | | 8/1998 | Kang |
| 5,885,676 A | | 3/1999 | Lobo et al. |
| 6,132,349 A | | 10/2000 | Yokoyama |
| 6,210,037 B1 | | 4/2001 | Brandon, Jr. |
| 6,412,325 B1 | | 7/2002 | Croswell |
| 6,481,259 B1 | | 11/2002 | Durney |
| 6,599,601 B2 | | 7/2003 | Fogle et al. |
| 6,640,605 B2 | | 11/2003 | Gitlin et al. |
| 6,643,561 B1 | | 11/2003 | Torvinen |
| 6,658,316 B1 | | 12/2003 | Mehta et al. |
| 6,837,334 B1 | * | 1/2005 | Le Prevost .................. 181/177 |
| 6,877,349 B2 | | 4/2005 | Durney et al. |
| 7,032,426 B2 | | 4/2006 | Durney et al. |
| 7,152,449 B2 | | 12/2006 | Durney et al. |
| 7,152,450 B2 | | 12/2006 | Durney et al. |
| 7,374,810 B2 | | 5/2008 | Durney et al. |
| 2001/0010167 A1 | | 8/2001 | Leek |
| 2002/0184936 A1 | | 12/2002 | Gitlin et al. |
| 2003/0037586 A1 | | 2/2003 | Durney et al. |
| 2004/0134250 A1 | | 7/2004 | Durney et al. |
| 2004/0206152 A1 | | 10/2004 | Durney et al. |
| 2005/0005670 A1 | | 1/2005 | Durney et al. |
| 2005/0061049 A1 | | 3/2005 | Durney et al. |
| 2005/0064138 A1 | | 3/2005 | Durney et al. |
| 2005/0097937 A1 | | 5/2005 | Durney et al. |
| 2005/0126110 A1 | | 6/2005 | Durney et al. |

FOREIGN PATENT DOCUMENTS

| | | |
|---|---|---|
| GB | 2 129 339 A | 5/1984 |
| JP | 52-068848 | 6/1977 |
| JP | 53-070069 | 6/1978 |
| JP | 55-022468 | 2/1980 |
| JP | 55-055222 | 4/1980 |
| JP | 59-006116 | 1/1984 |
| JP | 02-065416 U | 5/1990 |
| JP | 02-165817 | 6/1990 |
| JP | 02-192821 | 7/1990 |
| JP | 02-258116 | 10/1990 |
| JP | 04-033723 | 2/1992 |
| JP | 04-091822 | 3/1992 |
| JP | 05-261442 | 10/1993 |
| JP | 07-148528 | 6/1995 |
| JP | 08-224619 | 9/1996 |
| JP | 10-085837 | 4/1998 |
| JP | 11-123458 | 5/1999 |
| JP | 11-188426 | 7/1999 |
| WO | WO 97/24221 A1 | 7/1997 |
| WO | WO 02/13991 A1 | 2/2002 |
| WO | WO 2004/028937 A2 * | 4/2004 |

OTHER PUBLICATIONS

Derwent Abstract Accession No. 80-C6243C/12, FR2428372 A, Feb. 8, 1980 (Merlin & Gerin).

Derwent Abstract Accession No. 83-G2401K/19, FR2514103 A, Apr. 8, 1983 (Grun).

Derwent Abstract Accession No. 97-345802/32, P52, JP 9 141333 A, Jun. 3, 1997 (Kokusai Denki KK).

Derwent Abstract Accession No. 99-062297/06, DE 29818909 U, Dec. 24, 1998 (Fortmeier).

*EasyBend™—Complex Bending Made Easy*, © 2004 Mate Precision Tooling Inc., Anoka, Minnesota.

Patent Abstracts of Japan, vol. 004, No. 053 (M-008), Apr. 19, 1980 (JP 55-022468 A).

Patent Abstracts of Japan, vol. 015, No. 006 (M-1066), Jan. 8, 1991 (JP 02-258116 A).

Publication "Office dA" by Contemporary World Architects, 2000, pp. 15, 20-35, Rockport Publishers, Inc., Gloucester, Massachusetts.

\* cited by examiner

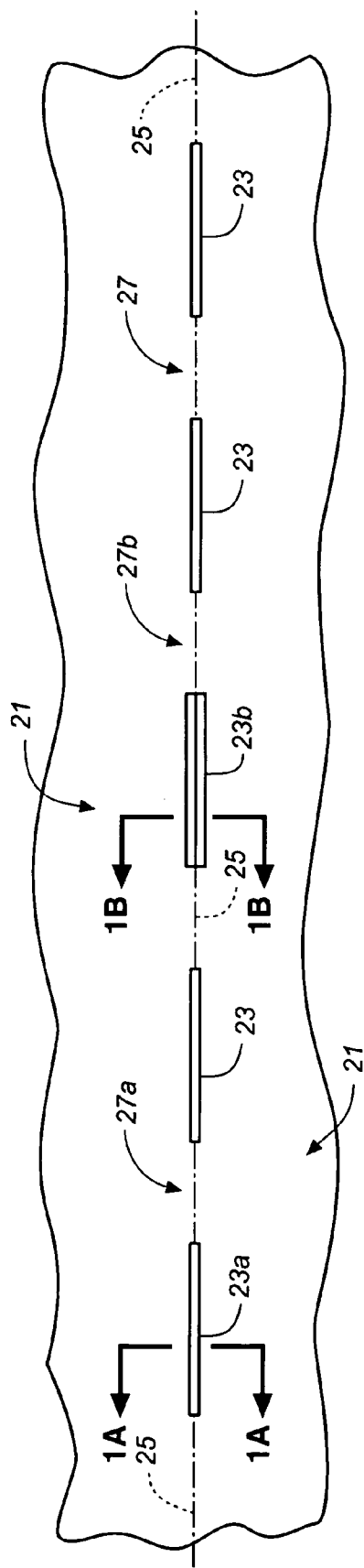
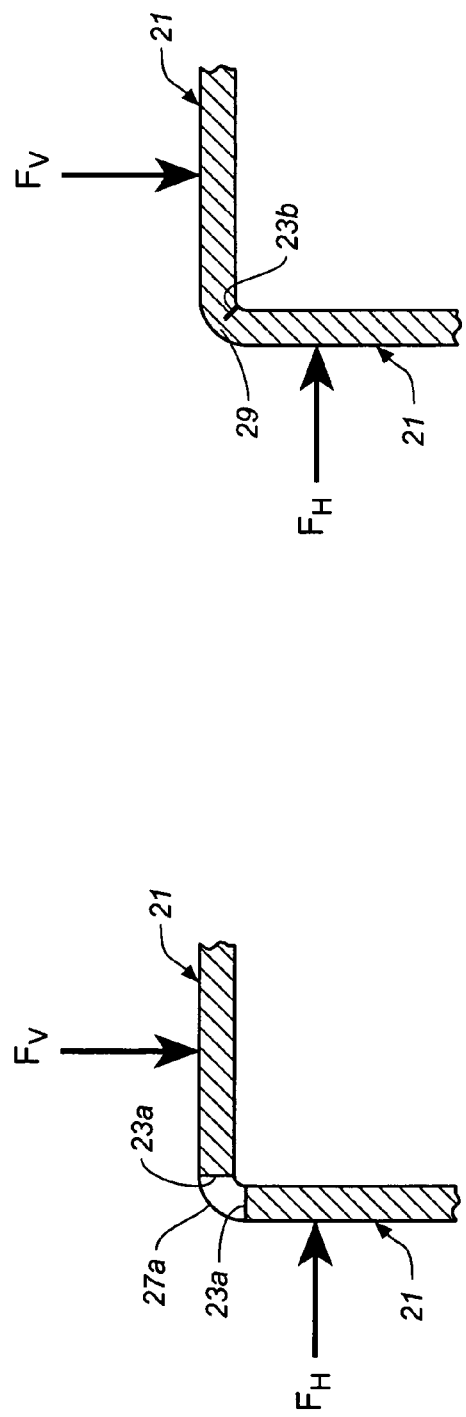
FIG. 1 (PRIOR ART)
FIG. 1A (PRIOR ART)
FIG. 1B (PRIOR ART)

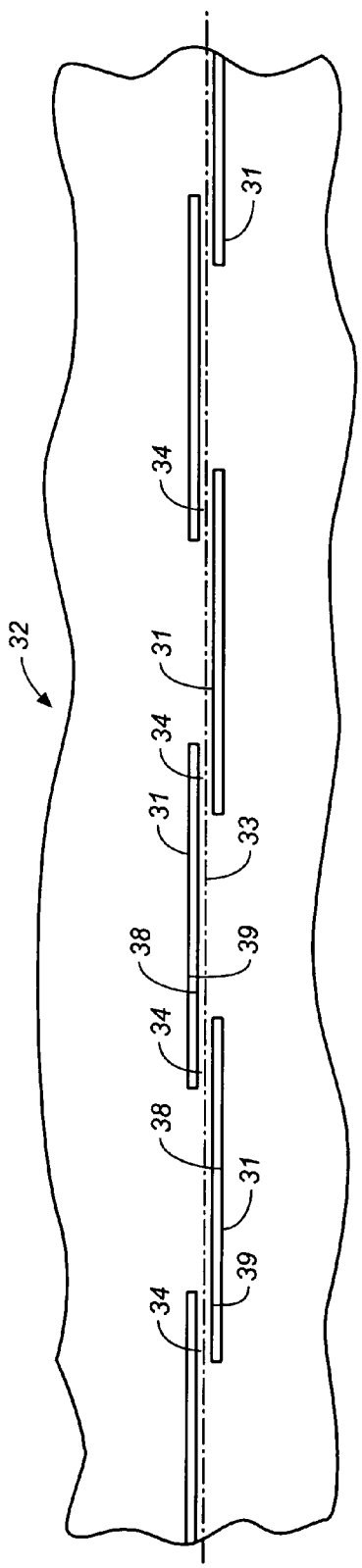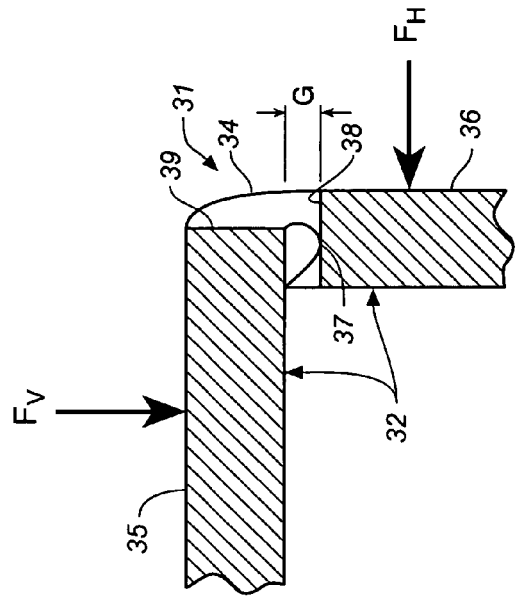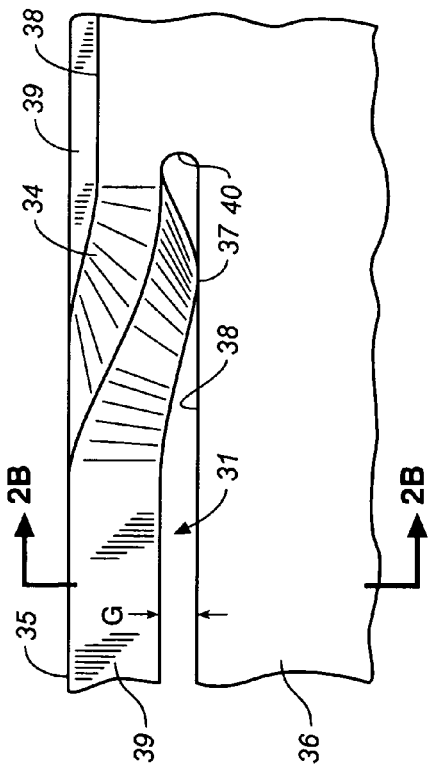
FIG. 2 (PRIOR ART)
FIG. 2A (PRIOR ART)
FIG. 2B (PRIOR ART)

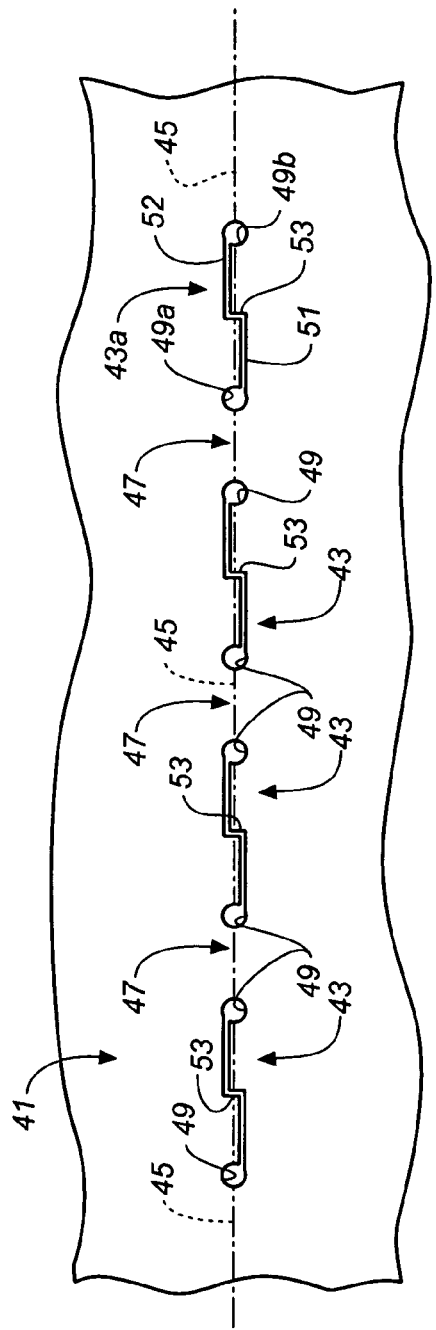
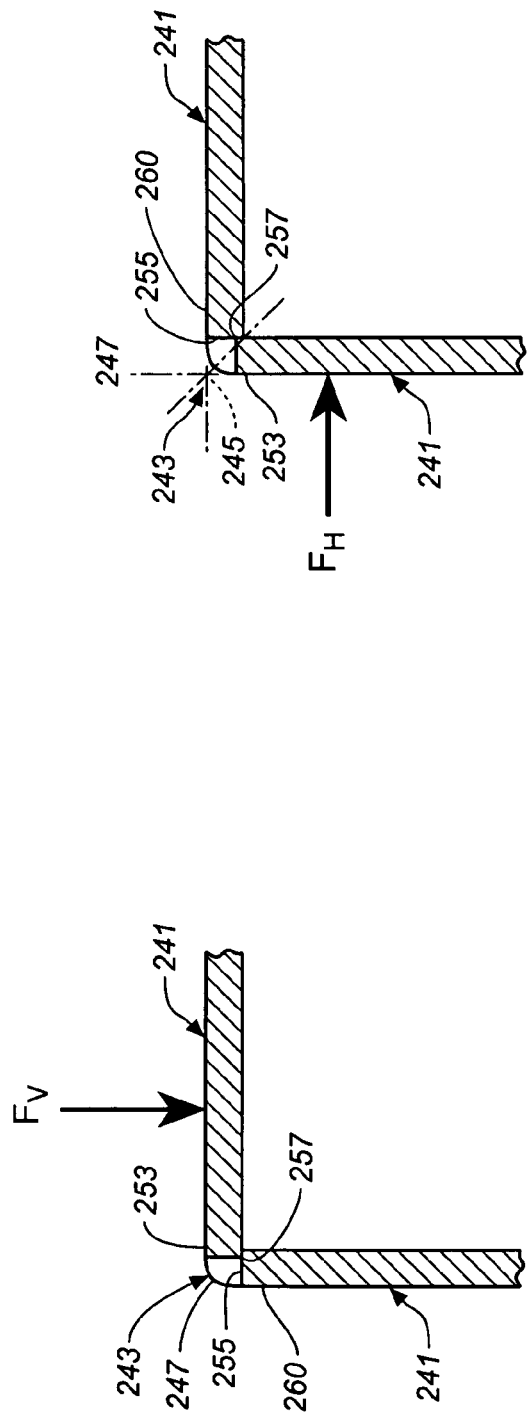

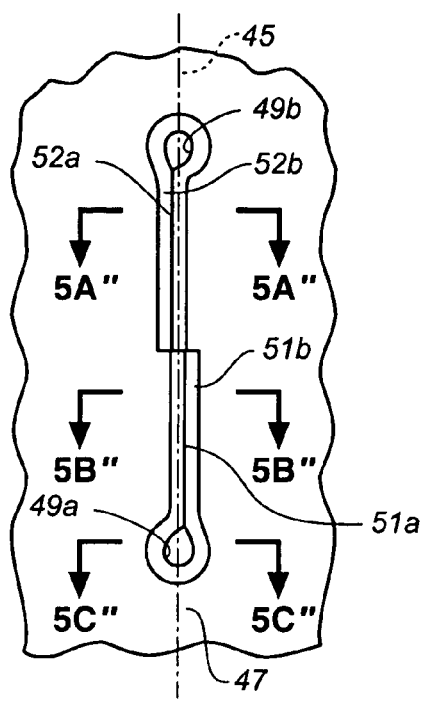
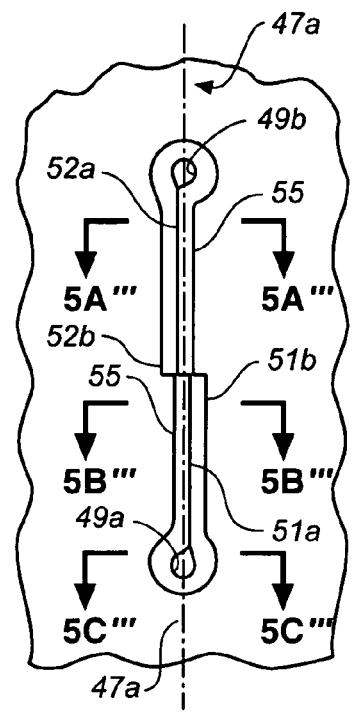
FIG. 4C  FIG. 4D
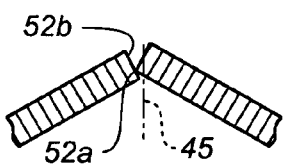
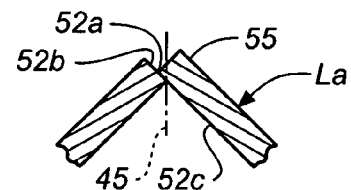
FIG. 5A″  FIG. 5A‴
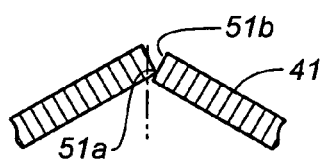
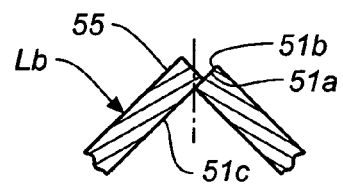
FIG. 5B″  FIG. 5B‴
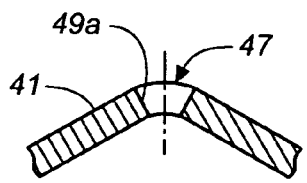
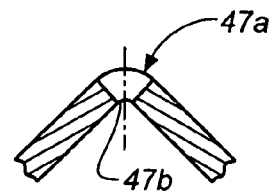
FIG. 5C″  FIG. 5C‴

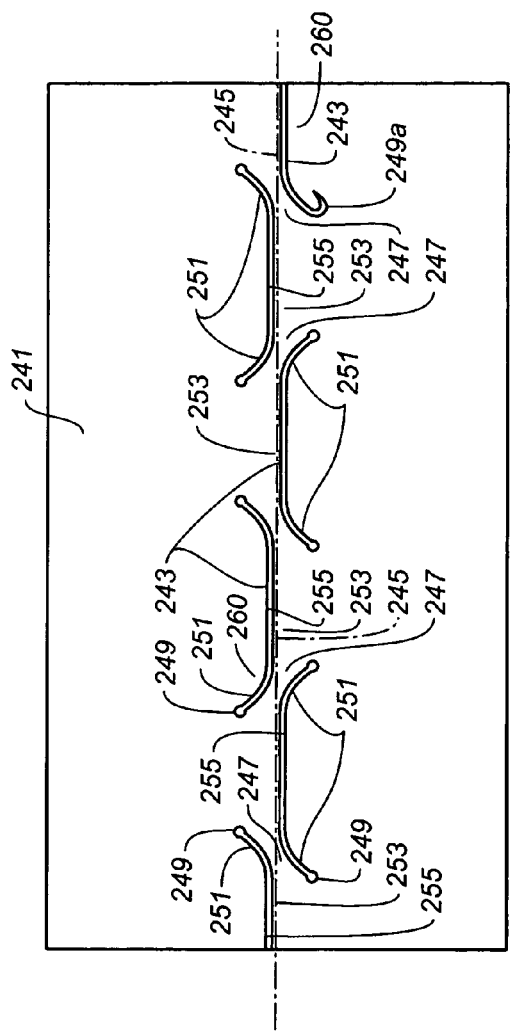
FIG. 6
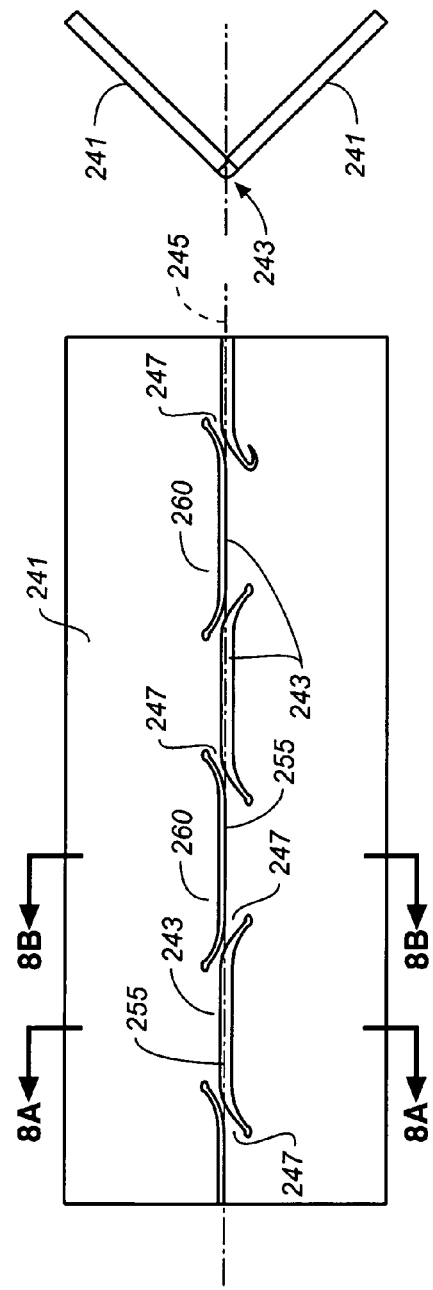
FIG. 7
FIG. 8

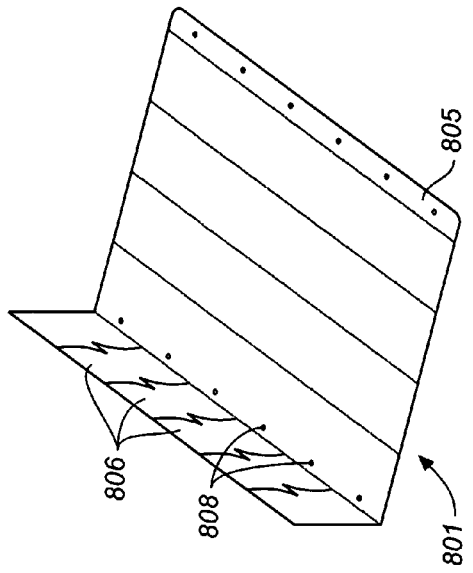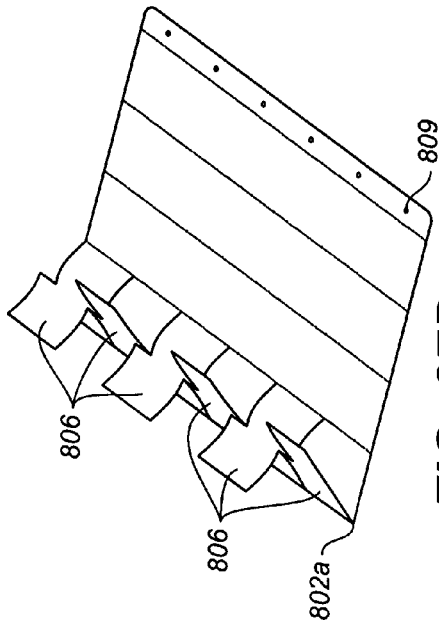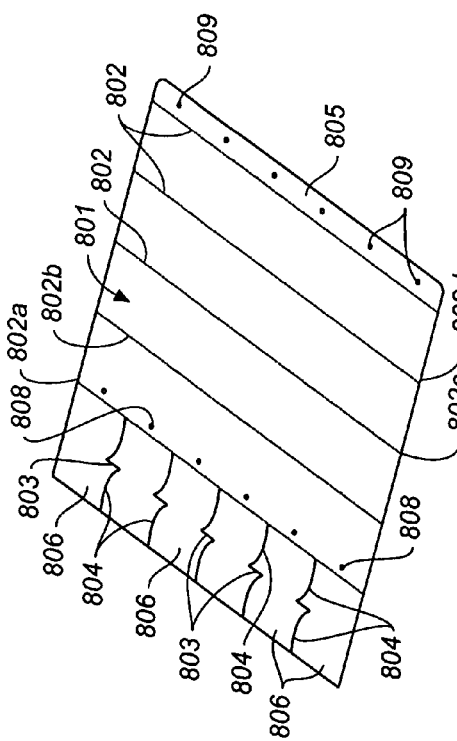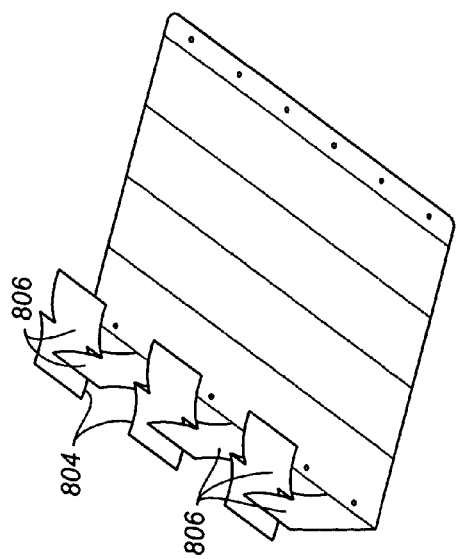
FIG. 27A
FIG. 27B
FIG. 27C
FIG. 27D

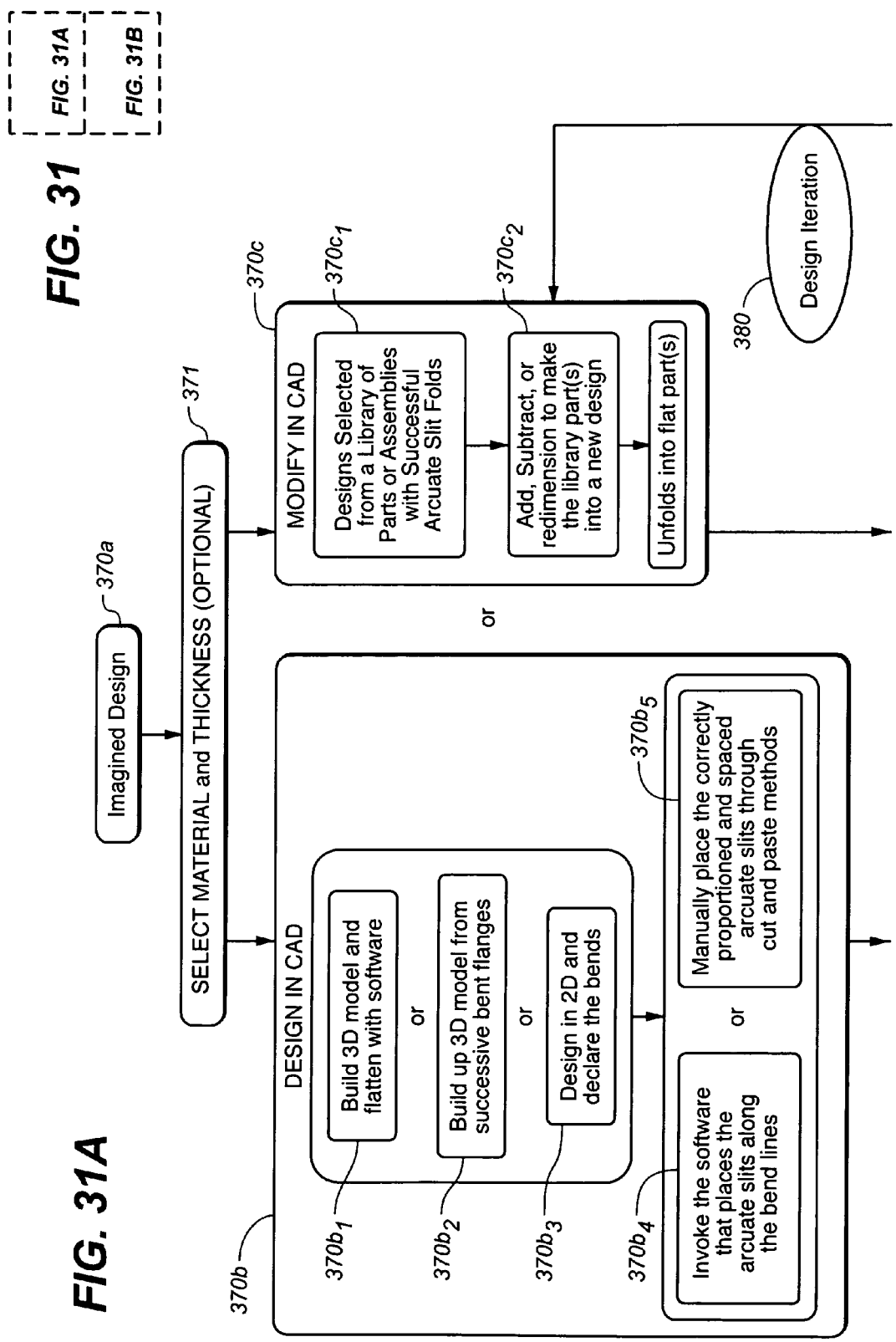

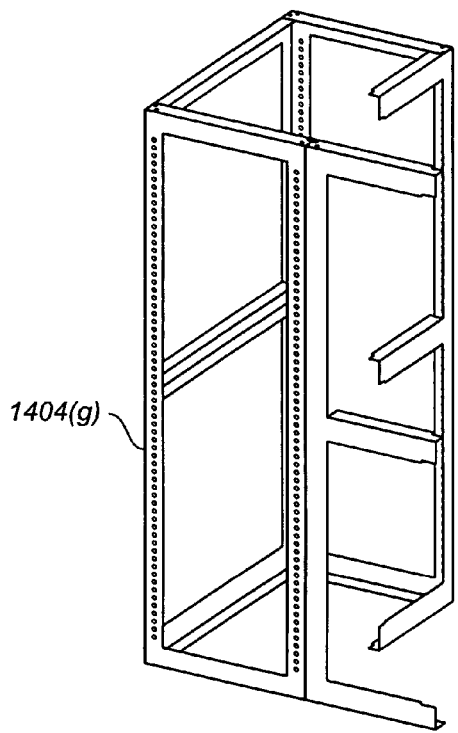 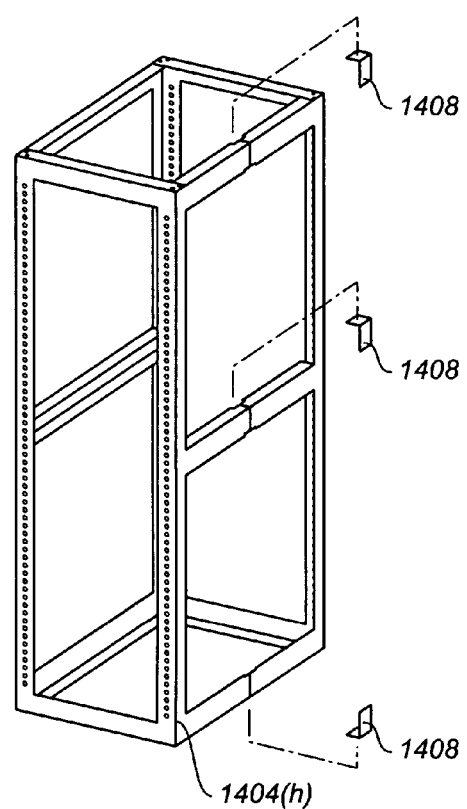
FIG. 40G  FIG. 40H

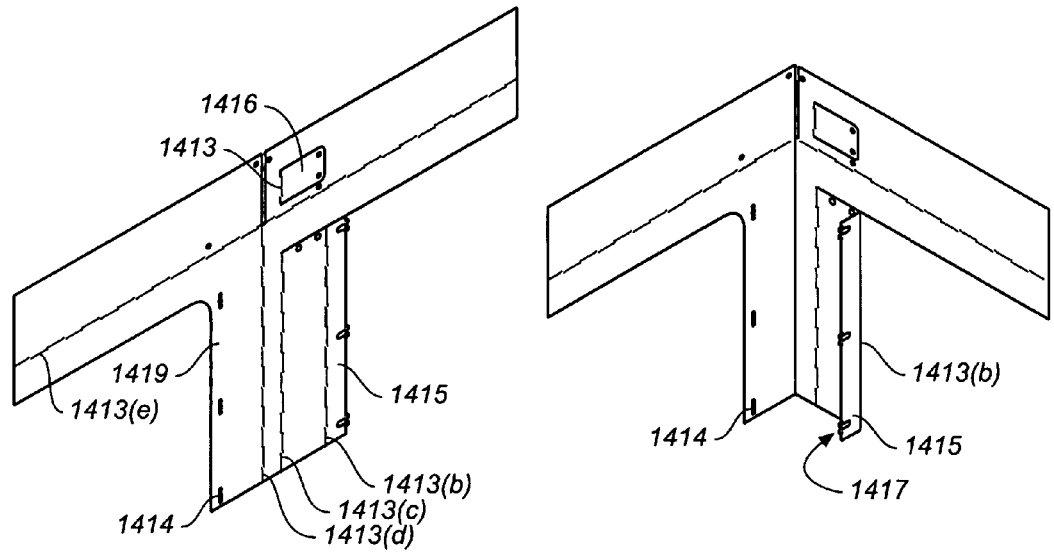
FIG. 41A  FIG. 41B
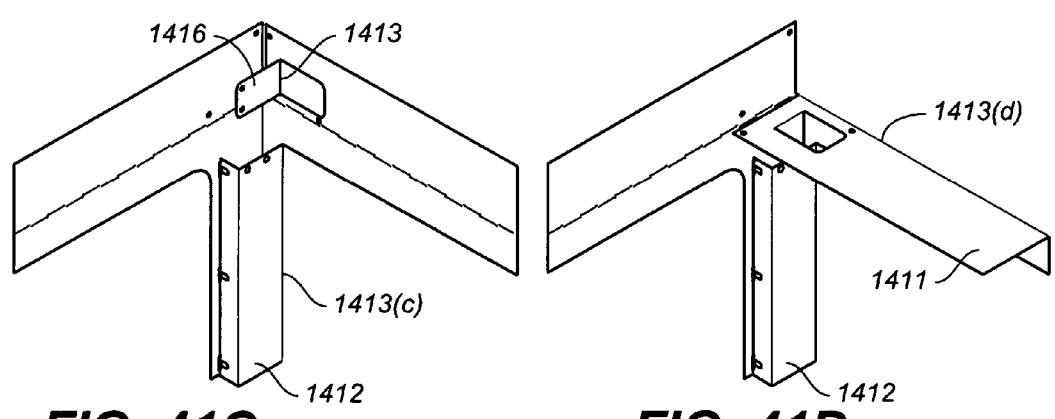
FIG. 41C  FIG. 41D
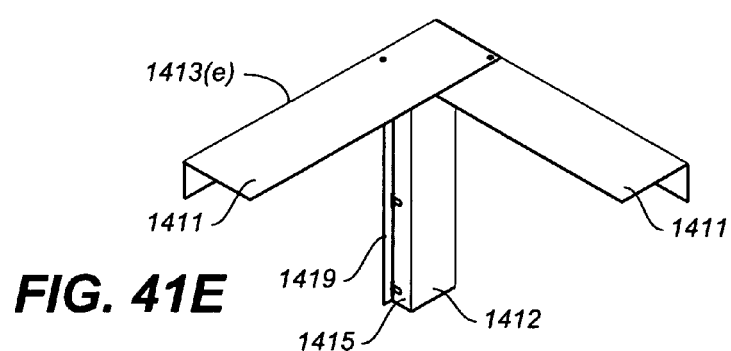
FIG. 41E

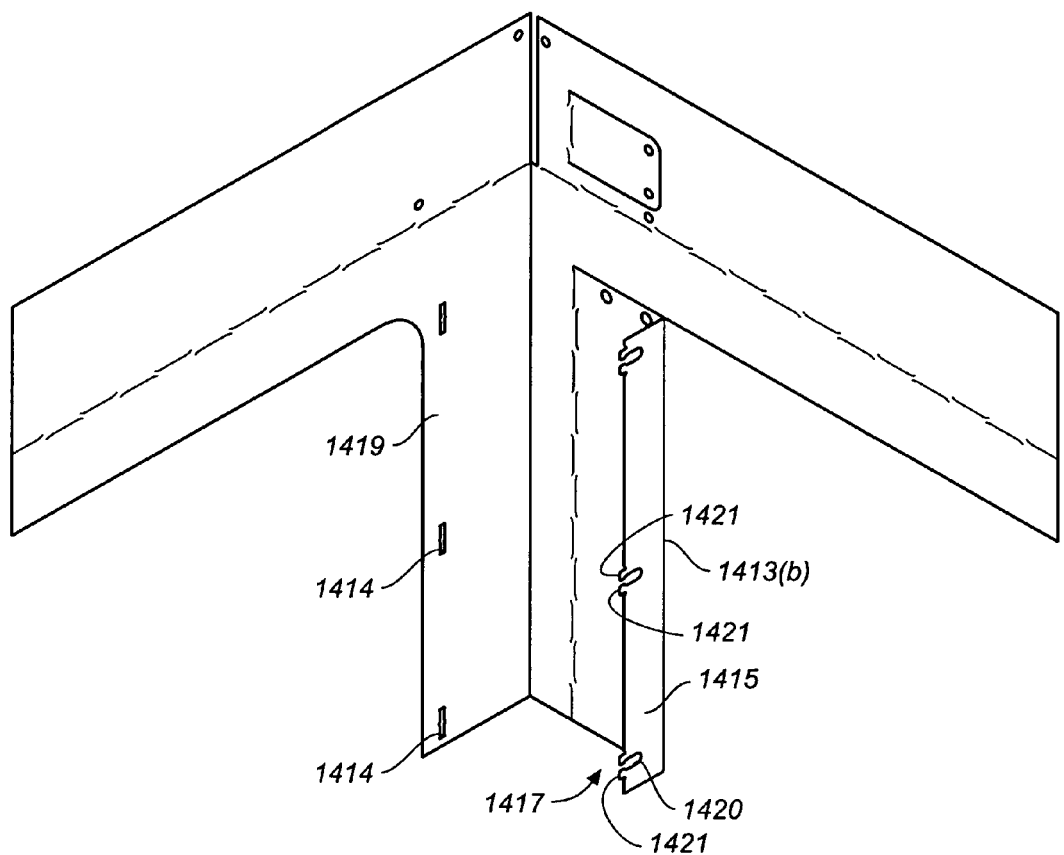
FIG. 42A
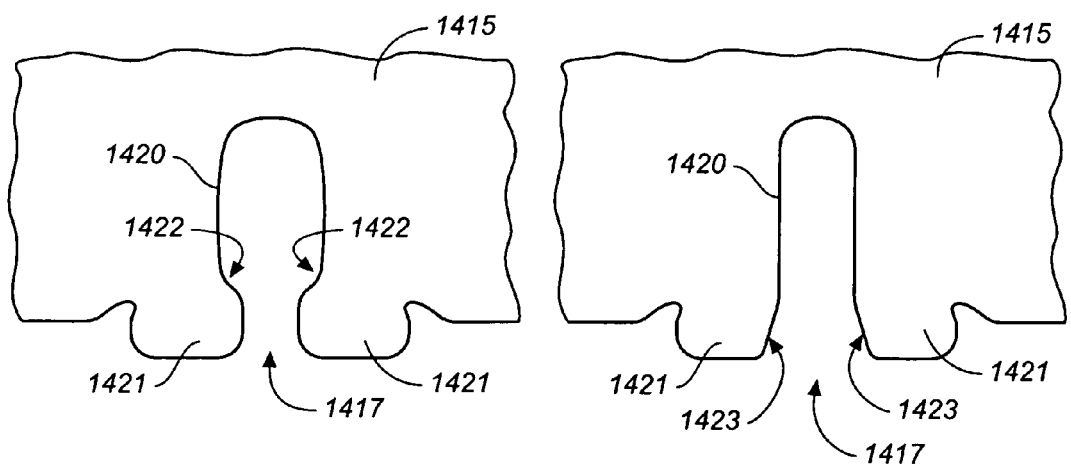
FIG. 42B          FIG. 42C

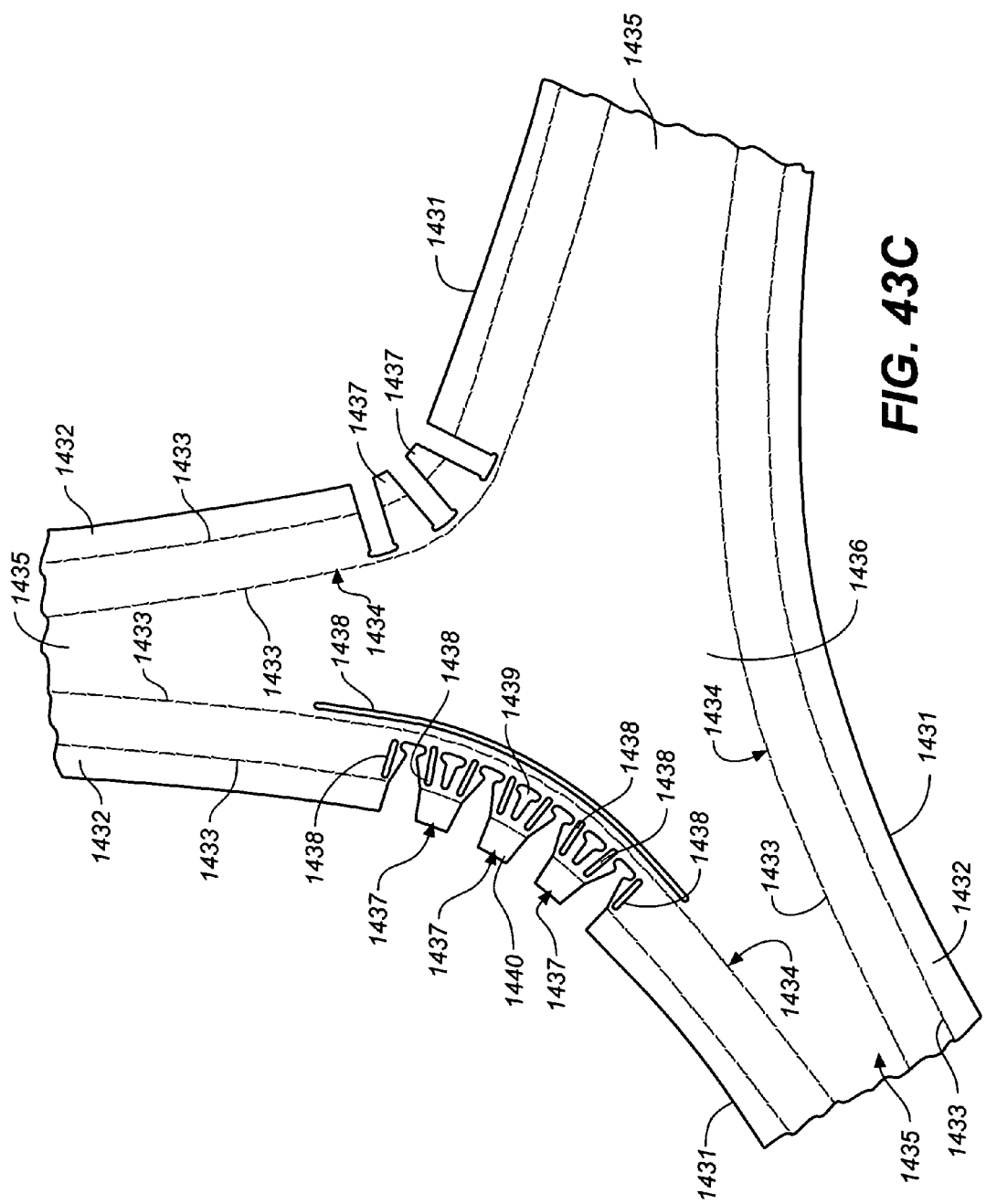

PRECISION-FOLDED, HIGH STRENGTH, FATIGUE-RESISTANT STRUCTURES AND SHEET THEREFOR

CROSS-REFERENCES TO RELATED APPLICATIONS

This application is a Continuation-in-Part of U.S. patent application Ser. No. 10/672,766, filed Sep. 26, 2003, and entitled TECHNIQUES FOR DESIGNING AND MANUFACTURING PRECISION-FOLDED, HIGH STRENGTH FATIGUE RESISTANT STRUCTURES AND SHEET THEREFOR, now U.S. Pat. No. 7,152,449 B2, which is a Continuation-in-Part of U.S. patent application Ser. No. 10/256,870, filed Sep. 26, 2002, and entitled METHOD FOR PRECISION BENDING OF SHEET OF MATERIALS, SLIT SHEETS FABRICATION PROCESS, now U.S. Pat. No. 6,877,349 B2, which is a Continuation-in-Part of U.S. patent application Ser. No. 09/640,267, filed Aug. 17, 2000, and entitled METHOD FOR PRECISION BENDING OF A SHEET OF MATERIAL AND SLIT SHEET THEREFOR, now U.S. Pat. No. 6,481,259 B1. All applications, above, are incorporated herein by reference in their entirety.

This application also claims the benefit of U.S. Provisional Patent Application No. 60/663,392, filed Mar. 17, 2005, and entitled PRECISION-FOLDED, HIGH STRENGTH, FATIGUE-RESISTANT STRUCTURES AND SHEET THEREFOR, the entire contents of which is incorporated herein by this reference.

BACKGROUND OF THE INVENTION

1. Technical Field

The present invention relates, in general, to the designing and precision folding of sheets of material and the manufacture of structures therefrom. More particularly, the present invention relates to processes of designing, preparing and manufacturing, including, but not limited to, ways of preparing sheet material, in order to enable precision folding and to the use of such processes for rapid two-dimension-to-three-dimensional folding of high strength, fatigue-resistant structures or assemblies.

2. Description of Related Art

A commonly encountered problem in connection with bending sheet material is that the locations of the bends are difficult to control because of bending tolerance variations and the accumulation of tolerance errors. For example, in the formation of the housings for electronic equipment, sheet metal is bent along a first bend line within certain tolerances. The second bend, however, often is positioned based upon the first bend, and accordingly, the tolerance errors can accumulate. Since there can be three or more bends which are involved to create the chassis or enclosure for the electronic components, the effect of cumulative tolerance errors in bending can be significant. Moreover, the tolerances that are achievable will vary widely depending on the bending equipment, and its tooling, as well as the skill of the operator.

One approach to this problem has been to try to control the location of bends in sheet material through the use of slitting or grooving. Slits and grooves can be formed in sheet stock very precisely, for example, by the use of computer numerically controlled (CNC) devices which control a slit or groove forming apparatus, such as a laser, water jet, punch press, knife or other tool.

Referring to FIG. 1, a sheet of material 21 is shown which has a plurality of slits or grooves 23 aligned in end-to-end, spaced apart relation along a proposed bend line 25. Between pairs of longitudinally adjacent slits or grooves are bending webs, splines or straps 27 which will be plastically deformed upon bending of sheet 21. Webs 27 hold the sheet together as a single member. When grooves that do not penetrate through sheet 21 are employed, the sheet of material is also held together by the web of material behind each groove.

The location of grooves or slits 23 in sheet 21 can be precisely controlled so as to position the grooves or slits on bend line 25 within relatively close tolerances. Accordingly, when sheet 21 is bent after the grooving or slitting process, the bend occurs at a position that is very close to bend line 25. Since slits can be laid out on a flat sheet of material precisely, the cumulative error is much less in such a bending process, as compared to one in which bends are formed by a press brake, with each subsequent bend being positioned by reference to the preceding bend.

Nevertheless, even a grooving-based or slitting-based bending of sheet material has its problems. First, the stresses in bending webs or straps 27, as a result of plastic deformation of the webs and slitting at both ends of webs 27, are substantial and concentrated. For grooving, the stresses on the material behind or on the back side of the groove also are substantial and very concentrated. Thus, failures at webs 27 and/or behind grooves 23 can occur. Moreover, the grooves or slits do not necessarily produce bending of webs 27 directly along bend line 25, and the grooving process is slow and inconsistent, particularly when milling or point cutting V-shaped grooves. Grooving, therefore, is not in widespread commercial use.

As can be seen in FIGS. 1A and 1B, if sheet 21 is slit, as is shown at 23a and/or grooved, as shown at 23b, and then bent, bending webs 27a and 27b will experience plastic deformation and residual stress. For slit 23a, of course, material will be completely removed or severed along the length of the slit. For V-shaped groove 23b, there will be a thin web 29 between groove 23b and the convex outside of the bend, but it also will be plastically deformed and highly stressed. The bend for V-shaped grooving will normally be in a direction closing groove 23b so that the side faces come together, as shown in FIG. 1B. Loading of the bent structure of FIGS. 1A and 1B with a vertical force $F_v$ and/or a horizontal force $F_H$ will place the bend, with the weakening slits and/or grooves and the plastically deformed straps or webs 27a, 27b, as well as thin web 29, under considerable stress. Failure of the structure will occur at lower force levels than if a non-slitting or non-grooving bending process was used.

Another scheme for sheet slitting to facilitate bending has been employed in the prior art. The slitting technique employed to produce bends, however, was designed primarily to produce visual or decorative effects for a sculptural application. The visual result has been described as "stitching," and the bends themselves have been structurally reinforced by beams. This stitched sculpture was exhibited at the New York Museum of Modern Art by at least 1998, and the sheet slitting technique is described in Published United States Patent Application U.S. 2002/0184936 A1, published on Dec. 12, 2002, (the "Gitlin, et al Application."). The sculpture is also shown and described in the publication entitled "Office dA" by Contemporary World Architects, pp. 15, 20-35, 2000. FIGS. 2, 2A and 2B of the present drawing show one example of the stitching technique employed.

One embodiment of the Office dA or Gitlin, et al. Application is shown in FIG. 2. A plurality of slits 31 is formed in a sheet material 32. Slits 31 are linear and offset laterally of each other along opposite sides of a bend line 33. The slits can be seen to longitudinally overlap so as to define what will become bending splines, webs, straps or "stitches" 34 between the overlapped slit ends. FIGS. 2A and 2B show an enlarged side elevation view of one end of one slit in sheet 32, which has been bent along bend line 33 by 90 degrees, and sheet portions 35 and 36 on opposite sides of the bend line are interconnected by the twisted straps or "stitches" 34, which twist or stitch between the 90 degree sheet portions 35,36. The architects of the New York Museum of Modern Art sculpture recognized that the resulting bend is not structurally very strong, and they have incorporated partially hidden beams welded into the sculpture in the inner vertices of each of the stitched bends.

Since slits 31 are parallel to bend line 33, straps 34, which also have a constant or uniform width dimension, are twisted or plastically deformed in torsion over their length, with the result that at the end of a 90° bend a back side of the strap engages face 38 on the other side of slit 31 at position 37. Such engagement lifts sheet portion 35 up away from face 38 on sheet portion 36, as well as trying to open end 40 of the slit and producing further stress at the slit end. The result of the twisting of straps 34 and the lifting at the end of the bend is a gap, G, over the length of slit 31 between sheet portion 35 and face 38. Twisted straps or stitches 34 force sheet portion 35 off of face 38 and stress both slit ends 40 (only one slit end 40 is shown but the same stress would occur at the other slit end 40 of the slip 31 shown in FIGS. 2A and 2B).

Gaps G are produced at each slit 31 along the length of bend line 33 on alternative sides of the bend line. Thus, at each slit a sheet portion is forced away from contact with a slit-defining face instead of being pulled into contact with, and thus full support by, the face.

Moreover, and very importantly, the slitting configuration of FIG. 2 stresses each of straps 34 to a very high degree. As the strap length is increased (the length of overlap between the ends of slits 31) to attempt to reduce the stress from twisting along the strap length, the force trying to resiliently pull or clamp a sheet portion against an opposing face reduces. Conversely, as strap length 34 is decreased, twisting forms micro tears in the constant width straps with resultant stress risers, and the general condition of the twisted straps is that they are overstressed. This tends to compromise the strength of the bend and leaves a non-load bearing bend.

A vertical force (Fv in FIG. 2B) applied to sheet portion 35 will immediately load twisted and stressed strap 34, and because there is a gap G the strap will plastically deform further under loading and can fail or tear before the sheet portion 35 is displaced down to engagement with and support on face 38. A horizontal force FH similarly will tend to crush the longitudinally adjacent strap 34 (and shear strap 34 in FIG. 2B) before gap G is closed and the sheet portion 35 is supported on the opposing slit face 38.

Another problem inherent in the slitting scheme of FIGS. 2-2B and the Gitlin, et al. Application is that the constant strap width cannot be varied independently of the distance between slits, and the strap width cannot be less than the material thickness without stressing the straps to the extreme. When slits 31 are parallel to each other and longitudinally overlapping, the strap width, by definition, must equal the spacing or jog between slits. This limits the flexibility in designing the bends for structural loading of the straps. Still further, the slits terminate with every other slit end being aligned and directed toward the other. There is no attempt, therefore, to reduce stress risers and micro-crack propagation from occurring at the ends of the slits, and aligned slit ends can crack under loading.

The sheet slitting configuration of FIGS. 2-2B, therefore, can be readily employed for decorative bends, but it is not optimally suited for bends which must provide significant structural support and fatigue resistance.

The Gitlin et al. Application also teaches the formation of curved slits (in FIGS. 10a, 10b), but the slits again parallel a curved bend line so that the width of the bending straps is constant, the straps extend along and parallel to the bend line, not across it, the straps are twisted in the extreme, the slit ends tend to direct micro-cracks and stress concentrations to the next slit, and the application teaches employing a slit kerf which results in engagement of the opposite side of the slit, at 37, only at the end of the bend.

A simple linear perforation technique also was used by the same architects in an installation of bent metal ceiling panels in a pizza restaurant in Boston. Again, the bent sheet components by linear perforation were not designed to bear significant unsupported loads along the bends.

Slits, grooves, perforations, dimples and score lines also have been used in various patented systems as a basis for bending sheet material. U.S. Pat. No. 5,225,799 to West et al., for example, uses a grooving-based technique to fold up a sheet of material to form a microwave wave guide or filter. In U.S. Pat. No. 4,628,161 to St. Louis, score lines and dimples are used to fold metal sheets. In U.S. Pat. No. 6,210,037 to Brandon, slots and perforations are used to bend plastics. The bending of corrugated cardboard using slits or die cuts is shown in U.S. Pat. No. 6,132,349 and PCT Publication WO 97/24221 to Yokoyama, and U.S. Pat. Nos. 3,756,499 to Grebel et al. and U.S. Pat. No. 3,258,380 to Fischer, et al. Bending of paperboard sheets also has been facilitated by slitting, as is shown in U.S. Pat. No. 5,692,672 to Hunt, U.S. Pat. No. 3,963,170 to Wood and U.S. Pat. No. 975,121 to Carter. Published U.S. Patent Application No. US 2001/0010167 A1 also discloses a metal bending technique involving openings, notches and the like and the use of great force to produce controlled plastic flow and reduced cracking and wrinkling.

In most of these prior art bending systems, however, the bend forming technique greatly weakens the resulting structure, or precision bends are not capable of being formed, or bending occurs by crushing the material on one side of the bend. Moreover, when slitting is used in these prior art systems, in addition to structural weakening and the promotion of future points of structural failure, the slitting can make the process of sealing a bent structure expensive and difficult. These prior art methods, therefore, are less suitable for fabricating structures that are capable of containing a fluid or flowable material.

The problems of precision bending and retention of strength are much more substantial when bending metal sheets, and particularly sheets of substantial thickness. In many applications it is highly desirable to be able to bend metal sheets with low force, for example, by hand with only hand tools, or with only moderately powered tools. Such bending of thick metal sheets, of course, poses greater problems.

In another aspect of the present invention the ability to overcome prior art deficiencies in slitting-based bending of sheet material is applied to eliminate deficiencies in prior art metal fabrication techniques and the structures resulting therefrom.

A well known prior art technique for producing rigid three-dimensional structures is the process of cutting and joining together parts from sheet and non-sheet material. Jigging and welding, clamping and adhesive bonding, or machining and using fasteners to join together several discrete parts has previously been extensively used to fabricate rigid three-dimensional structures. In the case of welding, for example, a problem arises in the accurate cutting and jigging of the individual pieces; the labor and machinery required to manipulate a large number of parts, as well as the quality control and certification of multiple parts. Additionally, welding has the inherent problem of dimensional shape warping caused by the heat-affected zone of the weld.

Traditional welding of metals with significant material thickness is usually achieved by using parts having beveled edges often made by grinding or single point tools, which add significantly to the fabrication time and cost. Moreover, the fatigue failure of heat-affected metals is unpredictable for joints whose load-bearing geometries rely entirely on welded, brazed or soldered materials. Fatigue failure of welds usually is compensated for by increasing the mass of the components, which are welded together and the number and depth of the welds. The attendant disadvantage of such over design is, of course, excessive weight.

With respect to adhesively bonding sheet and non-sheet material along the edges and faces of discrete components, a problem arises from the handling and accurate positioning the several parts and holding or clamping them in place until the bonding method is complete.

Another class of prior art techniques related to the fabrication of three-dimensional structures are the Rapid Prototyping methods. These include stereo lithography and a host of other processes in which a design is produced using a CAD system and the data representation of the structure is used to drive equipment in the addition or subtraction of material until the structure is complete. Prior art Rapid Prototyping techniques are usually either additive or subtractive.

The problems associated with subtractive Rapid Prototyping methods are that they are wasteful of materials in that a block of material capable of containing the entire part is used and then a relatively expensive high-speed machining center is required to accurately mill and cut the part by removal of the unwanted material.

Problems also exist with prior art additive Rapid Prototyping techniques. Specifically, most such techniques are optimized for a very narrow range of materials. Additionally, most require a specialized fabrication device that dispenses material in correspondence with the data representing the part. The additive Rapid Prototyping processes are slow, very limited in the scale of the part envelope and usually do not make use of structurally robust materials.

Generally in the prior art, therefore, sheet slitting or grooving to enable sheet bending has produced bends, which lack the precision and strength necessary for commercial structural applications. Thus, such prior art sheet bending techniques have been largely relegated to light gauge metal bending or decorative applications, such as sculpture.

In a broad aspect of the present invention, therefore, it is an important object of the present invention to be able to bend sheet material in a very precise manner and yet produce a bend, which is capable of supporting substantial loading and is resistant to fatigue failures.

Another object of this aspect of the present invention is to provide a method for precision bending of sheets of material using improved slitting techniques, which enhance the precision of the location of the bends, the strength of the resulting structures and reduce stress-induced failures.

Another object of the present invention is to provide a precision sheet bending process and a sheet of material which has been slit or grooved for bending and which can be used to accommodate bending of sheets of various thicknesses and of various types of non-crushable materials.

Another object of the present invention is to provide a method for slitting sheets for subsequent bending that can be accomplished using only hand tools or power tools which facilitate bending but do not attempt to control the location of the bend.

Another object of the present invention is to be able to bend sheet material into high strength, three-dimensional structures having precise dimension tolerances.

It is another object of the present invention to be able to bend sheet materials into precise three-dimensional structures that are easily and inexpensively sealed thus enabling the containment of fluid or flowable materials.

In a broad aspect of the present invention relating to the use of slit-based bending to enhance fabrication and assembly techniques, it is an object of the present invention to provide a new Rapid Prototyping and Advanced Rapid Manufacturing technique that employs a wide range of materials including many that are structurally robust, does not employ specialized equipment other than what would be found in any modern fabrication facility, and can be scaled up or down to the limits of the cutting process used.

It is another object of this aspect of the present invention to provide features within the sheet of material to be bent that assist in the accurate additive alignment of components prior to and after the sheet material is bent.

A further object of the present invention is to provide a fabrication method that serves as a near-net-shape structural scaffold for multiple components arranged in 3D space in the correct relationship to each other as defined by the original CAD design process.

It is a further object of the present invention to provide a method of fabricating welded structures that employs a smaller number of separate parts and whose edges are self jigging along the length of the bends and whose non-bent edges provide features that facilitate jigging and clamping in preparation for welding. In this context it is yet another object of the present invention to provide a superior method of jigging sheet materials for welding that dramatically reduces warping and dimensional inaccuracy caused by the welding process.

Yet another object of the present invention is to provide a novel welded joint that provides substantial load-bearing properties that do not rely on the heat affected zone in all degrees of freedom and thereby improve both the loading strength and cyclical, fatigue strength of the resulting three-dimensional structure.

Still another object of the present invention is to provide a superior method for:

1) reducing the number of discrete parts required to fabricate a strong, rigid, dimensionally accurate three-dimensional structure, and
2) inherently providing a positioning and clamping method for the various sides of the desired three-dimensional structure that can be accomplished through the bent and unbent edges of the present invention resulting in a lower cost, higher yield fabrication method.

It is a further object of the present invention to provide a method of fabricating a wide variety of fluid containing casting molds for metals, polymers, ceramics and composites in which the mold is formed from a slit, bent, sheet of material which can be either removed after the solidification process or left in place as a structural or surface component of the finished object.

Still another object of the present invention is to provide a sheet bending method that is adaptable for use with existing slitting devices, enables sheet stock to be shipped in a flat or coiled condition and precision bent at a remote location without the use of a press brake, and enhances the assembly or mounting of components within and on the surfaces in the interior of enclosures formed by bending of the sheet stock after component affixation to the sheet stock.

Still another object of the present invention is to provide a precision folding technique that can be used to create accurate, precise, load-bearing folds in sheets of material, including but not limited to, metals, plastics, and composites.

Another object of the present invention is to provide a precision folding technique that allows folding around a virtual bend line and requires considerably less force to accomplish the fold than conventional bending techniques.

Another object of the present invention is to provide a precision folding technique that is essentially linearly scalable independently of the thickness or microstructural characteristics of the material Another object of the present invention is to form the geometries described herein whether by a slitting/removal process, a severing process or by an additive process, and arrive at the advantages herein described by any route.

Yet another object of the present invention is to provide a precision folding technique for folding a non-crushable material in which the microstructure of the material remains substantially unchanged around the fold.

The methods and discrete techniques for designing and precision folding of sheet material, the fabrication techniques therefor, and the structures formed from such precision bending of the present invention have other features and objects of advantage which will become apparent from, or are set forth in more detail in the following detailed description and accompanying drawings.

BRIEF SUMMARY OF THE INVENTION

In a broad aspect, a sheet of material for bending along a desired bending line includes bending strap-defining structures formed in the sheet. The strap-defining structures are positioned to define at least one bending strap in the sheet, the strap having a longitudinal strap axis that is oriented and positioned to extend across the bend line. Moreover, the strap defining structures are configured and positioned to produce bending of the sheet of material along the bend line.

In another aspect, a hollow beam includes two sheets of material. The first sheet of material is formed for bending along a plurality of first sheet bend lines by having a plurality of bending strap-defining structures positioned proximate each of the bend lines, with the bending strap-defining structures configured to produce bending along the bend lines. A hollow beam is formed by securing the first sheet of material, being bent along first sheet bend lines, to a second sheet of material.

In yet another aspect, an exoskeletal framework includes a single sheet of material formed for bending along a plurality of bend lines. The sheet of material is formed with a plurality of bending strap-defining structures positioned proximate each of the bend lines, and the bending strap-defining structures are configured to produce bending. Bending the sheet of material along the bend lines results in a framework of structural members.

The precision-folded, high strength, fatigue-resistant structures and sheet therefor of the present invention has other features and advantages which will be apparent from or are set forth in more detail in the accompanying drawings, which are incorporated in and form a part of this specification, and the following Detailed Description of the Invention, which together serve to explain the principles of the present invention.

BRIEF DESCRIPTION OF THE DRAWINGS

FIG. 1 is a fragmentary, top plan view of a sheet of material having slits and grooves formed therein in accordance with one prior art technique.

FIG. 1A is an enlarged, fragmentary view, in cross section, taken substantially along the plane of line 1A-1A in FIG. 1, of the sheet of FIG. 1 when in a bent condition.

FIG. 1B is an enlarged, fragmentary view, in cross section, taken substantially along the plane of line 1B-1B of FIG. 1, of the sheet of FIG. 1 when in a bent condition.

FIG. 2 is a fragmentary, top plan view of a sheet of material having a plurality of slits formed therein using an alternative configuration known in the prior art.

FIG. 2A is an enlarged fragmentary side elevation view of the sheet of FIG. 2 bend by about 90 degrees.

FIG. 2B is a cross-sectional view taken substantially along the plane of line 2B-2B in FIG. 2A.

FIG. 3 is a fragmentary, top plan view of a sheet of material slit in accordance with one embodiment of the present invention.

FIGS. 4A-4D are fragmentary, top plan views of a sheet of material which has been slit according to the embodiment of FIG. 3 and which is in the process of being bent from a flat plane in FIG. 4A to a 90 degrees bend in FIG. 4D.

FIG. 6 is a top plan view of a sheet of material slit in accordance with a second embodiment of the present invention.

FIG. 7 is a top plan view of the sheet of FIG. 6 after being bent by about 90 degrees.

FIG. 8 is an end view of the sheet of material of FIG. 7.

FIG. 8A is an enlarged, end elevation view, in cross section, of the sheet of material of FIG. 7 taken substantially along the plane of 8A-8A in FIG. 7 and rotated by about 45 degrees from FIG. 8.

FIG. 8B is an enlarged, end elevation view, in cross section, of the sheet of material of FIG. 7 taken substantially along the plane of 8B-8B in FIG. 7 and rotated by about 45 degrees from FIG. 8.

FIGS. 27A-27G are top perspective views of a sheet of material constructed in accordance with the present invention as it is being bent into a cross-braced box beam.

FIG. 40A-H are perspective views of a sheet of material constructed in accordance with the present invention before and in phases of being folded into a skeletal structure.

FIG. 41 is a perspective view of a corner portion of a skeletal structure according to the present invention before and in phases of being folded.

FIG. 42A is a perspective view of a corner portion as shown in FIG. 41.

FIG. 42B is a side view of an edge slot as shown in FIG. 42A

FIG. 42C is a side view of an alternate embodiment of an edge slot.

FIG. 43C is a top view of a portion of a sheet of material similar to that shown in FIG. 43A before being formed into a curved exoskeletal structure.

DETAILED DESCRIPTION OF THE INVENTION

Figure 4A:
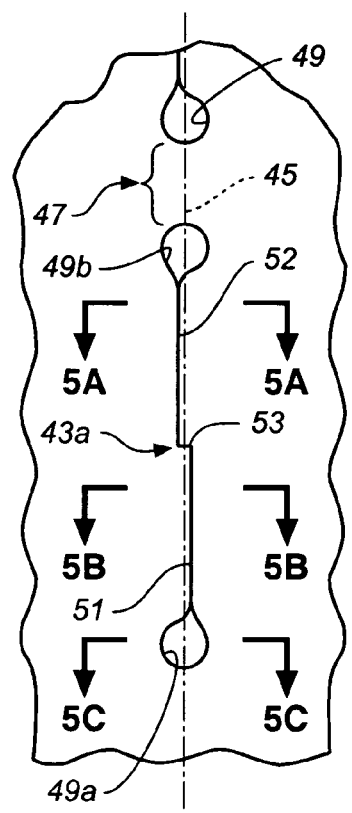

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The present method and apparatus for precision bending of sheet material is based upon the slitting geometries disclosed in prior applications, U.S. patent application Ser. No. 09/640, 267, filed Aug. 17, 2000, now U.S. Pat. No. 6,481,259 B1, and entitled METHOD FOR PRECISION BENDING OF A SHEET OF MATERIAL AND SLIT SHEET THEREFOR, and U.S. patent application Ser. No. 10/256,870, filed Sep. 26, 2002 and entitled METHOD FOR PRECISION BENDING OF SHEET OF MATERIALS, SLIT SHEETS AND FABRICATION PROCESS, now U.S. Pat. No. 6,877,349 B2, which are incorporated herein by, reference in their entirety.

One embodiment of the precision and high strength bending process and apparatus of the present invention can be described by reference to FIGS. 3-5. In FIG. 3 a sheet of material 41 is formed with a plurality of bending strap-defining structures, in this case slits, generally designated 43, along a bend line 45. Slits 43, therefore, are longitudinally extending and in end-to-end spaced relation so as to define bending webs or straps 47 between pairs of slits 43. In FIG. 3, slits 43 are provided with stress reducing structures at ends thereof, namely openings 49, so as to effect a reduction in the stress concentration in bending webs 47. It will be understood from the description below, however, that stress reducing structures, such as enlarged openings 49 in FIG. 3, are not required for realization of the benefits of the precision bending system of the present invention.

For the embodiment of slits 43 shown in FIG. 3, however, each longitudinally extending slit between the slit ends is laterally or transversely stepped relative to bend lines 45. Thus, a slit, such as slit 43a, is formed with a pair of longitudinally extending slit segments 51 and 52 which are positioned proximate to, and preferably equidistant on opposite sides of, and substantially parallel to, bend line 45. Longitudinal slit segments 51 and 52 are further connected by a transversely extending slit segment 53 so that slit 43a extends from enlarged opening 49a to enlarged opening 49b along an interconnected path which opens to both of the enlarged openings and includes both longitudinally extending slit segments 51, 52 and transverse slit segment 53.

Figure 4B:
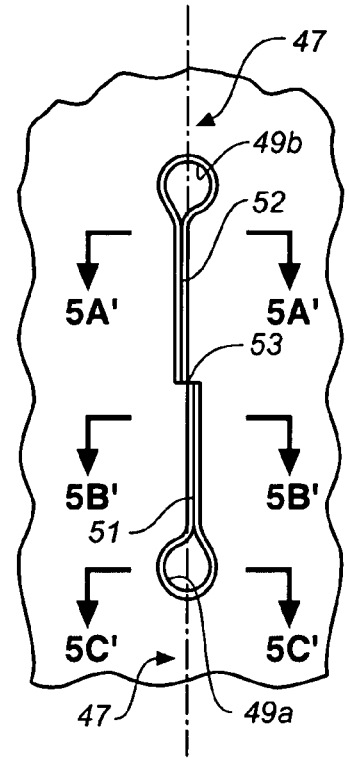
Figure 5A:
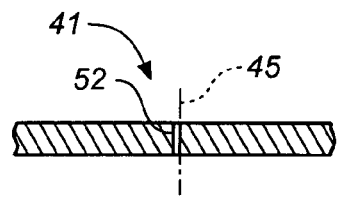
FIGS. 5A-5C''' are fragmentary, cross-sectional views, taken substantially along the planes of lines 5A-5C''', FIGS. 4A-4D during bending of the sheet of material.
Figure 5A:
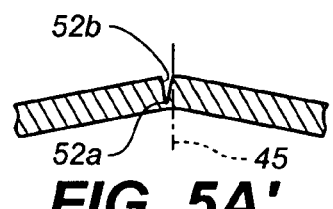
Figure 5B:
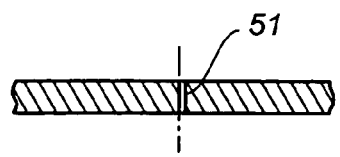
Figure 5B:
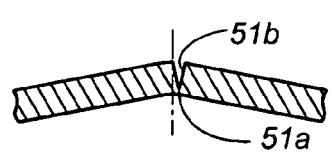
Figure 5C:
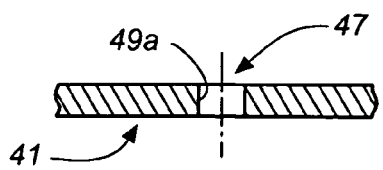
Figure 5C:
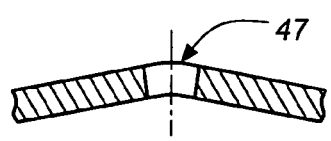

The function and advantages of such stepped slits can best be understood by reference to FIGS. 4A-4D, and the corresponding FIGS. 5A-5C to 5A-5C, wherein the bending or folding of a sheet of material 41, such as shown in FIG. 3 is illustrated at various stages. In FIG. 4A, sheet 41 is essentially slit as shown in FIG. 3. There is a difference between FIGS. 3 and 4A in that in FIG. 3 a kerf width or section of removed material is shown, while in FIG. 4A the slit is shown without any kerf, as would be produced by a slitting knife or punch. The effect during bending, however, is essentially the same if the kerf width is small enough that the material on the opposite sides of the slit interengage during bending. The same reference numerals will be employed in FIGS. 4A-5C as were employed in FIG. 3.

Thus, sheet 41 is shown in a flat condition before bending in FIG. 4A. Longitudinally extending slit-segments 51 and 52 are shown in FIG. 4A and in the cross sections of FIGS. 5A-5C. The positions of the various cross sections of the sheet are also shown in FIG. 4A.

In FIG. 4B, the sheet has been bent slightly along bend line 45, which can best be seen in FIGS. 5A-5C. As can be seen in FIGS. 5A and 5B, slits 51 and 52 have opened up along their top edges and the portion of the sheet which extends beyond bend line 45 was referred to in U.S. Pat. No. 6,481,259 B1 and U.S. patent application Ser. No. 10/256,870 (now U.S. Pat. No. 6,877,349 B2) as a "tab" 55, but for the sake of consistency with later embodiments in this application shall be referred to as "lip" 55. The lower or bottom side edges 51a and 52a of lips 55 have moved up slightly along supporting faces 51b and 52b of the sheet on the opposite sides of the slit opposite to lips 55. This displacement of lip edges 51a and 52a may be better seen in connection with the sheet when it is bent to a greater degree, for example, when bent to the position shown in FIG. 4C.

In FIG. 4C it will be seen that edges 51a and 52a have moved upwardly on supporting faces 51b and 52b of sheet 41 on opposite sides of bend line 45. Thus, there is sliding contact between edges 51a and 52a and the opposing supporting faces 51b and 52b of the slit during bending. This sliding contact will be occurring at locations which are equidistant on opposite sides of central bend line 45 if longitudinal slit segments 51 and 52 are formed in equally spaced positions on opposite sides of bend line 45, as shown in FIG. 4A. Sliding contact also can be facilitated by a lubricant or by adhesives or sealants prior to their setting up or bonding.

The result of this structure is that there are two actual bending fulcrums 51a, 51b and 52a, 52b spaced at equal distances from, and on opposite sides of, bend line 45. Lip edge 51a and supporting face 51b, as well as lip edge 52a and supporting face 52b, produce bending of bending web 47 about a virtual fulcrum that lies between the actual fulcrums and will be understood to be superimposed over bend line 45.

The final result of a 90 degree bend is shown in FIG. 4D and corresponding cross sections 5A-5C. As will be seen, sheet edge 52a and bottom side or surface 52c now are interengaged or rest on, and are supported in partially overlapped relation to, supporting face 52b (FIG. 5A). Similarly, edge 51a and bottom surface 51c now engages and rests on face 51b in an overlapped condition (FIG. 5B). Bending web 47 will be seen to have been plastically deformed or extended along an upper surface of the web 47a and plastically compressed along a lower surface 47b of web 47, as best illustrated in FIG. 5C.

In the bent condition of FIG. 4D, the lip portions of the sheet, namely, portions 55, which extend over the center line when the sheet is slit, are now resting on supporting faces 51b and 52b. This edge-to-face engagement and support during the bend, which alternates along the bend line in the configuration shown in the drawing, produces greater precision in bending or folding and gives the bent or folded structure greater resistance to shear forces at the bend or fold in mutually perpendicular directions. Thus a load $L_a$ (FIG. 5A) will be supported between bending webs 47 by the overlap of the edge 52a and bottom surface 52c on supporting edge 52b. Similarly, a load $L_b$ (FIG. 5B) will be supported by overlap and engagement of the edge 51a and surface 51c on supporting face 51b intermediate bending webs 47.

This is referred to herein as "edge-to-face" engagement and support of the material along substantially the entire length of one side of the slit by the material along substantially the entire length of the other side of the slit. It will be appreciated that, if sheet 41 were bent or folded by more than 90 degrees, edges 51a and 52a would lift up off the faces 51b and 52b and the underneath surfaces 51c and 52c would be supported by the lower edges of face 51b and 52b. If the sheet is bent by less than 90 degrees the edge still comes into engagement with the face almost immediately after the start of bending, but only the edge engages the face. This support of one side of the slit on the other shall be deemed to be "edge-to-face" engagement and support as used in the specification and the claims. As will be described hereinafter, non-ninety degree bends with full support of edges 51a and 52a by faces 51b can be achieved by slitting the sheet at angles which are not at 90 degrees to the sheet.

While bending straps or webs 47 have residual stresses as a result of plastic deformation, and while the slits cause a substantial portion of the bend not to be directly coupled together in the slit-based bending system of the present invention, the slits are formed and positioned so as to produce an edge-to-face overlap which provides substantial additional strength to the bent structure over the strength of the structures of FIGS. 1, 1A and 1B and 2A and 2B, which are based upon conventional slitting or grooving geometries. The bending straps of the present invention, in effect, pre-load the bend so as to pull or clamp the sides of the slit into edge-to-face engagement over substantially the entire bending process, and at the end of the bend, over substantially the entire slit length. Pre-loading of the bend by the residual tension in the strap also tends to prevent vibration between the slit edge which is pre-loaded against the face which acts as a bed on the other side of the slit.

Moreover, since the edges are interengaged with the faces over a substantial portion of the length of the slits, loads $L_a$ and $L_b$ will not crush or further plastically deform bending straps 47, as is the case for the prior art slitting configuration of FIGS. 2, 2A, 2B. Loading of the present bend is immediately supported by the edge-to-face engagement produced by the slitting technique of the present invention, rather than merely by the cross-sectional connecting area of a twisted and highly stressed strap, as results in the prior art configuration of FIGS. 2, 2A, 2B and the Gitlin et al. application.

The embodiment employing laterally stepped or staggered slits of the present invention, therefore, result in substantial advantages. First, the lateral position of the longitudinally extending slit segments 51 and 52 can be precisely located on each side of bend line 45, with the result that the bend will occur about a virtual fulcrum as a consequence of two actual fulcrums equidistant from, and on opposite sides of, the bend line. This precision bending reduces or eliminates accumulated tolerance errors since slit positions can be very precisely controlled by a cutting device which is driven by a CNC controller.

It also should be noted, that press brakes normally bend by indexing off an edge of a sheet or an existing bend, or other feature(s). This makes bending at an angle to the sheet edge feature(s) difficult using a press brake. Bending precisely at angles to any feature(s) of the sheet edge, however, can be accomplished readily using the present slitting process. Additionally, the resulting bent sheet has substantially improved strength against shear loading and loading along mutually perpendicular axes because the overlapped edges and faces produced by the present slit configurations support the sheet against such loads.

As can be seen, the embodiment of the present invention, as shown in FIGS. 3-5C produces precision bending of straps 47 which are substantially perpendicular to the bend line. Such an orientation of the bending straps produces significant plastic elongation along the outside or top surface of the strap, as well as significant compression along the inside or bottom surface of the strap. The bend occurs on the relatively short perpendicular straps in a manner similar to the bends of the perpendicular straps of FIGS. 1-1B, but in FIGS. 3-5C''' the lip 55 of one plane is tucked into interlocking or interengaged relationship with the face of the other plane for increased bend strength.

The prior art approach shown in FIGS. 2-2B orients the connecting straps 34 parallel to the bend line and results in significant plastic twisting deformation of the straps. Also this plastic twisting deformation significantly changes the microstructure of the material around the bend line. Moreover the straps do not fully tuck or clamp the opposite sides of the sheet into interengaged relation over the length of the slits. Still further in the embodiment of FIGS. 3-5C''' the strap width can be varied independently of the jog distance between slits 51 and 52 so that greater flexibility in design of the bend strength can be achieved.

While bending of sheet material by 90 degrees has been illustrated in the drawing, it will be understood that most of the advantages described in all embodiments of the present invention also can be realized if the slit sheet is bent by more or less than 90 degrees. The lip which extends across the bend line will slide onto and engage the opposite face beginning at small bend angles, and such support and engagement will continue at large, 90 degree plus, bend angles.

It has been found that the embodiment of FIGS. 3-SC''' is best suited for use with relatively ductile sheet materials. As the material becomes harder and less ductile, a second embodiment is preferred.

In the embodiment of the present invention shown in FIGS. 6-8B, a slitting configuration is employed which tucks or clamps the sheet material into interengaged relation on both sides of the slits and also reduces bending strap plastic deformation and the residual stress in the straps. Moreover, this embodiment also allows the strap width to be varied independently of the jog distance between slits and to have the strap width increase in both directions from the bend line for less stress concentration in the connected portions of the sheet of material on opposite sides of the bend line.

A bending strap which is oblique to the bend line is employed, which allows the strap length to be increased, as compared to the shorter bending straps of FIGS. 3-5C'''. Plastic deformation also is accomplished in part by twisting, rather than purely by bending, as is the case in FIGS. 3-5C''', but the amount of twisting is greatly reduced, as compared to the parallel straps of FIGS. 2-2B. Moreover, the material lips on opposite sides of the slit are tucked into interengagement with the faces over virtually the entire length of the slit so that substantial additional strap stress on loading does not occur.

Additionally, in the embodiment shown in FIGS. 6-8B, the slit configuration produces a continuous sliding interengagement between material on opposite sides of the slits during bending, which interengagement progresses along the slit from the middle toward the ends. The faces on one side of the slits act as beds for sliding support during the bend, which results in a more uniform and a less stressful bending of the bending straps. The embodiment as shown in FIGS. 6-8B, therefore, can be used with sheet material that is less ductile, such as heat treated 6061 aluminum or even some ceramics, and with thicker sheets of material.

Referring specifically to FIGS. 6-8B, a sheet of material 241 to be bent or folded is formed with a plurality of longitudinally extending bending strap-defining structures, such as slits 243, along a bend line 245. Each of slits 243 optionally may be provided with enlarged stress-relieving end openings 249, or a curved end section 249a, which will tend to cause any stress cracks to propagate back into slits 243, depending on the loading direction of the sheet. As will be seen, the slits of the embodiment of FIGS. 6 and 8B are not stepped, but they are configured in a manner producing bending and twisting of obliquely oriented bending straps 247 about a virtual fulcrum superimposed on bend line 245. The configuration and positioning of the slits, including selection of the jog distance and kerf width, also causes the sheet material on opposite sides of the slits to tuck or to move into an edge-to-face interengaged relationship during bending. Most preferably edge-to-face interengagement occurs throughout the bend to its completion. But, the jog distance and kerf can be selected to produce edge-to-face interengagement only at the start of the bend, which will tend to insure precise bending. Thus, as used herein, the expression "during bending" is meant to include edge-to-face interengagement at any stage of the bend.

While the embodiments shown and described in FIGS. 6-8B and 9-10A are not stepped, the oblique straps of the embodiments of 6-8B and 9-10A can be combined with the stepped slit configuration of FIGS. 3-5C. Thus, one or both of the ends of the stepped slits can be oblique or curved.

As shown in FIG. 6, pairs of elongated slits 243 are preferably positioned on opposite sides of and proximate to bend line 245 so that pairs of longitudinally adjacent slit end portions 251 on opposite sides of the bend line define a bending web, spline or strap 247, which can be seen to extend obliquely across bend line 245. "Oblique" and "obliquely," as will be explained in more detail below in connection with FIG. I1, shall mean that the longitudinal central axis of the strap crosses the desired bend line at an angle other than 90 degrees. Thus, each slit end portion 251 diverges away from bend line 245 so that the center line of the strap is skewed or oblique and bending, as well as twisting of the strap, occurs. Although not an absolute requirement to effect bending in accordance with the present invention, it will be seen that slits 243 are longitudinally overlapping along bend line 245.

Unlike slits 31 in FIGS. 2-2B and the prior art Gitlin, et al. Application, which are parallel to the bend line in the area defining bending straps 34, the divergence of the slits 243 from bend line 245 results in oblique bending straps that do not require the extreme twisting present in the prior art of FIGS. 2-2B and Gitlin et al. Application. Moreover, the divergence of slits 243 from bend line 245 results in the width dimension of the straps increasing as the straps connect with the remainder of sheet 241. This increasing width enhances the transfer of loading across the bend so as to reduce stress concentrations and to increase fatigue resistance of the straps.

As was the case for the first embodiment, slit kerfs 243 preferably have a width dimension, and the transverse jog distance across the bend line between slits is dimensioned, to produce interengagement of sheet material on opposite sides of the slits during bending. Thus, slits 243 can be made with a knife and have essentially a zero kerf, or they can have a greater kerf which still produces interengagement, depending upon the thickness of the sheet being bent. Most preferably the kerf width is not greater than about 0.3 times the material thickness, and the jog distance is not greater than about 1.0 times the material thickness.

As was the case for the embodiment of FIGS. 3-5C, a lip portion 253 extends across bend line 245 to slit 243. Lip 253 slides or rides up a face 255 of a tongue 260 on the other side of slit 243 if the kerf width and jog distance, relative to the thickness of the material, are not so large as to prevent contact between the two sides of the slit during bending.

If the kerf width and jog distance are so large that contact between the lip portion 253 and face 255 of tongue 260 does not occur the bent or folded sheet will still have some of the improved strength advantages of oblique bending straps, but in such instances there are no actual fulcrums for bending so that bending along bend line 245 becomes less predictable and precise. Similarly, if the strap-defining structures are grooves 243 which do not penetrate through the sheet of material, the grooves will define oblique, high-strength bending straps, but edge-to-face sliding will not occur during bending unless the groove is so deep as to break-through during bending and become a slit. Thus, arcuately or divergently grooved embodiments of the bending straps will have improved strap strength even if edge-to-face bending does not occur.

Another problem which will be associated with a kerf width that is too wide to produce interengagement of lips 253 with faces 255 of tongues 260 is that the resultant bent sheet material will not have a lip edge supported on a slit face, unless the bend is relatively extreme so as to define a small arcuate angle between the two sides of the bent sheet. As noted in connection with the prior art slitting approach, this will result in immediate further stressing of the bending straps upon loading. The problem would not be as severe in the strap configuration of FIGS. 6-8B as in the prior art, but the preferred form is for the kerf width and jog distance to be selected to insure interengagement of the lip and tongue face substantially throughout the bending process.

It is also possible for the slits 243 to actually be on the bend line or even across the bend line and still produce precise bending from the balanced positioning of the actual fulcrum faces 255 and the edges of lips 253 sliding therealong. A potential disadvantage of slits 243 being formed to cross the bend line 245 is that an air-gap would remain between edge 257 and face 255. An air-gap, however, may be acceptable in order to facilitate subsequent welding, brazing, soldering, adhesive filling or if an air-gap is desired for venting. Slit positioning to create an air-gap is a desirable feature of the present invention when subsequent bend reinforcement is employed. Unfilled, however, an air-gap will tend to place all of the load bearing requirements of the bend in all degrees of freedom, except rotation, on the connected zone or cross-sectional area of plastically deformed strap 247. It is also possible to scale slits that cross the bend line that produce edge-to-face engagement without an air gap.

FIGS. 7, 8, 8A and 8B illustrate the sheet 241 as bent to a 90 degree angle along bend line 245. As best may be seen in FIGS. 8A and 8B, an inside edge 257 of lip 253 has slid up on face 255 of tongue 260 on the opposite side of the slit and is interengaged and supported thereon. A vertical force, $F_v$, therefore, as shown in FIG. 8A is supported by the overlap of edge 257 on face 255. A horizontal force, $F_H$, as shown in FIG. 8B similarly will be resisted by the overlap of edge 257 on face 255. Comparison of FIGS. 8A and 8B to the prior art FIGS. 1A, 1B and 2A and 2B will make apparent the differences which the present bending method and slit configuration have on the strength of the overall structure. The combination of alternating overlapping edge-to-face support along the slits and the oblique bending straps, which are oblique in oppositely skewed directions, provides a bend and twist which is not only precise but has much less residual stress and higher strength than prior slitting configurations will produce.

However, skewing of the bending straps in opposite directions is not required to achieve many of the advantages of the present invention. When sheet 241 is an isotropic material, alternate skewing of the strap longitudinal central axes tends to cancel stress. If the sheet material is not isotropic, skewing of the oblique straps in the same direction can be used to negate preferential grain effects in the material. Alternatively, for isotropic sheet material, skewing of the straps in the same direction can produce relative shifting along the bend line of the portions of the sheet on opposite sides of the bend line, which shifting can be used for producing a locking engagement with a third plane such as an interference fit or a tab and slot insertion by the amount of side shift produced.

The geometry of the oblique slits is such that they bend and twist over a region that tends to reduce residual stress in the strap material at the point where the slit is terminated or the strap connected to the rest of the sheet. Thus, crack propagation is reduced, lessening the need for enlarged openings or curls at the slit ends. If the resultant structure is intended primarily for static loading or is not expected to be loaded at all, no stress reducing termination is required in the arcuate slit that produces the oblique strap.

Moreover, it will be understood that slits 243 can be shifted along bend line 243 to change the width of straps 247 without increasing jog distance at which the slits are laterally spaced from each other. Conversely, the jog distance between slits 243 can be increased and the slits longitudinally shifted to maintain the same strap thickness. Obviously both changes can be made to design the strap width and length to meet the application.

Generally, the ratio of the transverse distance from slit to slit, or twice the distance of one slit to the bend line is referred to as the "jog". The ratio of the jog distance relative to the material thickness in the preferred embodiments of the present invention will be less than 1. That is, the jog distance usually is less than one material thickness. A more preferred embodiment makes use of a jog distance ratio of less than 0.5 material thickness. A still more preferred embodiment makes use of a jog distance ratio of approximately 0.3 material thickness, depending upon the characteristics of the specific material used and the widths of the straps, and the kerf dimensions.

The width of bending straps 247 will influence the amount of force required to bend the sheet and that can be varied by either moving slits 243 farther away from the bend line 245 or by longitudinally shifting the position of the slits, or both. Generally, the width of oblique bending straps 247 most preferably will be selected to be greater than the thickness of the material being bent, but strap widths in the range of about 0.5 to about 4 times the thickness of the material may be used. More preferably, the strap width is between 0.7 and 2.5 times the material thickness.

One of the advantages of the present invention, however, is that the slitting configuration is such that bending of sheets can normally be accomplished using hand tools or tools that are relatively low powered. Thus, the bending tools need only so much force as to effect bending and twisting of bending straps 247; they do not have to have sufficient power so as to control the location of the bend. Such control is required for powered machines, such as press brakes, which clamp the material to be bent with sufficient force so as to control the location of the bend. In the present invention, however, the location of the bend is controlled by the actual fulcrums, namely edges 257 pivoting on face 255 on opposite sides of the bend line. Therefore, the bending tool required need only be one which can effect bending of straps 247, not positioning of the bend. This is extremely important in applications in which high strength power tools are not readily available, for example, in outer space or in the field fabrication of structures or at fabricators who do not have such high-powered equipment. It also allows low-force sheet bending equipment, such as corrugated cardboard bending machines, bladders, vacuum bending, hydraulic pulling cylinders with folding bars, and shape-memory bending materials, to be used to bend metal sheets, as will be set forth in more detail below. Additionally, strong, accurate bends are important in the fabrication of structures in which physical access to power bending equipment is not possible because of the geometry of the structure itself. This is particularly true of the last few bends required to close and latch a three-dimensional structure.

Figure 9:
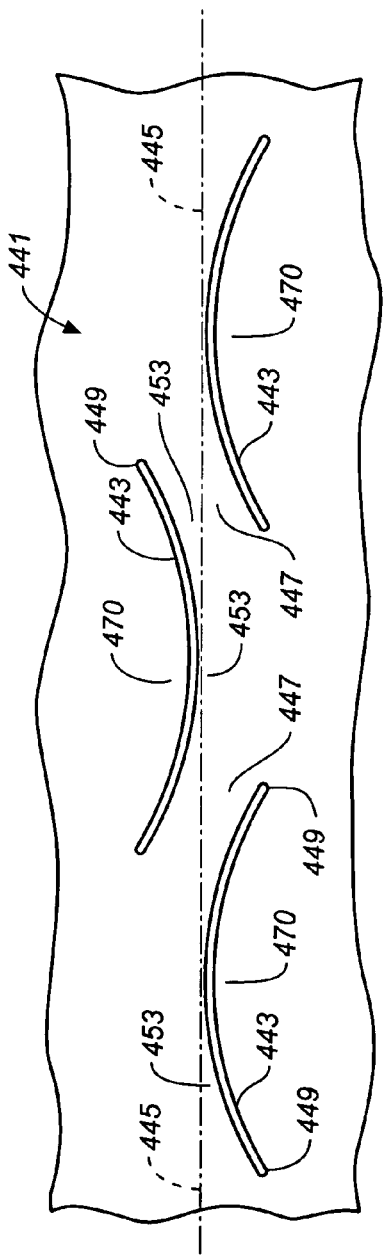
FIG. 9 is a fragmentary top plan view of a sheet of material slit according to a further alternative embodiment of the present invention.
Figure 10:
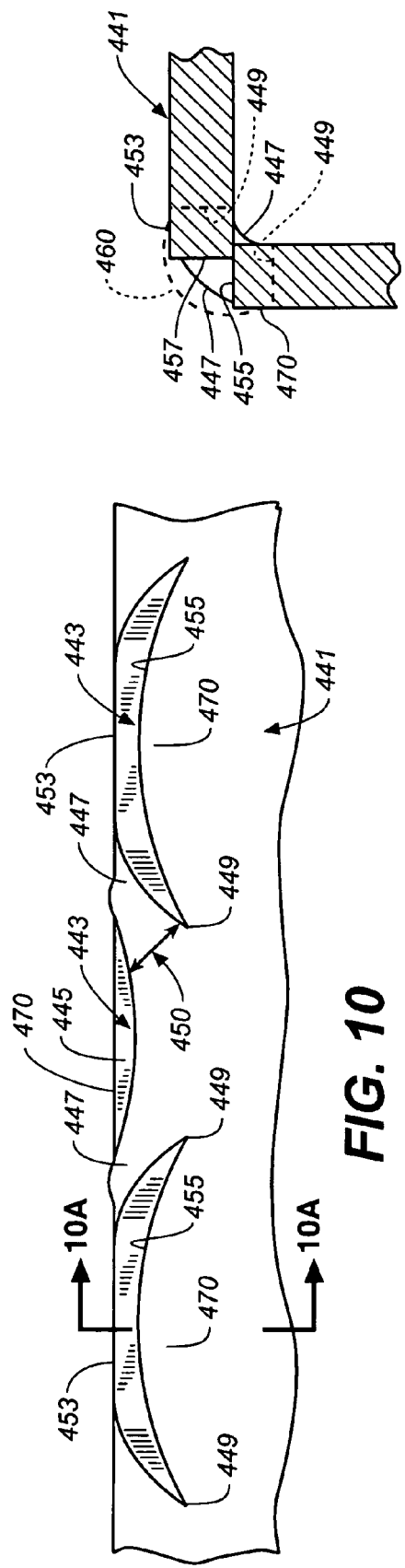
FIG. 10 is a side elevation view of the sheet of FIG. 9 after bending by about 90 degrees.
Figure 10A:
FIG. 10A is a fragmentary cross-sectional view taken substantially along the plane of line 10A-10A in FIG. 10.

The most preferred configuration for slit end portions 251 is an arcuate divergence from bend line 245. In fact, each slit may be formed as a continuous arc, as shown in FIGS. 9, 10 and 10A and described below. An arc causes the material on the side of the slit to smoothly and progressively move up the face side of the tongue along an arcuate path beginning at center of the slit and progressing to the ends of the slit. This reduces the danger of hanging up of edge 257 on face 255 during bending and thereby is less stressful on the bending straps. Additionally, large radii of cut free surfaces are less prone to stress concentration. In the configuration of FIGS. 6-8B, the central portion of slits 243 is substantially parallel to bend line 245. Some non-parallel orientations, particularly if balanced on either side of the bend line, may be acceptable and produce the results described herein.

It also would be possible to form end portions 251 to diverge from bend line 245 at right angles to the bend line and the center of slits 243. This would define a bending strap that could be non-oblique, if the slits did not longitudinally overlap. The disadvantage of this approach is that the bending straps 247 tend not to bend as uniformly and reliably and thereby influence the precision of the location of the bend. Additionally, such a geometry eliminates twisting of the strap and induces severe points of stress concentration on the inner and outer radii of the bend and may limit the degree of edge-to-edge engagement.

The bending straps in all the embodiments of the present invention are first elastically deformed and in plastic/elastic materials thereafter plastically deformed. The present slitting invention also can be used with elastically deformable plastics that never plastically deform. Such materials would be secured in a bent or folded condition so that they do not resiliently unbend. In order to make it more likely that only elastic deformation occurs, it is preferable that the bending straps be formed with central longitudinal strap axes that are at a small angle to the bending line, most preferably, 26 degrees or less. The lower the angle, the higher the fraction of twisting that occurs and the lower the fraction of bending that occurs. Moreover, the lower the angle, the higher the bending radius that occurs. Rigid materials that do not gracefully deform plastically, such as rigid polymers, rigid metal, the more flexible ceramics and some composites, can tolerate a large bending radius in the elastic regime. They can also tolerate a torsion or twisting spring action that is distributed over a long strap of material. Low angle straps provide both aspects.

At the end of the bend of a plastically deformed sheet, however, there will remain a certain resilient elastic deformation tending to pull edge 257 down against face 255 and resulting in residual resilient clamping force maintaining the interengagement between material on opposite sides of the slits. Thus, the elastic resiliency of the sheet being bent will tend to pre-load or snug down the overlapping sheet edges against the supporting faces to ensure strength at the bend and reduce bending strap incremental stress on loading of the bend.

The embodiment shown in FIGS. 9, 10 and 10A is a special case of the oblique strap embodiment described in connection with FIGS. 6-8B. Here the oblique straps are formed by completely arcuate slits 443. This slit configuration, shown as a circular segment, is particularly well suited for bending thicker and less ductile metal sheets, for example, titanium and ¼ inch steel plate and up.

When arcuate or circular slits 443 are formed in sheet 441 on opposite sides of bend line 435, lip portions 453 of the sheet, which extend over bend line 445 to slits 443, begin tucking or sliding onto face 455 of the tongues 470 at a center of each arcuate slit at the start of bending. Lip portions 453 then slide from the center of each slit partially up onto tongue faces 455 progressively toward the slit ends as straps 447 are twisted and bent. The progressive tucking of the lips onto the opposing faces is less stressful on the slit ends 449, and therefore more suitable for bending of less ductile and thicker materials, than say the embodiment of FIGS. 6-8B, in which the slits have straight central portions and simultaneously slide up onto the faces over the entire straight portion.

Figure 11:
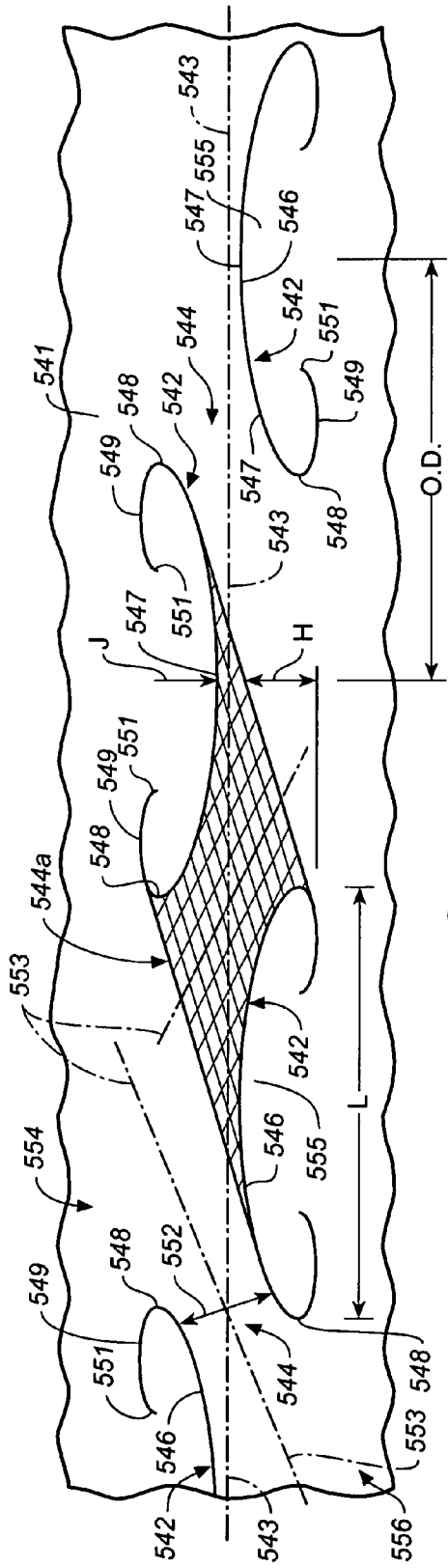
FIG. 11 is a fragmentary, top plan view of a schematic representation of a further alternative embodiment of a sheet of material having strap-defining structures constructed in accordance with the present invention.

Slit ends 449 in FIG. 10 do not have the stress-relieving openings 249, nor radiused ends 249a of FIGS. 6-8 nor the curved ends of FIG. 11, but slits 443 are more economical to cut or form into most sheet stock. Moreover, the deformation of straps 447 is more gradual during bending so that stress concentration will be reduced. This, of course, combines with increasing strap width to transfer loading forces and bending forces more evenly into the remainder of the sheet with lower stress concentration.

The various embodiments of the present sheet slitting and grooving invention allow designing manufacturing and fabrication advantages to be achieved which have not heretofore been realized. Thus, the full benefits of such design and fabrication techniques as CAD design, Rapid Prototyping and "pick and place" assembly can be realized by using sheet stock formation techniques in accordance with the present invention. Moreover, standard fabrication techniques, such as welding, are greatly enhanced using the strap-defining configurations of the present invention.

The many advantages of using sheets formed in accordance with the present invention can be illustrated in connection with a manufacturing technique as basic as welding. Sheet bending using the present method, for example, avoids the manufacturing problems associated with handling multiple parts, such as jigging.

Additionally, the bent sheets of the present invention in which slitting is employed can be welded along the slits. As can be seen in FIG. 10A, for example, face 455 and end surface 457 of tab 453 form a V-shaped cross section that is ideal for welding. No grinding or machining is required to place a weld 460 (broken lines) along slits 443 as shown in FIG. 10A. Moreover, the edge-to-face engagement of the sides of the sheet on opposite sides of the slits, in effect, provides a jig or fixture for holding the sheet portions together during the weld and for reducing thermally induced warping. Set up time is thereby greatly reduced, and the dimensional accuracy achieved by the present slitting process is maintained during the welding step. The arcuate slits also provide an easily sensed topographic feature for robotic welding. These advantages also accrue in connection with soldering, brazing and adhesive filling, although thermal distortion is usually not a serious issue for many adhesives.

Filling of the slits by welding, brazing, soldering, potting compound or adhesives allows the bent sheets of the present invention to be formed into enclosures which hold fluids or flowable materials. Thus, bent sheet enclosures can even be used to form fluid-tight molds, with the sheeting either being removed or left in place after molding.

One of the significant advantages of using oblique, and particularly curved, grooves or slits is that the resulting bending straps are diverging at the point at which they connect to the reminder of the sheet material. Thus, area 450 of strap 447 in FIG. 10 is transversely diverging between slit end 449 and the next slit 443. This divergence tends to deliver or transfer the stresses in strap 447 at each end into the remainder of the sheet in a diffused or unconcentrated manner. As the arc or radius of the slits is reduced the divergence increases, again allowing a further independent tailoring of the strap stress transfer across the bend. Such tailoring can be combined with one or more of changes to strap width, jog distance and slit kerf to further influence the strength of the bend. This principle is employed in the design of the slits on grooves of FIG. 11.

While the oblique bending straps of the embodiments of FIGS. 6-8 and FIGS. 9-10 result in substantial improvements of the overall strength and fatigue resistance of the bent structure, it has been found empirically that still further improvements, particularly in connection with fatigue, can be achieved if the strap-defining structure takes the form of an arcuate slit. As used herein, "arcuate" shall mean and include a circular arc and a series of longitudinally connected, tangential arcs having differing radii. Preferably, the arcuate slits or grooves have relatively large radii (as compared to the sheet thickness), as illustrated in FIG. 11. Thus, a sheet of material 541 can be provided with a plurality of connected, large radii, arcuate slits, generally designated 542, along bend line 543. Arcuate slits 542 preferably are longitudinally staggered or offset (by an offset distance measured between the centers of adjacent slits along bend line 543 and alternatively are on opposite sides of the bend line 543, in a manner described above in connection with other embodiments of the present invention. Arcuate slits 542 define connected zones, which are bending straps 544, and disconnected zones, which are provided by slits 542. Only the right hand slit 542 in FIG. 11 shows a kerf or slit thickness, with the remainder of the slits 542 being either schematically shown or taking the form of a slit form by a knife resulting in no kerf.

Longitudinally adjacent slits 542 defined therebetween bending straps 544, which are shown in this embodiment as being oblique to bending line 543 and skewed in alternating directions, as also described above. Each slit 542 tends to have a central arcuate portion 546 which diverges away from bending line 543 from a center point 547 of the arcuate slit. End portions 548 also may advantageously be arcuate with a much smaller radius of curvature that causes the smiles to extend back along arc portion 549 and finally terminated in an inwardly arc portion 551.

It will be seen, therefore, that bending strap 544 is defined by the arc portions 546 on either side of bending line 543 and at the end of the straps by the arcuate end portions 548. A minimum strap width occurs between the arcuate slit portions 546 at arrows 552 (shown in FIG. 11 at the left hand pair of longitudinally adjacent slits). If a center line 553 is drawn through arrows 552 at the minimum width of the strap, it would be seen that the center line crosses bend line 543 at about the minimum strap width 552. Strap 544 diverges away from longitudinal strap axis 553 in both directions from minimum strap width 552. Thus, a portion 554 of the sheet on one side of bend line 543 is connected to a second portion 556 of the sheet on the opposite side of bend line 543 by strap 544. The increasing width of strap 544 in both directions from the minimum width plane 552 causes the strap to be connected to the respective sheet portions 554 and 556 across the bend line in a manner which greatly reduces stress and increases fatigue resistance.

For purposes of further illustration, strap 544a has been cross hatched to demonstrate the increasing width of the strap along its central longitudinal strap axis 553. Coupling of sheet portion 554 by an ever-increasing strap width to sheet portion 556 by a similarly increasing strap width tends to reduce stress. Orienting the central longitudinal axes 553 of straps 554 at an oblique angle to bend line 543 results in the straps being both twisted and bent, rather than solely twisted, which also reduces stresses in the straps. Stresses in the sheet flow across the bend through the connected material of the strap. Cyclical stress in tension, the primary cause of fatigue failure, flow through the twisted and bent strap and generally parallel to large radii arcs 546 and 549. The smaller radii of arcs 551 and 548 provide a smooth transition away from the primary stress bearing free surfaces of 546 and 549 but do not themselves experience significant stress flow. In this way, the arcuate slits are like portions of very large circles joined together by much smaller circles or arcs in a way that positions only the large radii arcs (compared to the material thickness) in the stress field flow, and uses smaller radii arcs as connectors to minimize the depth into the parent plane away from the fold line that the slit is formed. Thus, slit ends, at which stress caused micro cracking is most likely to occur, will tend not to be propagated from one slit to another down the length of the bend, as can possibly occur in a failure condition in the embodiments of FIGS. 6-8 and 9-10.

The bending strap shape also will influence the distribution of stresses across the bend. When the bending strap diverges relatively rapidly away from the narrowest strap width dimension, e.g., width dimension 552 in FIG. 11, there is a tendency for this minimum dimension to act as a waist or weakened plane at the center of the strap. Such rapid narrowing will allow localized plastic deformation and stress concentration in the strap, rather than the desired distribution of the stresses over the full length of the strap and into the sheet material 554 and 556 on either side of the strap.

As shown in FIG. 11, and as is preferred, strap 544 preferably a minimum width dimension 552 providing the desired strap strength and then gradually diverge in both directions along the strap with any rapid divergence taking place as the strap terminates into the sheet portions 554 and 556. This construction avoids the problem of having an unduly narrow strap waist at 552 which will concentrate bending and twisting forces and produce failure, rather than distributing them evenly along the length of the strap and into sheet portions 554 and 556.

Figure 11A:
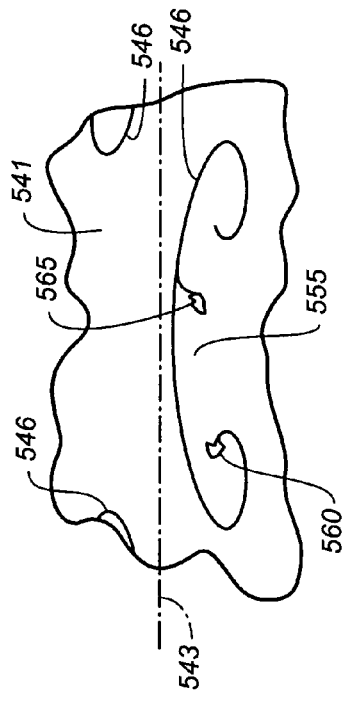
FIG. 11A is a fragmentary top plan view of a slit of the configuration shown in FIG. 11 which has been formed using a rapid piercing laser cutting technique.

The tongue side of a slit, that is, the portion of the parent plane defined by the concave side of the arcuate slit, tends to be isolated from tensile stress. This makes the tongue ideal for locating features that cut into the parent plane. Attachment or alignment holes, or notches that mate with other connecting geometry are examples. FIG. 11A illustrates positioning of water-jet cut or laser cut, rapid piercing holes 560 and 565 on the tongue 555 of slit 546. Rapid pierce holes are somewhat irregular and elsewhere might initiate a crack failure in fatigue. In FIG. 11A two alternative locations of rapid piercing holes are shown. Rapid pierce holes are important to reduce the total cost of laser or water-jet cutting because slow piercing is very time consuming.

One of the most beneficial aspects of the present invention is that the design and cutting of the material to form the straps and the edge-to-face engagement of the lips and tongues of the slits is accomplished in a manner in which the microstructure of the material around the bend or fold is essentially unchanged in comparison to the substantial change in the microstructure of materials bent or folded to the same angle or degree of sharpness using conventional bending techniques, as described in the prior art. It is the relationship of the straps and the edge-to-face engagement of the slits which provides a combination of twisting and bending deformation when the material is bent that greatly reduces the stress around the bend and leaves the microstructure of the material around the bend essentially unchanged. When conventional bending techniques of the prior art are used there is a substantial change in the microstructure of the material around the bend if the bend is made to be sharp (for example, 90 degrees on the inside of the bend, as shown for example in FIGS. 5A, 8, 8A, 8B and 10A.

As was generally described in connection with other embodiments of the present invention, slits 542 can have their geometries altered to accommodate a wide range of sheet characteristics. Thus, as the type of sheet material which is bent is altered, or its thicknesses changed or strength characteristics of the bend are to be tailored, the geometry of smile slits 542 can also change. The length, L, of each slit can change, as can its offset distance, O.D., or longitudinal spacing along bend line 543. The height, H, of the slits can also be changed, and the jog distance, J, across the bend line between slits on opposite sides of the bend line can be altered. These various factors will have an effect on the geometry and orientation of straps 544, which in turn will also effect the strength of the bend and its suitability for use in various structures. Of equal importance is the shape of the arcuate slit in conjunction with the aforementioned sealing and positioning variable.

It is a feature of the present invention, therefore, that the strap-defining slits or grooves can be tailored to the material being bent or folded and the structure to be produced. It is possible, for example, to empirically test sheets of a given material having differing thicknesses with arc slit designs in which the geometries have been changed slightly, but the designs comprise a family of related arc geometries. This process can be repeated for differing materials, and the empirical data stored in a database from which designs can be retrieved based upon input as to the sheet of material being bent and its thickness. This process is particularly well suited for computer implementation in which the physical properties of the sheet of material are entered and the program makes a selection from the computer database of empirical data as to the most appropriate arc geometry for use in bending the material. The software can also interpolate between available data when the sheet is of a material for which no exact data is stored or when the sheet has a thickness for which there are no exact stored data.

The design or configuration of the arcs, and thus the connecting straps, also can be varied along the length of a bend line to accommodate changes in the thickness of the sheet of material along the bend line. Alternatively, strap configurations along a bend line can change or be tailored to accommodate non-linear loading. While not as important as the strength and fatigue-resistance improvements of the present invention, the slit or strap configurations also can be varied to provide different decorative effects in combination with improved strength and fatigue resistance.

Another advantage which accrues from the various embodiments of the sheet slitting system of the present invention is that the resulting bends or fold are relatively sharp, both internally and externally. Sharp bends enable strong coupling of one bent structure to another structure. Thus, a press brake bend tends to be rounded or have a noticeable radius at the bend. When a press brake bent structure is coupled to a plate, for example, and a force is applied tending to rotate the bent structure about the arcuate bend, the bent structure can decouple from the plate. Such decoupling can occur more easily than if the bend were sharp, as it will be for the bends resulting from using the present slitting scheme.

The ability to produce sharp or crisp bends or folds allows the process of the present invention to be applied to structures which had heretofore only been formed from paper or thin foils, namely, to the vast technology of origami or folded paper constructions. Complex three-dimensional folded paper structures, and a science or mathematics for their creation, have been developed after centuries of effort. Such origami structures, while visually elegant, usually are not capable of being formed from metal sheets of a thickness greater than a foil. Thus, origami folded sheets usually cannot support significant loading. Typical examples of origami are the folded paper constructions set forth in "ADVANCED ORIGAMI" by Dedier Boursin, published by Firefly Books, Buffalo, N.Y. in 2002, and "EXTREME ORIGAMI" by Kunihiko Kasahara, published by Sterling Publishing Company, NY, N.Y. in 2002. The present invention thus enables a new class of origami-analog designs in which the slitting and bending methods described herein are substituted for origami creases.

The sheet slitting or grooving process of the present invention produces sharp bends and even allows the folding of metal sheets by 180 degrees or back on itself. Thus, many structurally interesting origami constructions can be made using sheet metal having a thickness well beyond that of a foil, and the resulting origami-based structure will be capable of supporting significant loads.

Another interesting design and fabrication potential is realized by using the present slitting configurations in connection with Rapid Prototyping and Rapid Manufacturing, particularly if automated "Pick and Place" component additions are employed. Rapid Prototyping and Rapid Manufacturing are broadly known and are comprised of the use of CAD (computer-assisted design) and CAM (computer-assisted manufacturing) design, respectively, to enable three-dimensional fabrication. The designer begins with a desired virtual three-dimensional structure. Using the current invention to enable Rapid Prototyping, the CAD software unfolds the three-dimensional structure to a two-dimensional sheet and then locates the slit positions for bending of the sheet to produce the desired structure. The same can be done in Rapid Manufacturing using CAM. Other types of software for performing similar tasks. The ability to precisely bend, and to tailor the bend strength, by selecting jog distances and bending strap widths, allows the designer to layout slits in the unfolded two-dimensional sheet drawing in the design process, which thereafter can be implemented in the manufacturing process by sheet grooving or slitting and bending to produce complex three-dimensional structures, with or without add-on components.

Broadly, it is also known to assemble components onto circuit boards for electronic devices using high speed "pick and place" automated component handling techniques. Thus, assembly robots can pick components from component supply devices and then place them on a circuit board or substrate or chassis. The robotics secure the components to the substrate using fasteners, soldering plug-ins or the like. Such "pick and place" assembly has been largely limited to placing the components on a flat surface. Thus, the circuit boards must be placed in a three-dimensional housing after the "pick and place" assembly has been completed.

An electronic housing, usually cannot be folded or bent into a three-dimensional shape after components are secured to the walls of the housing. Moreover, prior techniques for bending have lacked the precision possible with the present invention and necessary to solve component or structural alignment problems. Pre-folding or bending up the housing has, therefore, limited the ability for pick and place robotics to be used to secure electronic components in the housings.

It also should be noted that the straps present between slits can be advantageously used as conductive paths across bends in electronic applications, and the precision possible allows conductive paths or components on the circuit board to be folded into alignment when the three-dimensional chassis is formed, or when circuit boards themselves are folded into a more dense conformation.

The design and manufacturing processes of the present invention, however, enable precision bends to be laid out, slit and then formed with relatively low forces being involved, as is illustrated in FIGS. 28A-28E. Thus, a housing can be designed and cut from a flat sheet 821 and high-speed pick and place robotics used to rapidly secure components, C, to any or all six walls of a cube enclosure, and the housing or component chassis can be easily bent into a three-dimensional shape after the pick and place process is completed.

Figure 28A:
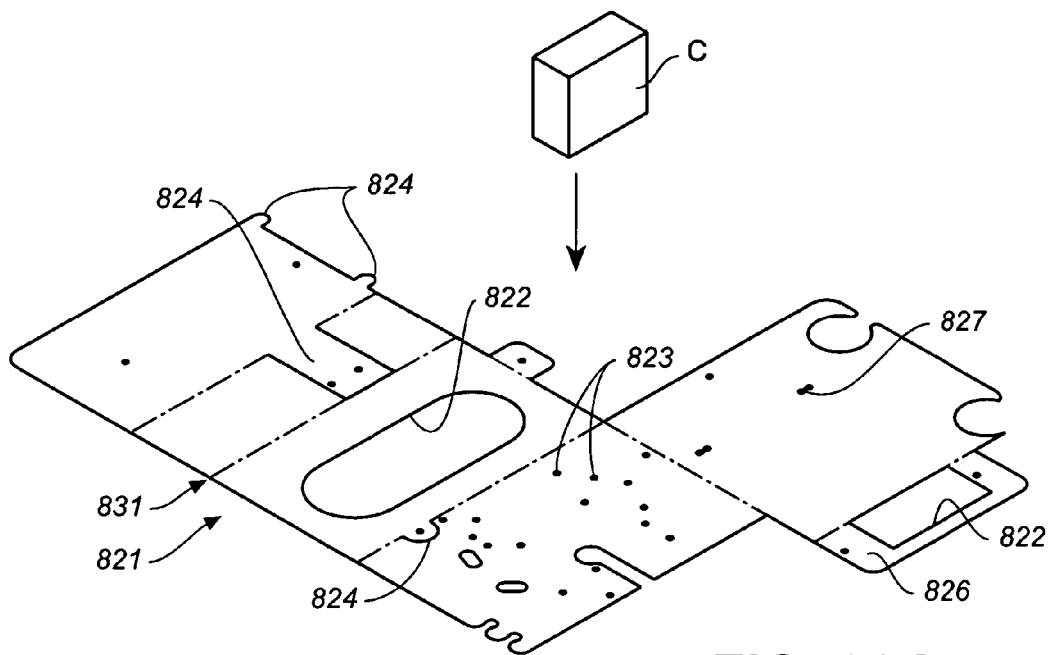
FIGS. 28A-28E are top perspective views of a sheet of material constructed in accordance with the present invention as it is being bent into a chassis for support of components such as electrical components.
Figure 28B:
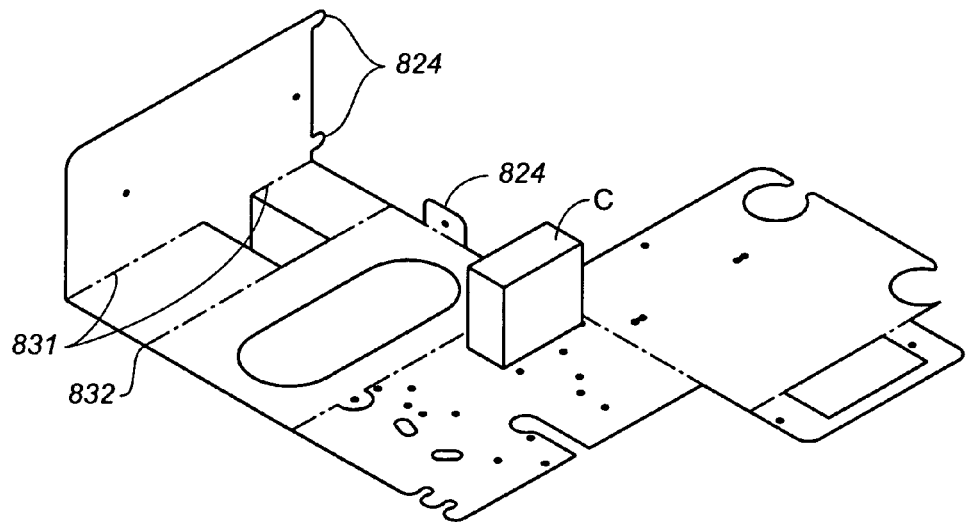
Figure 28C:
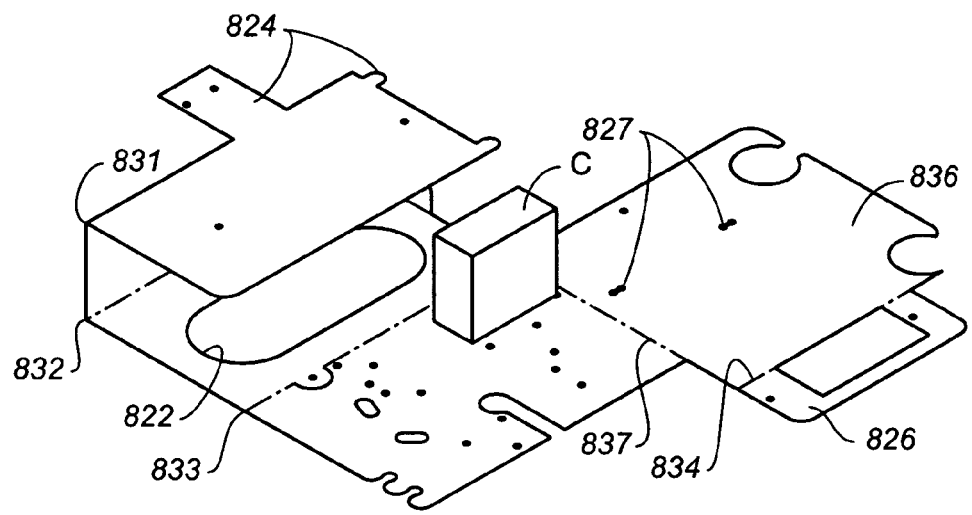
Figure 28D:
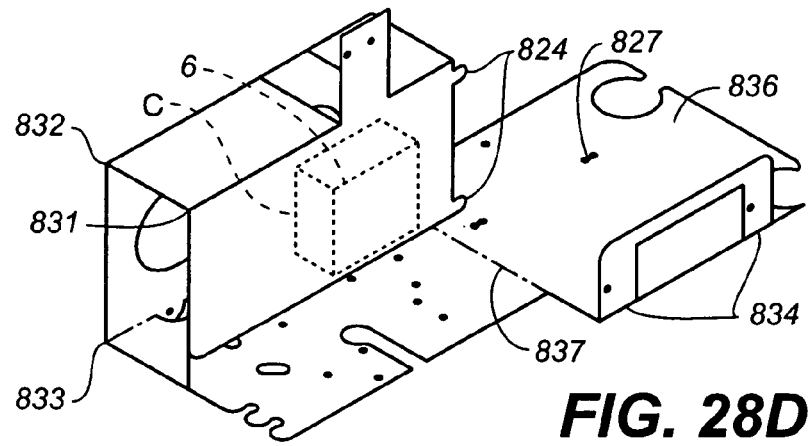
Figure 28E:
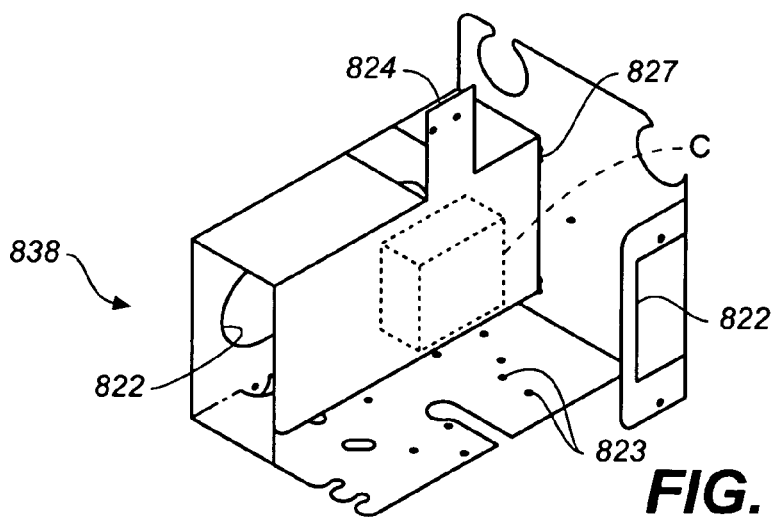

As shown in FIG. 28A, sheet 821 has component C secured thereto before bending, preferably by high-speed robotic techniques. Sheet 821 is formed by laser cutting, water jet cut, die cutting or the like with the designed cutout features 822, component-receiving openings 823, tabs 824 and support flanges 826 and tab-receiving slots 827. In FIG. 28B sheet 821 has been bent along bend line 831, causing a tab 824 to be displaced outwardly. The sheet is next bent along bend line 832 in FIG. 28C and then bent over component C along bend line 833 in FIG. 28D, while side flange 826 has been bent along bend line 834. Finally, chassis end portion 836 is bent upwardly along bend line 837 and tabs 824 are inserted into slots 827 so as to enable rigid securement of the sheet into a three-dimensional electronics chassis 838 around component C.

Obviously, in most cases a plurality of components C would be secured to sheet 821 before bending, and components C also can be secured to chassis 838 at various steps in the bending process and to various surfaces of the chassis.

FIGS. 28A-28E also illustrate a fundamental design process which is implemented by the sheet bending method of the present invention. One of the most space-efficient ways of supporting components is to mount them on sheet stock. Using conventional sheet stock bending techniques, however, does not enable tight bends and intricate inter-leaved sheet portions. The bending process of the present invention does, however, by reason of the ability to lay out slits extremely accurately that will produce bend in precise locations so that openings, cutouts, slots, tabs and the like will precisely align in the bent structure, as well as mounted components and the coupling to other structures.

Moreover, the precise layout of bending lines and chassis or enclosure features is only part of the advantage. The structure itself can be bent using relatively low force, and even by means of hand tools. The combination of precision location of bend lines and low-force bending enables a design technique which was only heretofore partially realized. The technique involves selecting components having the desired functions and positioning them in space in a desired arrangement. Thereafter, a chassis is designed with supporting thin sheet portions of the chassis necessary to support the components as positioned being designed, for example, using CAD techniques. The bend lines are located to produce the supporting sheet portions, and the chassis unfolded graphically to a flat sheet with the necessary feature and fold lines, as shown in FIG. 28A.

While such techniques have been described before in CAD design literature, and CAD and CAM software programs, they have not heretofore been effectively implemented in anything but the most simple designs because precision, low-force bending of sheet metals was not practical. The present slitting-based invention enables practical fabrication of this theoretical CAD or CAM design technique. Prior art CAD or CAM designs could not previously be physically realized in real materials to the same accuracy as the theoretical CAD or CAM model because, for example, conventional bending tolerances could not be held. The precision of bending possible with the present invention dramatically increases the correspondence between the CAD or CAM model and the achievable physical form for bent sheet materials.

Moreover, the bending need not take place at the pick and place or rapid prototyping site. The sheet with attached components can be transported with the components being formed and selected to act as dunnage for the transport process. Once at the fabrication site, which may be remote from the design and cutting site, the chassis or housing sheet will be bent precisely, even by hand if desired, and the bent housing secured into a three-dimensional structure, with a plurality of selected components being secured thereto internally and/or externally.

Moreover, three-dimensional chassis and other structures also can have panels therein which are attached by straps along a bend line to provide doors in the chassis or structure for periodic or emergency access to the interior of the structure. Separate door hinge assemblies are thereby eliminated.

Using the various embodiments of the sheet slitting or grooving techniques described herein, an extremely wide range of products can be formed. Without limitation by enumeration, the following are examples of products which can be folded from sheet material using the slitting and grooving schemes of the present invention: trusses, beams, curved beams, coiled beams, beams within beams, enclosures, polyhedrons, stud walls, beam networks, enveloped beams, flanged beams, indeterminate multiple-piece flanged beams, machines, works of art and sculpture, origami three-dimensional structures, musical instruments, toys, signs, modular connections, packages, pallets, protective enclosures, platforms, bridges, electrical enclosures, RF shield enclosures, EMI shields, microwave guides and ducts. A few examples of such structures are shown in FIGS. 12-30 and 32.

Figure 12:
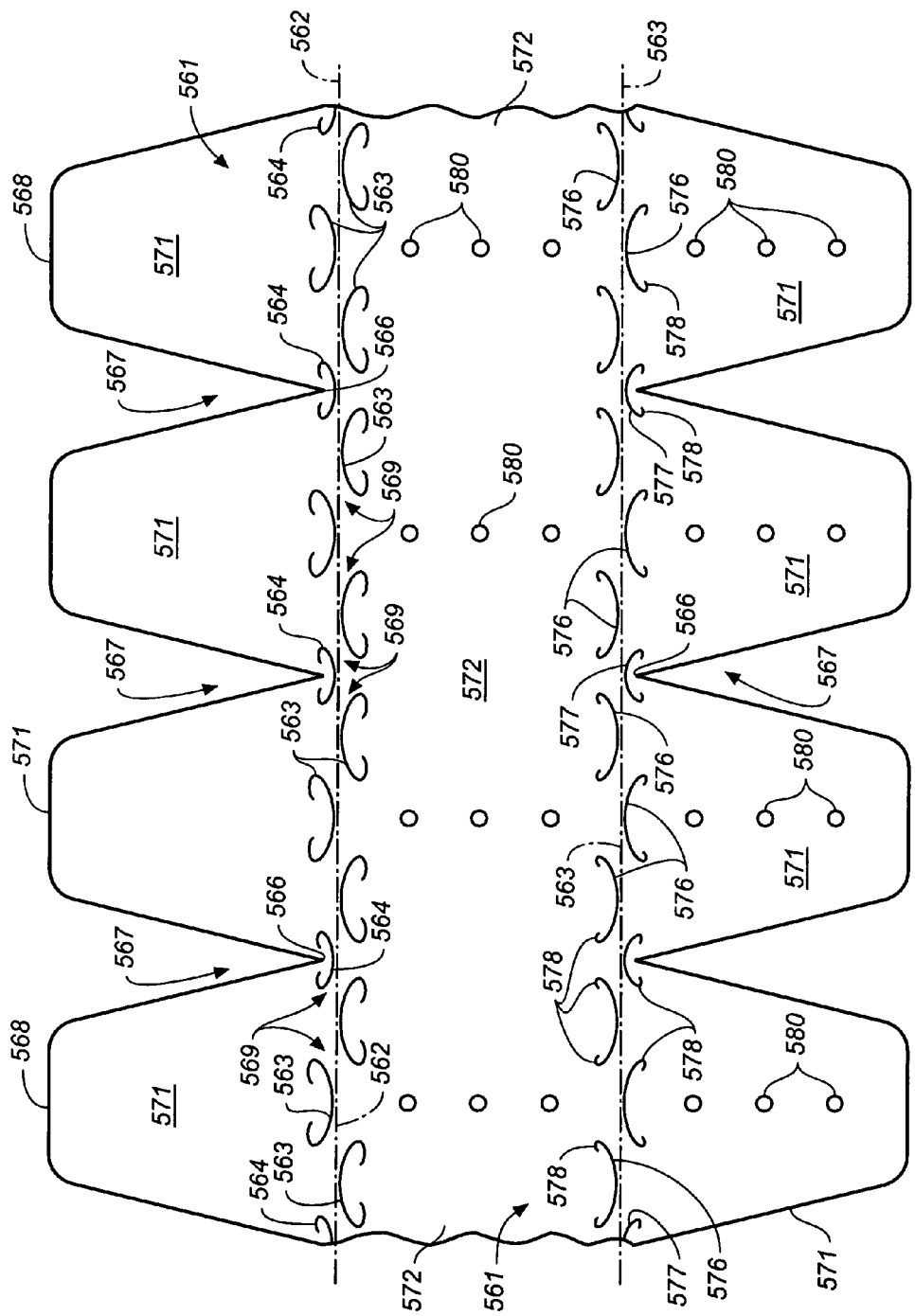
FIG. 12 is a fragmentary, top plan view of one sheet of material before bending and assembly into a curved box beam.

Formation of a curved box beam using the slitting process and slit sheet of the present invention can be described by reference to FIGS. 12, 13 and 14. A sheet of material 561 is shown in FIG. 12 that has two bend lines 562 and 563. Bend line 562 has a plurality of arcuate slits 563 on opposite sides of bend line 562. Also positioned along bend line 562 are smaller arcuate slits 564. The slits 563 and 564 have the general configuration as described and shown in connection with slits 542 in FIG. 11, but the length of slits 564 is reduced relative to the length of slits 563, and slits 564 will be seen to be positioned at the apex 566 of notches 567 which are provided in the edges 568 of the sheet of material. The bending straps 569 defined by longitudinally adjacent end portions of slits 563 and longitudinally adjacent end portions of slits 563 and 564 are essentially the same in configuration, notwithstanding differences in the length of the slits 563 and 564. There will be some slight shape difference due to arcuate segment differences, but bending straps 569 will be essentially uniform in their strength and fatigue-resistant capabilities along the length of bending line 562.

One of the advantages of the placement of slits 564 is that they tend to contain any stress crack propagation, which could occur at apexes 566 of notches 567. The various leaves or fingers 571 defined by notches 567 can be bent, for example, into or out of the page to a 90 degree angle, or to other angles if the structure should require. The central portion 572 can remain in the plane of the sheet on which FIG. 12 is drawn.

A plurality of slits 576 and 577 are positioned along second bending line 563. These slits have much tighter end curve portions 578 than the arc-like slits shown proximate first bend line 562. Generally, the tight curved end portions 578 are not as desirable as the more open-ended portions used in connection with slits 563 and 564. Nevertheless, for ductile materials that do not tend to stress fracture, slits of the type shown for slits 576 and 577 are entirely adequate. Again, the difference between slits 576 and 577 is that the smaller slits have been used at the apexes 566 of notches 567.

Once slit, sheet 561 can be bent along bend line 563 so that the leaves 571 can be bent to an angle such as 90 degrees relative to the central portion 572. It should be noted that normally the slits along bend line 562 and 563 will have the same shape, that is, they will either be slits 563 and 564 or slits 576 and 577. It is possible to mix slit configurations, but normally there will be no advantage from mixing them as shown in FIG. 12. The purpose of the illustrated embodiment of FIG. 12 is to show different slit configurations that are suitable for use in the bending of sheet material in accordance with the present invention.

The design and formation of a curved box beam using two sheets slit, as shown in the flat in FIG. 12, can be described in connection with FIGS. 13 and 14. The design would be accomplished on a CAD or CAM system, as described earlier, and the slits made in sheet 561 identically as laid out in the design process on the CAD, CAM or other systems. A curved box beam, generally designated 581, is shown in which one designed, cut and bent U-shaped sheet 572a is secured to a second designed, cut and bent U-shaped sheet 572b. As will be seen from FIGS. 13 and 14, the fingers or leaves 571a have been folded down over the outside of the fingers or leaves 571b. In both cases, the apexes 566 are closely proximate the fold lines 562a, 563a, 562b and 563b. This placement of the apexes allows bending of the sheet, by permitting notches 567a to have the included angle of the notches increase, while the included angle of notches 567b decrease in the area 582 of the longitudinal bending of beam 581. The central portions 572a and 572b of the sheet material have a thickness that will accommodate bending without buckling, at least in radii that are not extreme.

The folded sheets can be secured together by rivets 583 or other suitable fasteners, adhesives or fastening techniques such as welding and brazing. Openings for the fasteners can be pre-formed as shown in FIG. 12 at 580. The location of the openings 580 can be precisely set if the exact curved configuration is determined or known in advance of bending, or openings 580 can be positioned in central locations and thereafter used with later drilled holes to join the two bent sheets together in a curvature that is indeterminate or established in the field.

One application for indeterminate curved box beams, for example, is in the aircraft industry. Difficult to bend 4041 T-6 or 6061 T-6 aluminum is designed with the desired layout of slits and then provided in completed slit sheets as shown in FIG. 12. The sheets are then formed in the field to provide a box beam having a curvature which is determined in the field, for example, by the curvature of a portion of an airplane which must be repaired. The two sheets that form the box beam are curved to fit under a portion of the skin of the airplane which has been damaged, and then the skin is thereafter attached to the central section 572 of the curved box beam.

Bending of the leaves or fingers 571 can be done with simple hand tools, or even by hand, and field riveting used to hold the curvature of the box beam by using the pre-formed holes 58 as guides for holes that are drilled in the leaves or fingers of the underlying folded sheet. Thus, with a simple hand drill and pliers, a high-strength structural 4041 T-6 aluminum box beam can be custom formed and positioned as an airplane structural component for subsequent fastening of the skin of the airplane thereto. This can enable, for example, field repairs under even combat conditions so that the plane can be flown to a site at which permanent repairs can be made.

When the longitudinally curved box beam has a predetermined or known longitudinal curvature, leaves or fingers 571a and 571b can be defined by notches in which the fingers interdigitate or mesh with each other in the same plane. This will produce beam side walls that are smooth and without openings.

Figure 13:
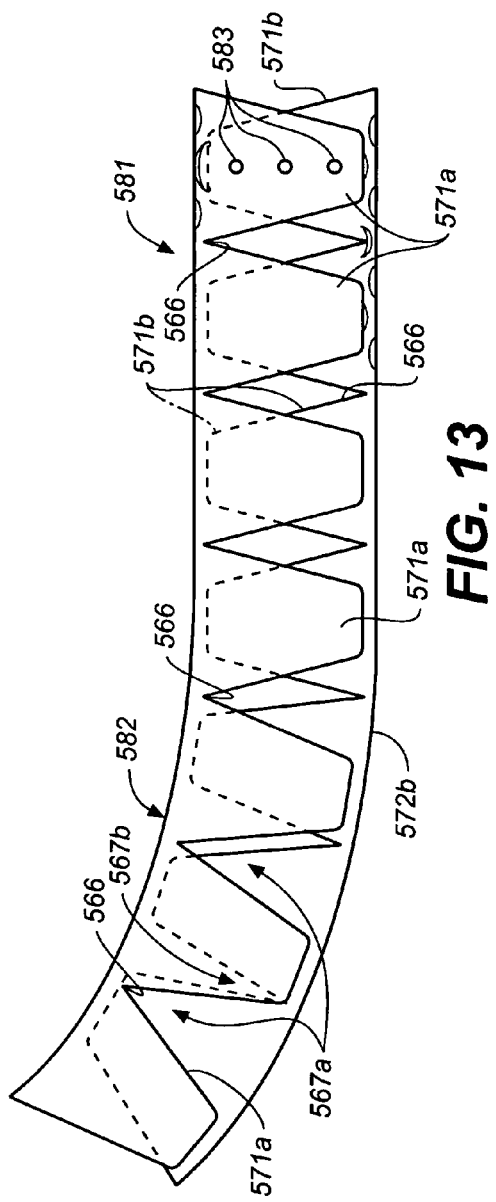
FIG. 13 is a side elevation view of a curved box beam constructed from two sheets of material each being slit as shown in FIG. 12.
Figure 14:
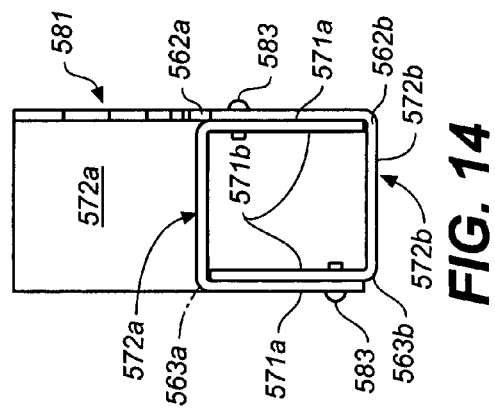
FIG. 14 is an end elevation view of the beam of FIG. 13.

As shown in FIGS. 12-14 a longitudinally curved box beam 681 is produced by bending the sheet material along straight fold lines 562 and 563. It is also possible to produce longitudinally curved box beams by slitting or grooving along curved bend lines.

In addition to the curved beam embodiments described above, other examples of curved structural members are immediately apparent as a result of simply laying out bending strap-defining structures along bend lines having non-linear portions. On folding or bending along such bend lines, or curves, the sheet becomes a curved three-dimensional structure.

Figure 15:
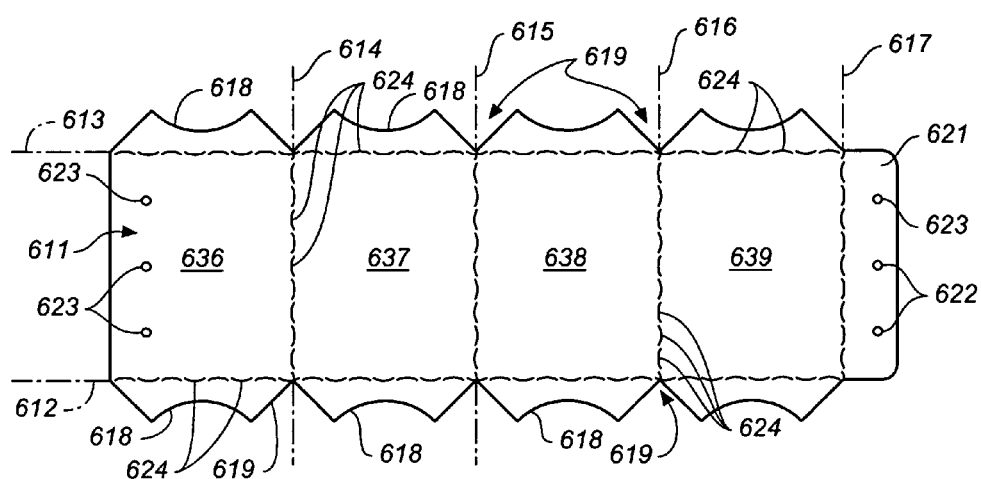
FIG. 15 is a top plan view of a sheet of material formed with strap-defining structures and configured for enclosing a cylindrical member.
Figure 16:
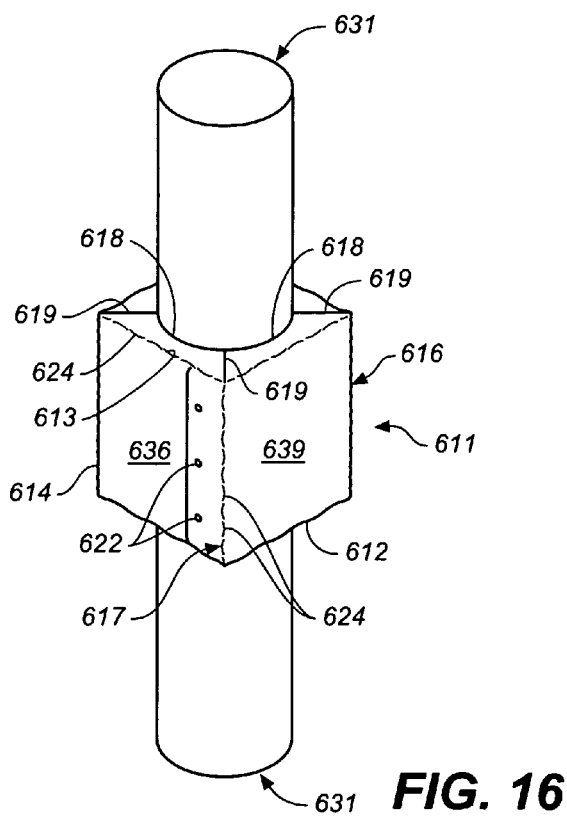
FIG. 16 is a top perspective view of the sheet of material of FIG. 15 as bent along bend lines and mounted to enclose a cylindrical member.

Turning now to FIGS. 15 and 16, a sheet of material designed and slit or grooved for folding and a three-dimensional structure made from the same, respectively, are shown. Sheet 611 has been designed to be slit or grooved along longitudinally extending fold lines 612 and 613. Further slitting and grooving has taken place on transversely extending fold lines 614, 615, 616 and 617. Opposed side edges 618 of sheets 611 are circular, and a plurality of notches 619 are formed in opposite side edges of the sheet. A coupling tab or flange 621 is formed at one end of the sheet and preferably has fastener receiving openings 622 therein which will align with opening 623 in the opposite end of sheet 611. Slits or grooves 624 of the type shown in the embodiment of FIGS. 9 and 10 have been positioned along fold lines 612-617. It will be understood that slits or grooves of the type shown in other embodiments could be employed within the scope of the present invention.

The sheet of material shown in FIG. 15 is designed to envelop or enclose a cylindrical member, such as a rod, post or column 631 shown in FIG. 16. By bending sheets 616 along fold lines 612-617, sheet 611 can be folded around to enclose cylindrical member 631 as shown in FIG. 16. The circular arcuate portion 618 of the sheet are dimensioned to have a radius which mates with that of column 631. Notches 619 close up and the edges defining the notches abut each other, while the fold lines 614-617 allow the sheet to be folded into a square configuration around the column 631. The bent three-dimensional structure which results has a plurality of planar panels 636-639 which provide surfaces against which other members or structures can be easily attached. Folded sheet 611 may be secured in place around column 631 by fasteners through openings 622 and 623. The configuration of the grooves or slits 624 causes the folded sheet 611 to become a high-strength, rigid structure around column or post 631. Securement of folded sheet 611 to post 631 against vertical displacement can be the result of an interference fit between arcuate edges 618 and the post, and/or the use of fasteners, adhesives, welding, brazing or the like, and the assembly has many applications which solve the problem of subsequent coupling of structural members to a cylindrical structure. The example of FIGS. 15 and 16 is not only a potential cosmetic cladding, it is a structural transition piece between cylindrical and rectilinear forms.

Figure 17:
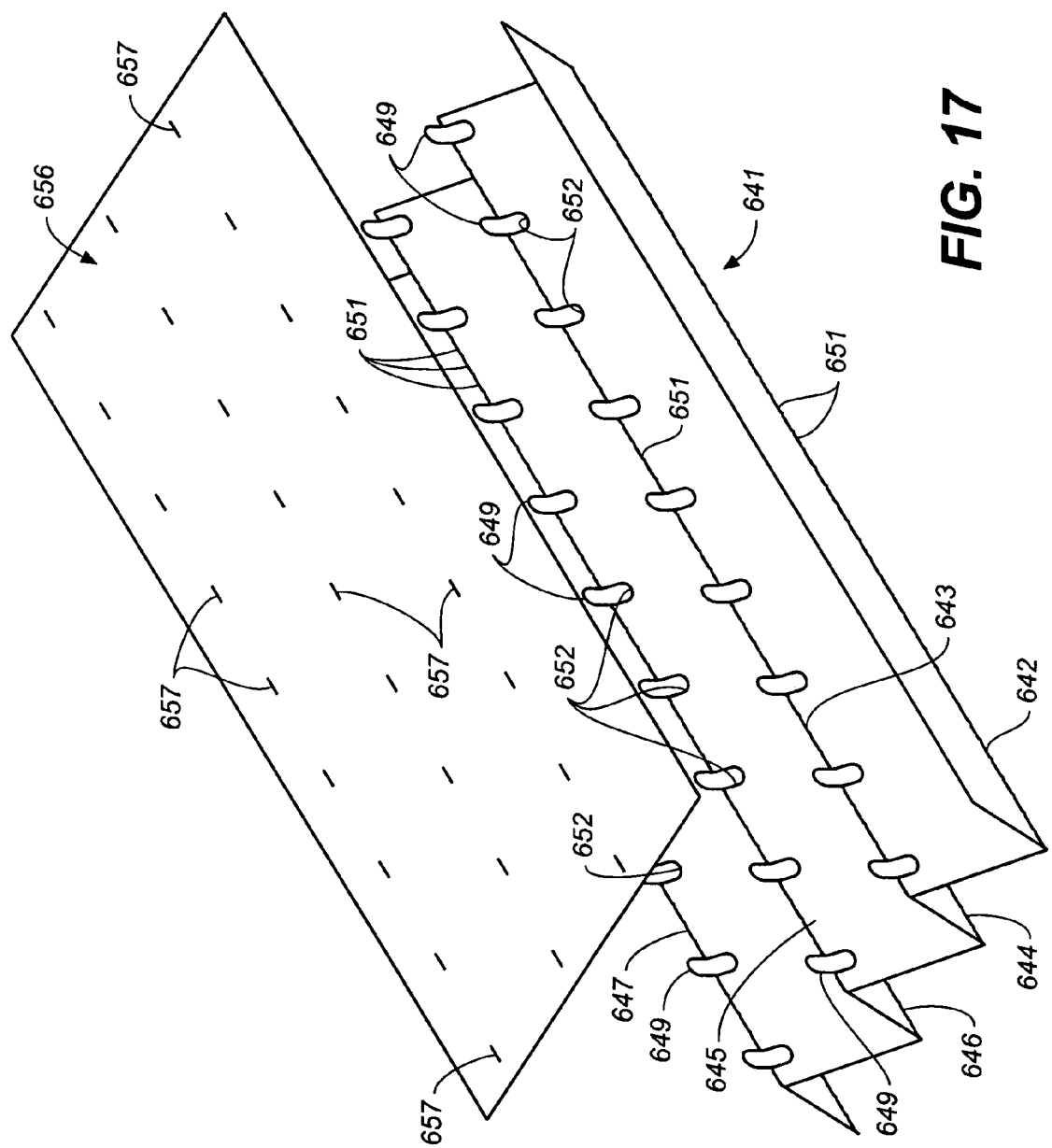
FIG. 17 is a top perspective, exploded view of a corrugated assembly formed using a sheet of material formed in accordance with the present invention.
Figure 18:
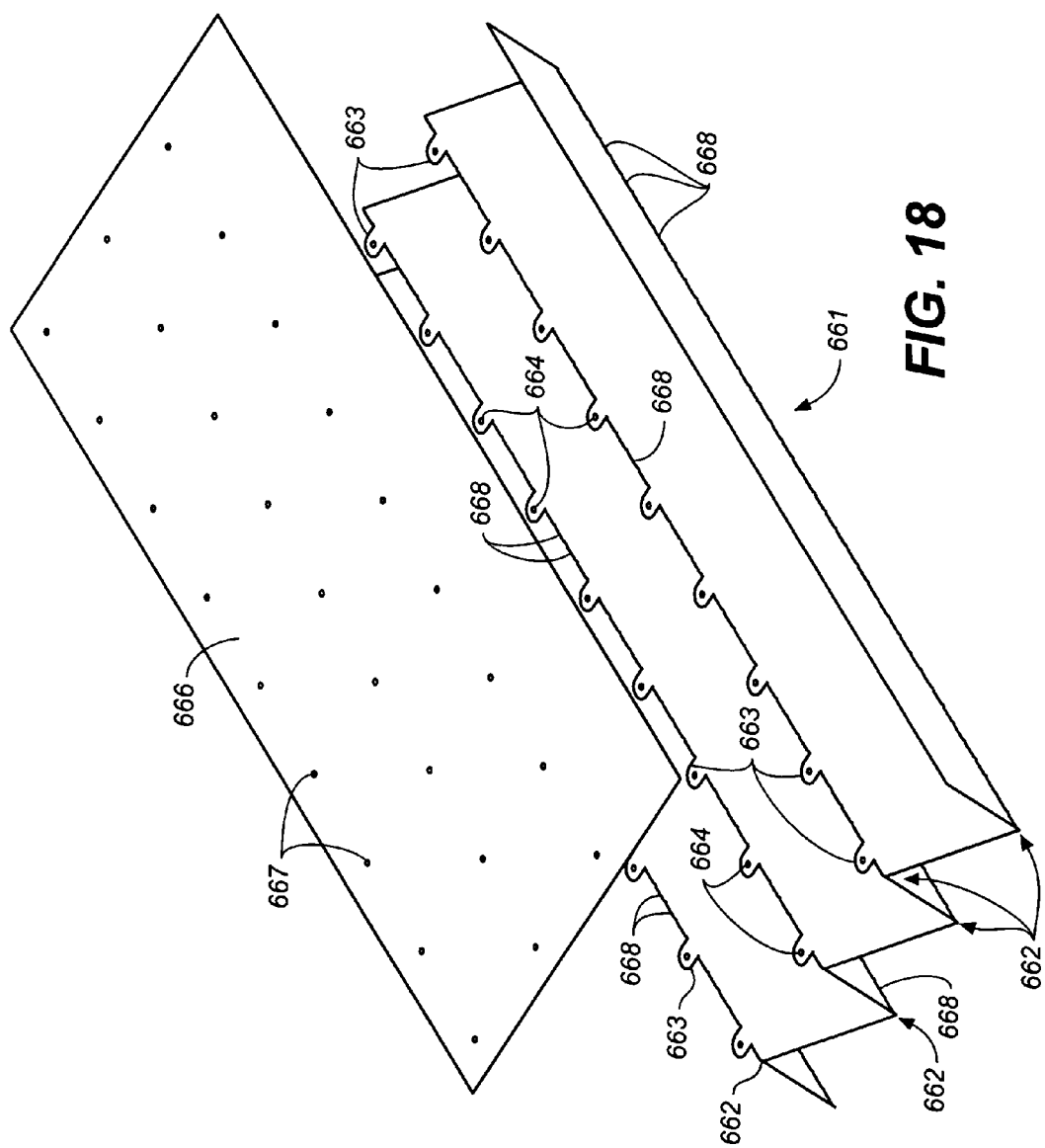
FIG. 18 is a top perspective, exploded view of an alternative embodiment of a sheet of material formed in accordance with the present invention.

The designed and manufactured slit or grooved sheet and method of the present invention also may be used to design and form corrugated panel or deck assemblies. FIGS. 17 and 18 illustrate two corrugated panel assemblies that can be designed and constructed using the apparatus and methods of the present invention. Such assemblies are particularly effective in providing high-strength-to-weight ratios, and the sheet folding techniques of the present invention readily accommodate both folding of the corrugated sheet and the provision of attachment tabs.

In FIG. 17 attachment tabs are provided which can extend through slits to couple the corrugated sheet to the planar sheet, while in FIG. 18 tabs having fastener receiving openings are provided.

In FIG. 17, a sheet of material 641 has been slit or grooved along longitudinally extending fold lines 642-647 in accordance with the teaching of the present invention. Additionally, a plurality of tabs 649 have been formed along fold line 643, 645 and 647. Tabs 649 are cut in sheet 641 at the same time as formation of the slits or grooves 651 along the fold lines. Thus, a U-shaped cut 652 is formed in sheet 641 so that when the sheet is folded to the corrugated condition shown in FIG. 17, the tabs will protrude upwardly. Tabs 649 will extend at an angle from the vertical when folding occurs to form the corrugations, but tabs 649 can be bent from an angled position to a near vertical position, as shown in 617, by a subsequent step.

The folded or corrugated sheet 641 shown in FIG. 17 can be attached to a second planar sheet 656 which has a plurality of slits 657 formed therein. Slits 657 are positioned and dimensioned to matingly receive tabs 649 therethrough. When sheet 656 is lowered down over corrugated folded sheet 641, tabs 649 will extend up through slits 657. Tabs 649 can be in interference fit with slits 657 to secure the sheets together, or tabs 649 can be bent to a horizontal position or twisted about a vertical axis to secure the two sheets together. Tab 649 also may be bent down and secured to sheet 656 by adhesives, welding, brazing or the like.

Optionally, a second sheet of material, not shown, can be attached to the lower side of folded or corrugated sheet 641 using tabs (also not shown) which are formed out of sheet 641 during the slitting or grooving process. The second sheet would be secured to the bottom of folded corrugated sheet 641 in a manner described in connection with sheet 656.

The result is a high-strength, fatigue-resistant and lightweight corrugated panel or deck assembly which can be used in numerous applications.

A corrugated panel assembly similar to FIG. 17 can be constructed as shown in connection with the assembly of FIG. 18. Folded corrugated sheet 661 includes a plurality of fold lines 662 and a plurality of tabs 663. Tabs 663 are formed from sheet 661 in a manner similar to that described in connection with tab 649, only tabs 663 include fastener receiving openings 664. Additionally, tabs 663 are folded down to a near horizontal position, rather than up to a near vertical position, as described in connection with tabs 649. In the horizontal position, tab 663 can be used to couple a second sheet of material 666 having fastener receiving openings 667 therein. Sheet 666 is positioned so that opening 667 align with opening 664, and fasteners are used to secure the two sheets together. As described in connection with FIG. 17, a third sheet can be secured to the bottom of the corrugated sheet 666, although the figure does not show the securement tabs 664 on the bottom side of the corrugated sheet 61.

Again, by employing a plurality of grooves or slits 668 formed in accordance with the present invention, as above described, a corrugated deck or panel assembly can be fabricated which is very high in strength, has good fatigue resistance and is lightweight.

FIGS. 19-22 illustrate a further embodiment of a continuous corrugated panel or deck which can be formed using the slit sheet and method of the present invention. Moreover, the panel of FIGS. 19-22 illustrates the strength advantages which can be obtained by reason of the ability to make sharp bends or folds that have significant load carrying capabilities. Still further, the embodiment of FIGS. 19-22 illustrates the use of tabs to interlock a folded sheet into a high strength three-dimensional structure.

Prior art techniques forming corrugated panels or decks often have suffered from an inability to achieve a desired high level or percentage of chord material to the overall panel material. Generally, the purpose of the webbing is to separate the chords with the minimal web mass required to accomplish that task. I-beams are rolled or welded forms that use thicker top and bottom chords relative to the connecting web between them. The present invention enables a class of corrugated structures that provide for wide design flexibility in creating rigid, strong, low weight structures that can be manufactured from continuous coils, transported in a compact coil form, and easily formed on site. The interlocking nature of this enabled embodiment avoids welding at the corners where welding is especially subject to failure.

Figure 19:
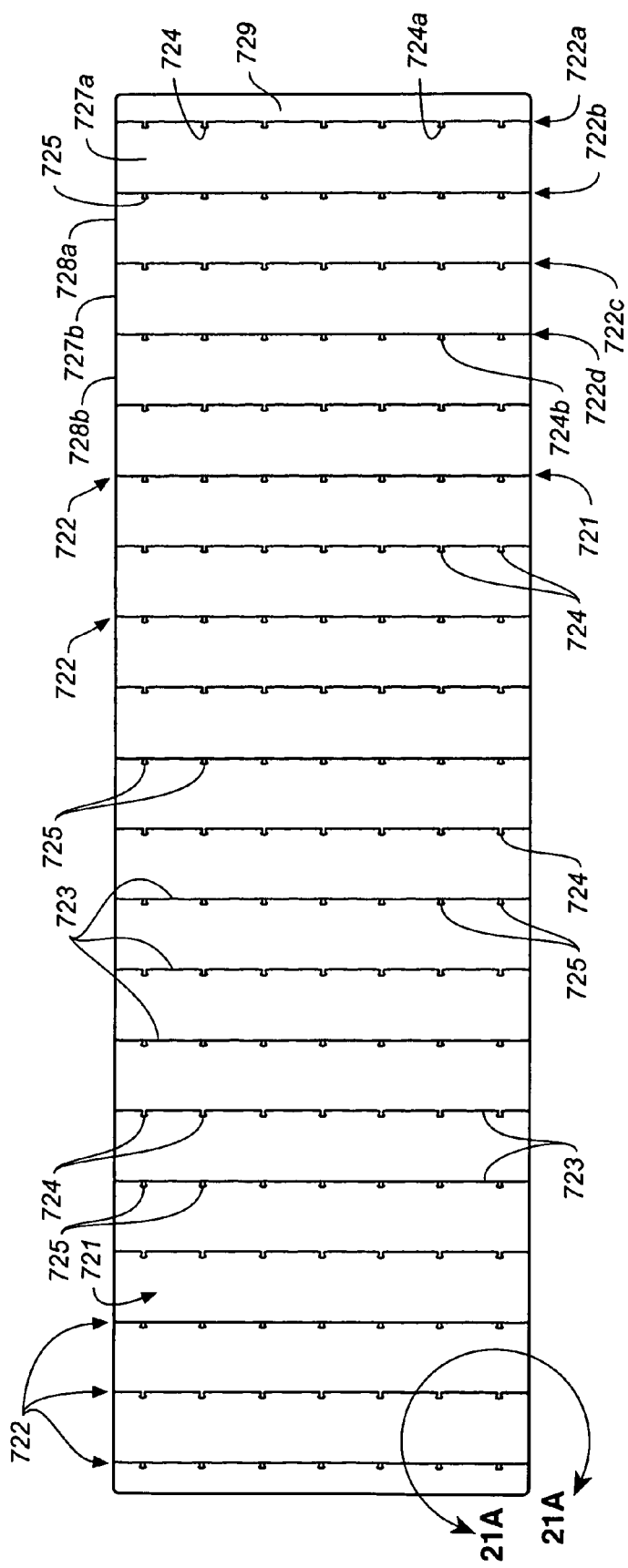
FIG. 19 is a top plan view of the slit sheet used to construct an alternative embodiment of a corrugated deck prior to bending or folding.

Sheet material 721 has been slit using the present invention and is shown in FIG. 19 in a flat state before bending or folding. As will be seen, a plurality of substantially parallel bend lines 722 have a pattern of alternating arcuate slits 723 positioned on opposite sides of the bend lines to define obliquely extending straps skewed in opposite directions. Slits 723 can take the form of the slits in FIGS. 6 or 9, for example. Also formed in sheet 721 are a plurality of tabs 724 which extend outwardly of the tongue portions of slits 723, and a plurality of key-hole like openings 725. Openings 725 are positioned in aligned relation to tabs 724.

Figure 21:
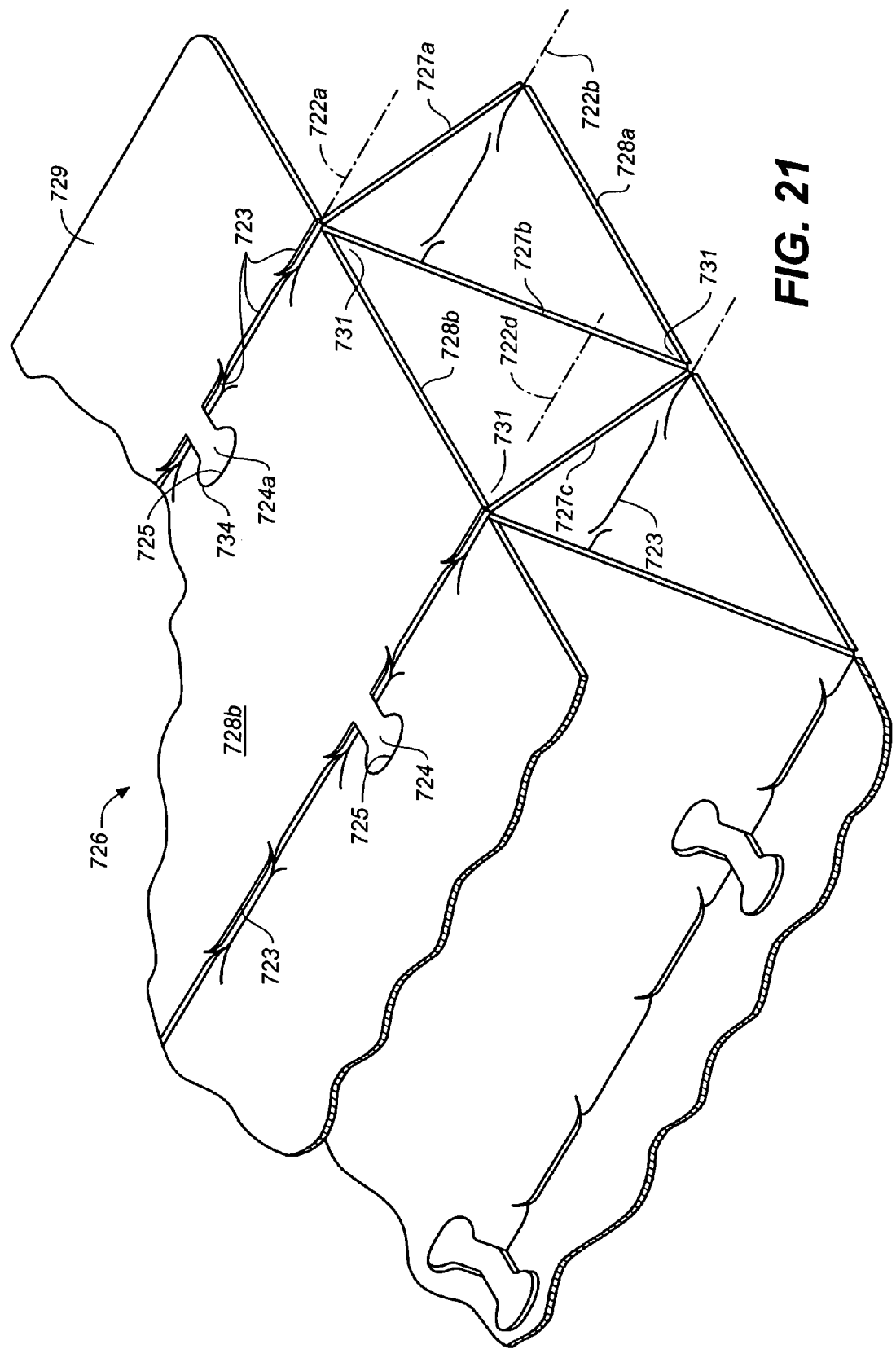
FIG. 21 is an enlarged, fragmentary perspective view substantially bounded by line 21-21 in FIG. 20.
Figure 21A:
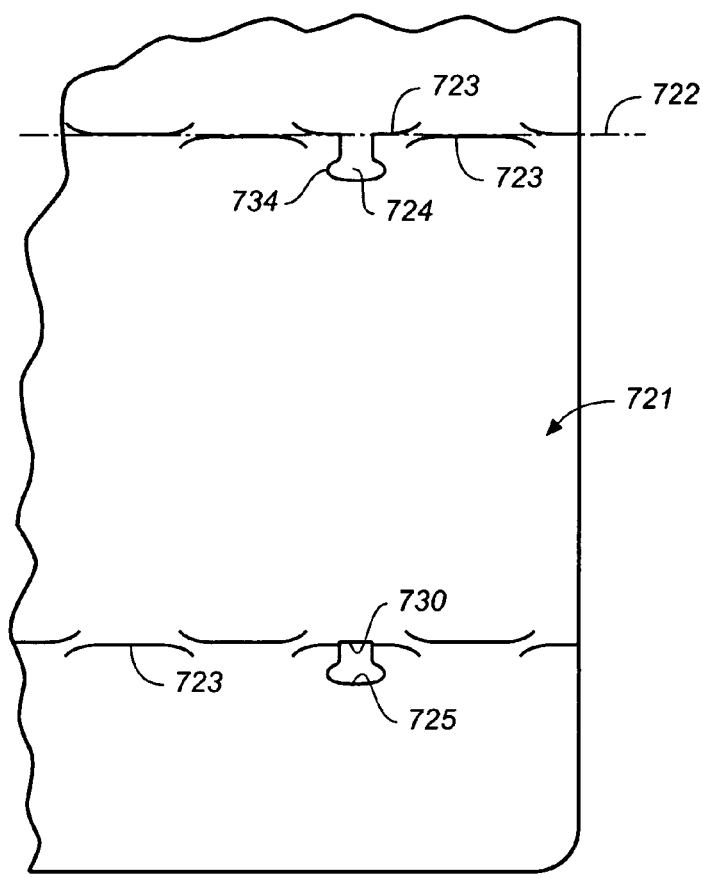
FIG. 21A is an enlarged, fragmentary, top plan view substantially bounded by line 21A-21A in FIG. 19.

In FIG. 21A tabs 724 will be seen to extend across bend line 722 from slits 723. Tabs 724 are, therefore extensions of the tongue side of slits 723. Key hole openings 725 is a cut-out or negative tab in the tongue side of slits 723 which have a configuration dimensioned to receive tabs 724. In order to prevent the neck of tabs 724 from being interfered with by the upwardly displaced face on the opposite side of the slits, a notch 730 is provided in the lip side of the slits 723. Thus, the entire area of 725 and 730 is cut and falls out or is removed from the sheet so that tabs 724 can be inserted into notches 725/730.

Figure 20:
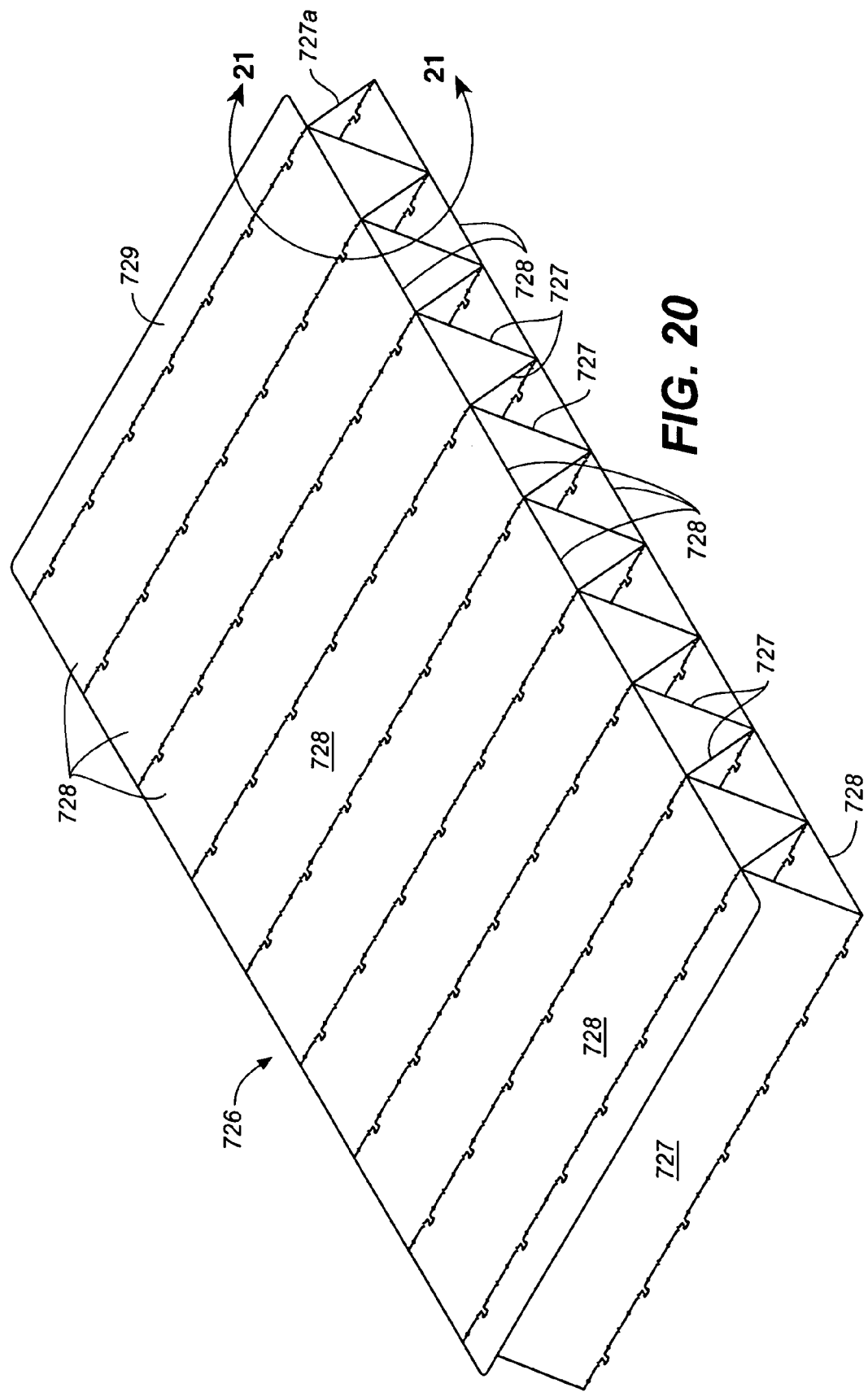
FIG. 20 is a top perspective view of a corrugated sheet or deck constructed using the slit sheet material of FIG. 19.

In FIG. 20 the flat sheet 721 of FIG. 19 has been folded into a continuous corrugated panel or deck 726. Panel 726 includes web portions 727 and chord portions 728. As will be seen in panel 726, chords 728 are in end-to-end abutting relation over the full length of the panel on both the upper side and the lower side of the panel to provide continuous deck or chord surfaces. This construction affords panel 726 greatly enhanced strength, for example, in bending, over panels in which all the transverse webs are not joined by chords on both the top and bottom side of the panel. The deck or panel can be further reinforced by adding a sheet of additional material (not shown) which would further improve the ratio of chord material mass to the mass of the entire deck or panel for superior strength/stiffness-to-weight ratio.

FIG. 21 illustrates in greater detail the bending or folding scheme employed for panel 726. Commencing, for example, with end flange 729, web 727a can be bent down and back at bend line 722a down to a lower side of the panel. Sheet material 721 is then bent forward at bend line 722b and chord 728a extends in a longitudinal direction of the panel parallel to flange 729. At bend line 722c web 727b is bent to extend up and back to bend line 722a, at which point chord 728b is bent forward and extends to bend line 722b. Web 727 is then bent back at bend line 722d to bend line 722c. The bending continues along the length of panel 726 so as to produce a folded corrugated panel in which there are a plurality of end-to-end chords on both the top and bottom of the panel which are separated by connecting webs. The mass of the chord material in the panel to the overall panel mass is relatively high for a high strength-to-weight ratio.

The ability to fold a sheet 721 in sharp or crisp folds using the slitting process of the present invention allows the apexes 731 between the webs 727 and chords 728 to be relatively sharp and to be positioned in close, abutting relation. As illustrated, the panel of FIGS. 19-21 has webs and chords of equal length creating equilateral triangles in which each apex is about 120 degrees. As will be understood, many other corrugation geometries are equally possible.

While there are numerous ways in which folded panel 726 can be secured in a three-dimensional configuration, a preferred method is to employ tabs 724 and mating keyhole openings 725 cut into sheet 721 during formation of the bending slits.

Tabs 724a, for example, are provided by laser or water jet cutting of the tabs to extend outwardly of slit tongues from flange 729 into web 727a. When web 727a is bent downwardly and rearwardly to bend line 722b, tabs 724a remain in the horizontal plane of flange 729. As best seen in FIG. 21A, a mating opening 725 cut into chord 728b and aligned with tab 724a will allow tab 724a to be positioned in opening 725. If each tab 724 has an enlarged head or end 734, the tabs will lock or be captured by their mating openings 725, much as a jigsaw piece can capture or interlock with an adjacent piece. This interlocking resists separation of the tabs from the mating openings in the top and bottom planes of the panel. The tabs and openings do not need to be, and preferably are not, dimensioned to produce an interference fit.

Interlocking of tabs 724 and openings 725 also occurs along the bottom side of panel 726, and the result is securement of the folded panel in the form as shown in FIG. 20, even without additional securement techniques, such as adhesives, welding, brazing or the like, which optionally also can be used.

Figure 22:
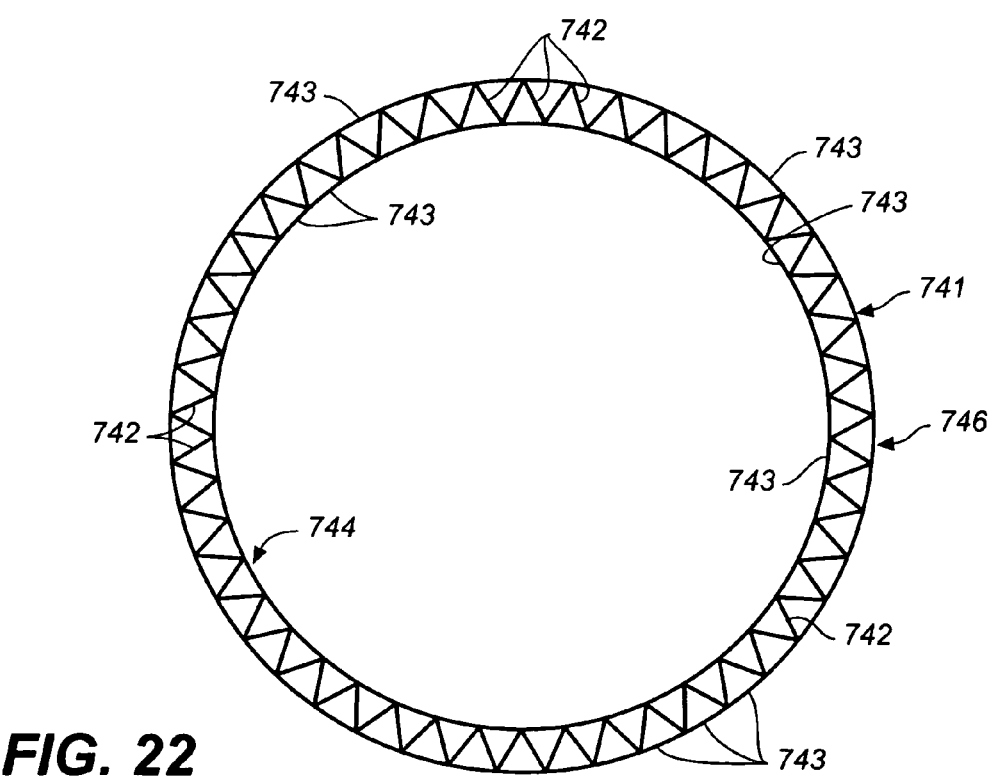
FIG. 22 is a schematic, end elevation view of a cylindrical member constructed using a corrugated sheet similar to that of FIGS. 19 and 20, scaled to define a cylindrical form.

In FIG. 22, the sheet slitting and bending process of FIGS. 19-21 is schematically shown as applied to the formation of a cylindrical member 741. Again, webs 742 and chords 743 are formed about bend lines and the locations of the bend lines selected so that the chords on the inner radius 744 are shorter in their length than the chords on the outer radius 746 of cylinder 741. Tabs and mating opening may be used to lock the chords and webs in the desired configuration, depending on the thickness of the material and the radii of cylinder 741. The resulting cylindrical structure can be used, for example, as a lightweight, high-strength column or post.

Figure 23:
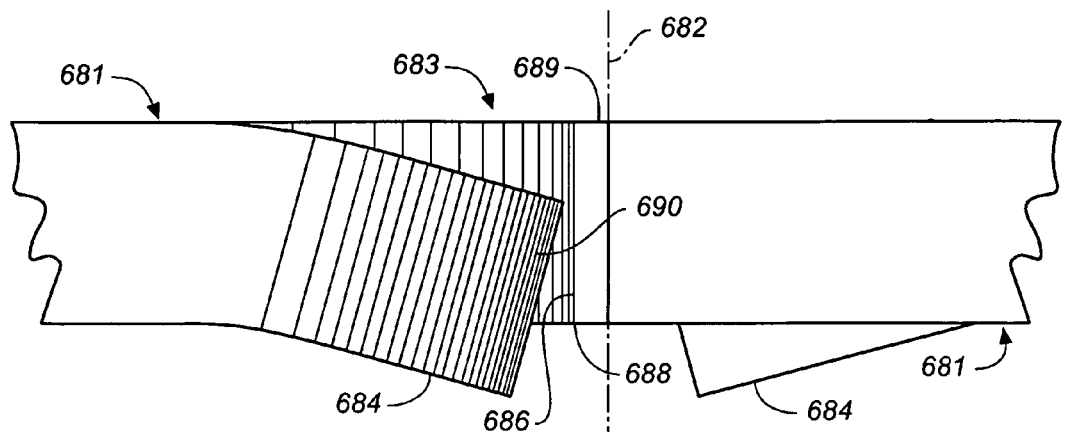
FIG. 23 is an enlarged, fragmentary, side elevation view of a sheet of material slit in accordance with the present invention and having a tongue or tab displaced to ensure predictable bending.

In most embodiments of the present invention, and particularly those in which the sheet of material has a substantial thickness, commencement of bending will automatically cause the tongue or tab portion of the slit to begin to slide in the correct direction against the face on the opposite side of the slit. When the sheet material is relatively thin and the kerf of the slit is small or zero, however the tab portions of the slit sheet occasionally will move in the wrong direction and thereby effect the precision of the bend. In order to remedy this problem, it is possible for the tongue portion of the slit to be biased in a direction producing predictable proper bending. This solution is shown in FIGS. 23 and 24A.

A sheet of material 681 is formed for bending about a plane of bend line 682 using the design and sheet slitting technique of the present invention. Arcuate slits 683 are formed which define tongues 684 that will slide along opposing faces during bending of the sheet about bend line 682.

Figure 23A:
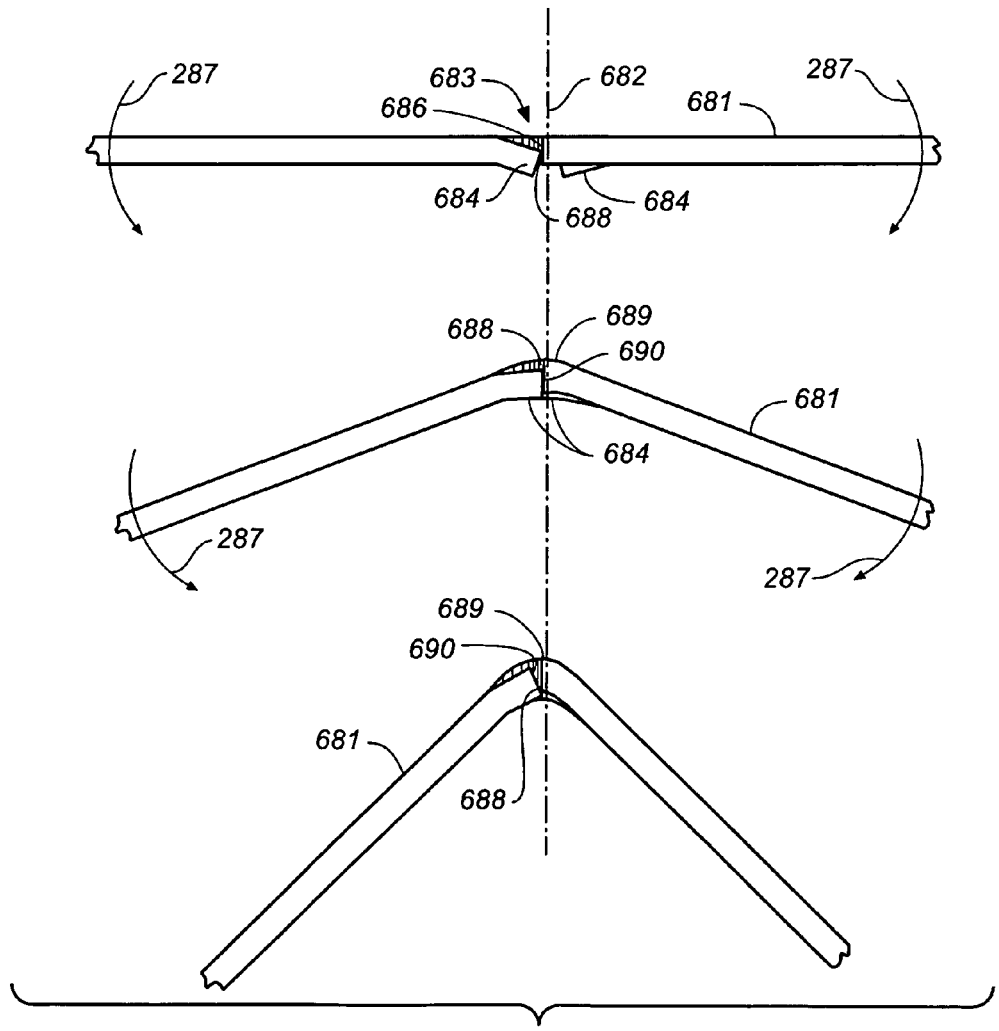
FIG. 23A is a reduced, end elevation view of the sheet of FIG. 23 during bending.

In FIG. 23a, sheet of material 681 can be seen as it is being bent in a downward direction, as indicated by arrows 687, about bend line 682. Because tongues 684 are downwardly displaced, the lower edges or corners 688 of lips 689 will tuck up and engage faces 690 of tongues in a manner which will produce sliding of edges 688 along faces 690. The edges 688 on each side of bend line 682 will be displaced upwardly to slide on the downwardly pre-set tongues 684 so that bending about bend line 682 predictably produces sliding of the edges along the faces of the tongues in the desired direction during the bending process.

When sheet 681 is formed for bending using, for example, a stamping process in which a knife forms slit 683, the stamping die can also plastically deform tongues 684 in a downward direction on side of the bend line. Predictable sliding of edge 688 along face 690 in the proper direction will occur during bending so that the actual fulcrums on opposite sides of the bend line will produce precise bending along the virtual fulcrum aligned with bend line 682. The displaced tongues also will cue an operator as to the proper direction for bending.

Figure 24:
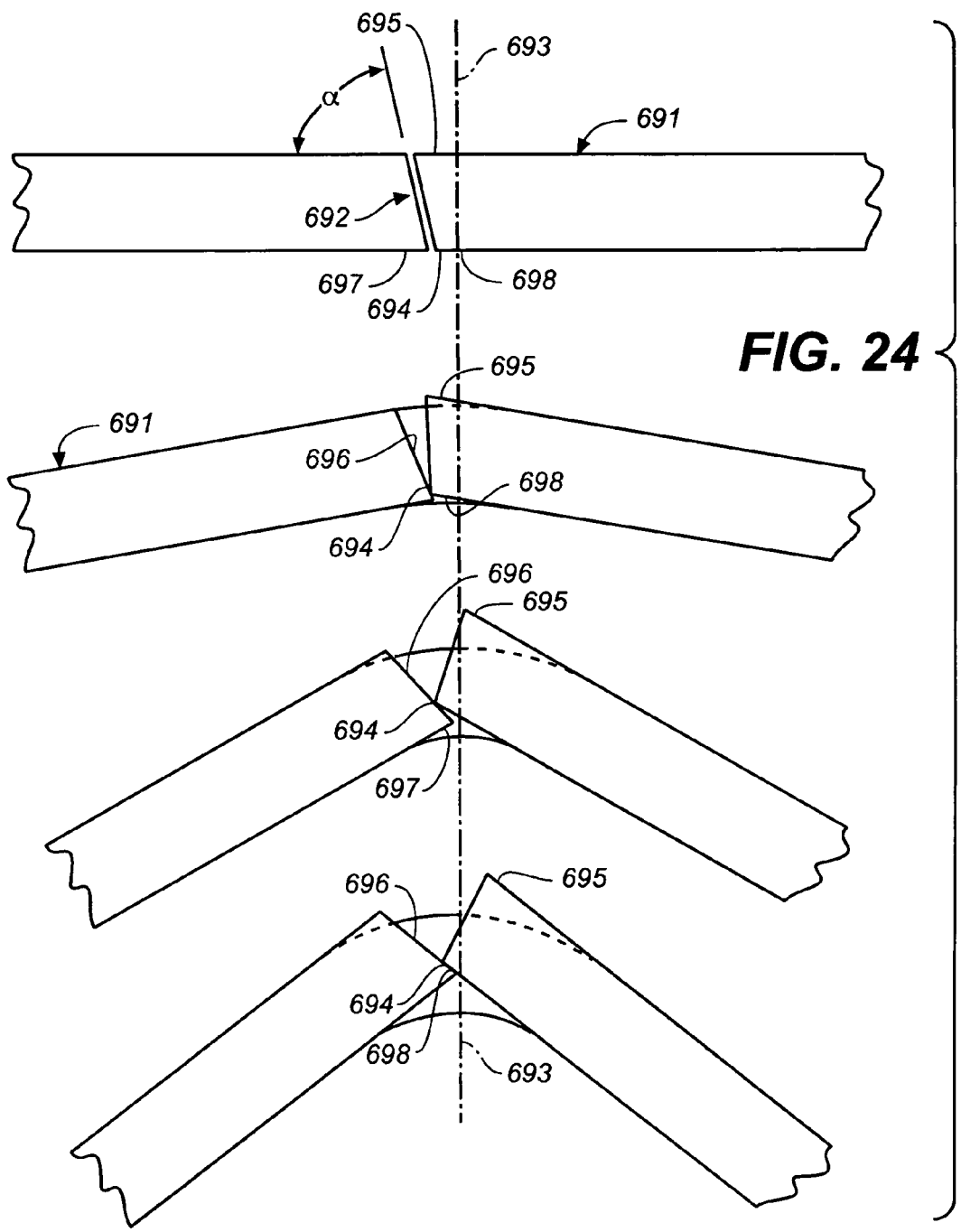
FIG. 24 is a fragmentary, end elevation view of a sheet of material slit at an oblique angle to the plane of the sheet and shown during bending a to a complimentary angle.

While many applications of the present invention will call for 90 degree bends, some will call for bends at other angles. The apparatus and method of the present invention can accommodate such bends while still maintaining the advantages of full edge-to-face contact. In FIG. 24, a bend of about 75 degrees is illustrated.

As shown, a sheet of material 691 is formed with a slit 692 which is cut at an angle of α of about 75 degrees to the plane of sheet 691. (A corresponding slit on the other side of bend line 693 also cut at 75 degrees but skewed in the opposite direction is not shown for simplicity of illustration.) Upon bending downwardly, lower edge 694 of lip 695 tucks onto and slides up face 696 of tongue 697. Once the bend reaches 105 degrees, or the complimentary angle to slit angle α, the lower surface 698 of the sheet proximate edge 694 will be coplanar with and evenly supported on face 696 of the tongue.

Today most commercial laser cutters with power capable of cutting both plastics and metals are sheet fed. There is, however, supply-roll fed laser cutting equipment commercially available, but such equipment that exists today does not roll the cut material back into a coil. Thus, reel-to-reel laser cutting equipment is not in use or commercially available.

The advantage of roll fed cutting combined with a coil mechanism, in the context of the present invention, is that very large or very complex, information-rich structures can be designed in CAD, cut, and then these pre-engineered structures can be recoiled into a compact form. Once in the coiled, compact form, they may be transported more conveniently, for example, on a flat-bed truck or rail car or launched into outer space. Upon arrival at the location of use, the material is uncoiled and bent or folded along the bend lines dictated and structurally supported by the arcuate slits and oblique straps cut into the metallic or plastic sheet.

The sheet slitting or grooving apparatus and method of the present invention can be incorporated into a reel-to-reel process in at least three ways. Widely available throughout industry are flat-bed laser cutters of many types. The first approach uses a coil on one end of a flat-bed laser cutter, the laser cutter in the middle and a winding roll for reforming a coil of partially cut material. The material is advanced through the system by hand and pin or edge-notch registration features are cut into the flattened sheet. The sheet is aligned in both X and Y axis by physically docking the cut features with a jig attached to the laser cutter bed. In this way, piece-wise advancement can occur including the alignment of slit-assisted bending features of the present invention. The novelty is in the combination of the registration system with the uncoiling and coiling of material-together with the application of cut bend-producing features of the present invention that enable low-force, precisely located, high strength bent or folded structures.

A second approach is to advance a coil through a laser cutter using the well-known technique of a power unwind, stop, cut and power rewind.

Figure 25:
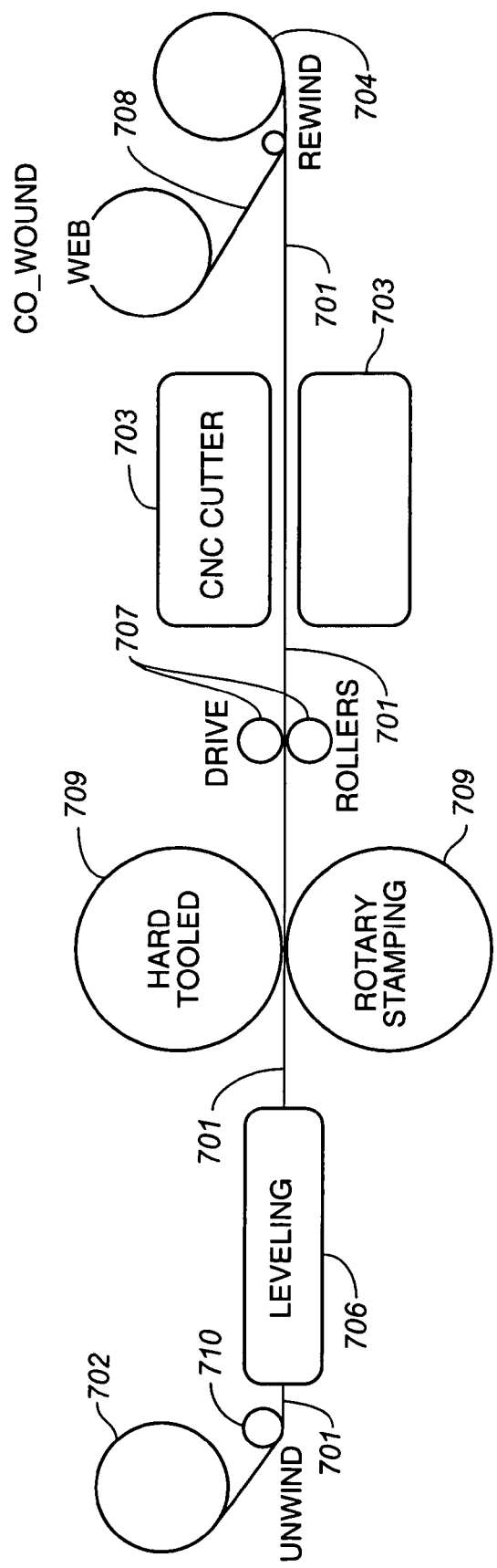
FIG. 25 is a side elevation, schematic representation of a reel-to-reel sheet slitting line arranged in accordance with the present invention.

A third approach is shown in FIG. 25. It employs a smooth, continuous web transport, with both unwind and rewind. Sheet material 701 is unwound from supply coil 702, and the motion and/or optics of the CNC cutter 703 is controlled to compensate for the rolling frame of material 701. CNC cutter 703 can be a laser cutter or a water jet cutter formed and controlled to cut the desired slit patterns into sheet 701. After cutting, sheet 701 is wound onto coil 704.

Since coiled sheet stock often will have a coil-set curl, the use of a leveling step or leveling apparatus 706 after unwinding coil 702 is an option. Sheet stock 701 can be driven through the processing line by pinch rollers 707 and drive motors at coils 702 and 704 and additionally at roller 710.

One reason that reel-to-reel processing has not been previously used is that the edges or contours of the cut-out features tend to interlock and snag as successive layers are would up on coil 704, particularly when the low-force slit-assisted bend features of the present invention enable a foldable tab or flap. The very act of recoiling material 701 will tend to make the cut tabs or flaps extend tangentially to the winding coil. Two methods can be used to address this issue. One is the use of thin, easily removed hang-tabs in combination with rewinding a coil of metal and other rigid materials that have these low-force folding features of the present invention that tend to extend from the rewound coil tangentially. A second method is shown in FIG. 25, namely, to co-wind a polymer web 708 onto coil 704. Web 708 should be tough and not easily punctured, yet thin in gage. Polypropylene and polyethylene are but two useful examples.

One technique for increasing the throughput of reel-to-reel processing systems is the use of laser cutter 703 having multiple laser beams for cutting the slit-assisted, low-force bend features of the present invention. Foldable box beams, such as is shown in FIG. 12, need several bend-assisting arcuate slits that are arranged parallel to the coil's winding direction, about a desired bend line. Multiple fiber lasers, for example, that are linked together mechanically and whose motion controller is a single, joined, mechanical system, with a single motion controller, can produce all of the parallel bends at the same time, while other lasers with independent motion actuation systems and motion controllers can produce all other cut features, such as the notched edges.

The methods and apparatus of the three reel-to-reel processing systems described above, combined with the low bending-force, high strength bend features of the present invention, enable a class of products, from beams, to ladders, to building stud and joist systems, to be formed, coiled, subsequently uncoiled and folded into deterministic dimensions of impressive structural integrity, when and where they are needed after compact storage or transport in coiled form. This technique has applications in space, in the military, in commercial and residential construction and many other industries where the costs and effort of getting materials to a site are prohibitively expensive and difficult when parts are already in an assembled state.

Optionally the reel-to-reel processing line of FIG. 25 can also include a pair of hard-tooled die cutters 709. Using male and female stamping shapes to stamp out the arcuate slits and drop-out features, the die cutters also can be plates and apply incremental material handling techniques, but most preferably, they are hard tooled rotary dies 709.

The advantage of the CNC cutting approach to fabricating coil-wound engineered folding structures is that non-repetitive features are easily programmed into the cutting process. The advantage of the hard tooled stamping or rotary die cutting approach, whether intermittent or continuous, is that repetitive features, especially the arcuate slits, can be efficiently made.

The greatest benefits of maximum throughput and flexibility may be advisable using CNC cutting in combination with the hard-tooled stamping/die cutting to yield an inline system with both forming steps located between the unwinding and rewinding steps of the process. In the combined system, such as shown in FIG. 25, each forming tool operates to its own advantage.

FIG. 25 illustrates a method can be used to form three-dimensional structures for use particularly at locations remote of the location at which the structure is slit and/or partially assembled prior to bending. One application is of particular interest is the fabrication of three-dimensional structures in outer space. Currently such structures are assembled in outer space from three-dimensional modules; they generally are not actually fabricated in outer space. The problem with space assembly is that the modules require an undesirable amount of volume in the payload of orbital space vehicles. Heretofore, one problem with fabrication in outer space has been that the tools required to form high-strength, three-dimensional structures have been prohibitively large and bulky. Another problem with assembly in space can be associated with a high part count and high fastener count. On the one hand, bulky near complete modules have been launched and fastened together. On the other hand, heretofore, dense packing of unassembled modules has resulted in a high part count and high fastener count.

Figure 26:
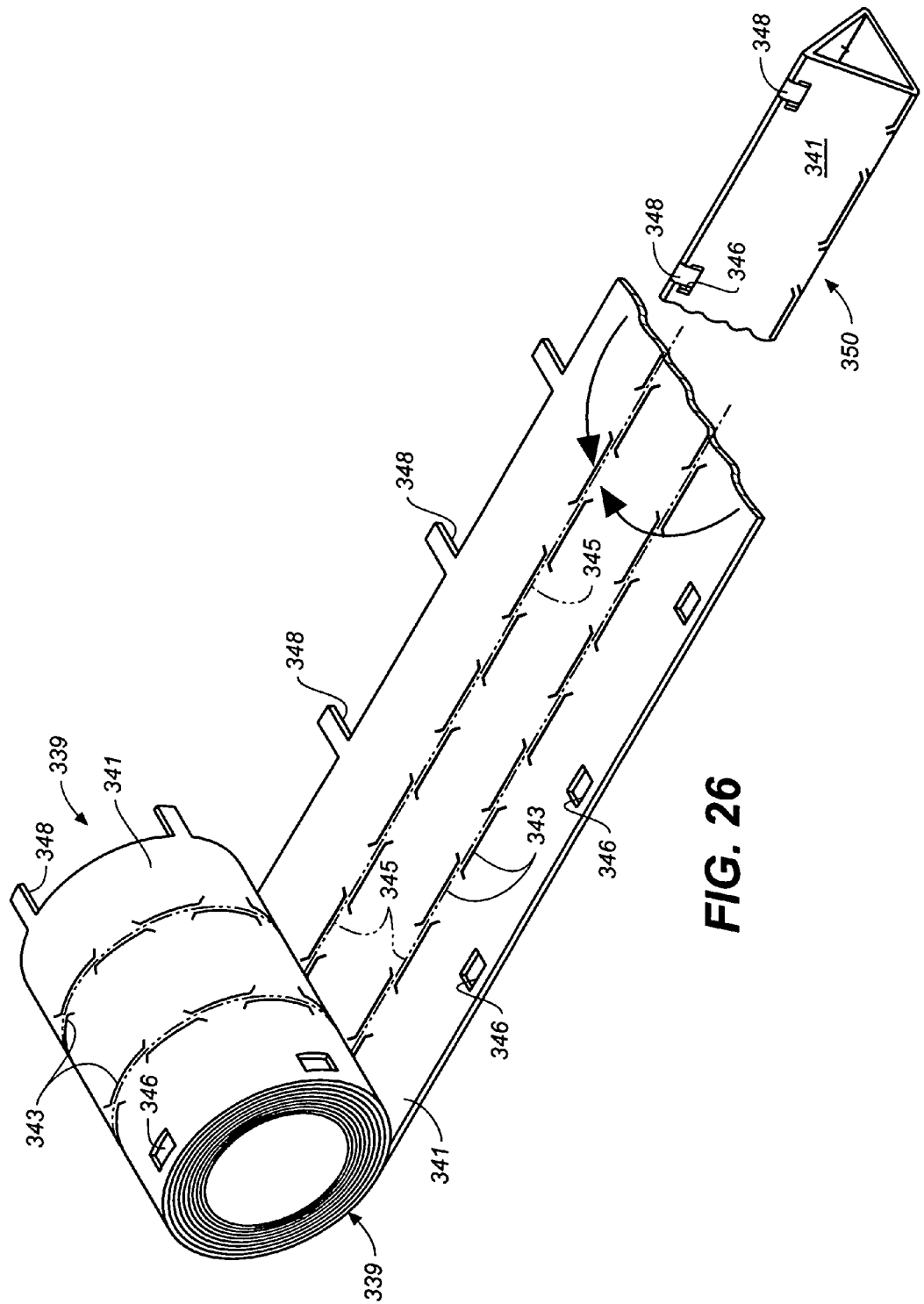
FIG. 26 is a top perspective view of a coiled sheet of material which has been slit, for example, using the apparatus of FIG. 25 and is in the process of being rolled out and bent into a three-dimensional structure.

In FIG. 26, a coil 339 of sheet material 341 is shown which has been designed and provided with slits or grooved on two bend lines 345. Sheet 341 is also formed with openings 346 and tabs 348 periodically positioned proximate opposed sheet edges. As will be seen, slits 343 may advantageously take the configuration as shown in FIG. 6. As will be appreciated, coil 339 is a highly compact configuration for the transport of sheet material. Sheet 341 can be formed with slits 243, openings 346 and tabs 348, as well as other desired structural features, at an earth-bound shop having unlimited fabrication equipment, for example, using the reel-to-reel processing line of FIG. 25. The coiled sheet is next transported by a space vehicle to an outer space location. Sheet 341 can then be unrolled from coil 339, and either, while being unrolled, or thereafter, the sheet can be fabricated, using hand tools or moderately powered tools, into a three-dimensional structure. Such fabrication is accomplished by bending the sheet along bend lines 345 and by bending tabs 348 into openings 346 so as to lock the sheet in a three-dimensional structure such as a triangular beam 350, as shown at the right-hand side of FIG. 26.

As shown in FIG. 26, structure 350 is an elongated beam with a triangular cross section can, in turn, be coupled to other structures to produce complex three-dimensional space structures and habitats. When the sheet bending slit configuration of the present invention is employed, each of the bends produced at the pattern of slits 343 will preferably include the edge-to-face support of the sheet material which will make the bends capable of withstanding substantial loading. Obviously, other beam and structural configurations, such as the box beam of FIGS. 13 and 14, the deck of FIG. 20 or the column of FIG. 22, can be produced by folding along bend lines having slits of the type described above.

Moreover, using the slitting and grooving method and apparatus of the present invention ensures the precise positioning of the opposed edges of the sheet 341 and openings 346 and tabs 348 so as to enable closure of structure 350. If the structure to be formed needs to be fluid-tight and slitting is employed, the bends produced by slits 343 can be adhesively or otherwise filled, for example, by welding or brazing. It is also possible to provide numerous other closure configurations or fastening schemes, including welding along the abutting edges of sheet 341 and overlapping of an edge of the sheet with a side wall and the use of tabs and/or fasteners.

Another form of box beam which illustrates the flexibility of the apparatus and process of the present invention is shown in FIGS. 27A-27G, namely a cross or self-braced box beam.

Figure 27G:
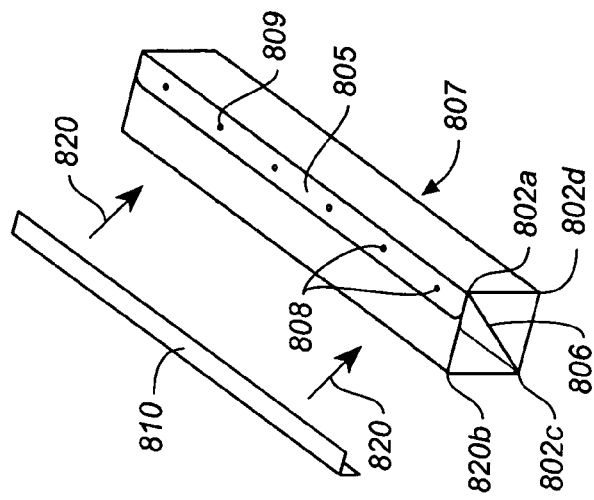
Figure 27F:
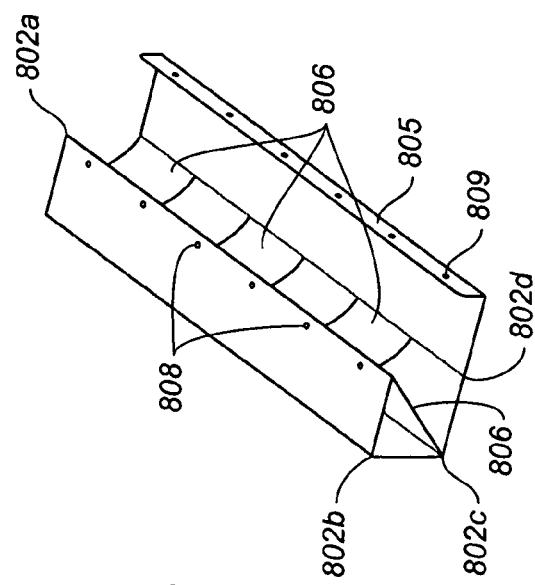
Figure 27E:
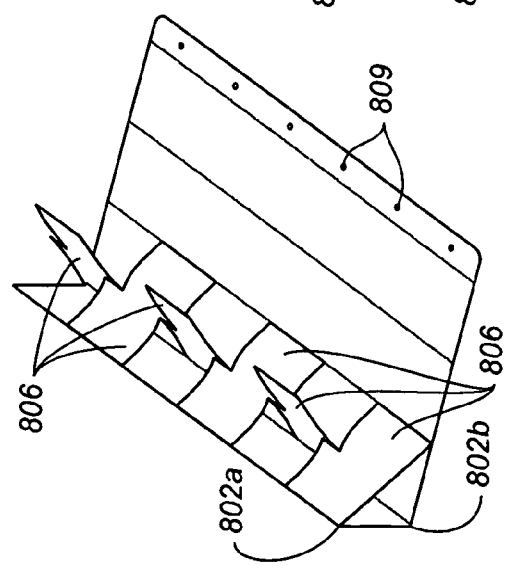

Sheet of material 801 is shown in FIG. 27A as being slit along bend lines 802 and 803. Additionally, a plurality of transverse slits 804 are provided which will be used to provide beam cross-bracing sheet portions 806. Bending of sheet 801 into a cross-braced box beam 807 9FIG. 27G) is shown in the sequence of FIGS. 27B-27G.

First, the side of the sheet having the cross-bracing sheet portions 806 can be bent to the position of FIG. 27B. Next, the sheet is bent along bend lines 803 to produce the cross braces 806 of FIG. 27C. Sheet 801 is then bent about bend line 802a to the position of FIG. 27D. The sheet is bent about bend lines 802b and 802c in FIGS. 27E and 27F, and finally side flange 805 is bent up and the sheet bent about bend line 802d to produce beam 807 of FIG. 27G. Fasteners can be placed in openings 808 and 809 (which are formed in aligned registered relation in sheet 801), such as rivets or screws, can be used to secure side flange 805 to the remainder of the box beam to produce a structure which will not bend or unfold. Beam 807 will be seen to trap or capture at its center an X-shaped cross-beam array extending along the beam to give it substantially enhanced strength. An extremely high-strength to weight, internally braced box beam, therefore, can be designed and formed from a single sheet of material using the process of the present invention.

As an optional step that can be added to many different structures formed using the apparatus and method of the present invention, protective corners or shin guards 810 (FIG. 27G) can be attached over bent corners 802 to effect a smooth and/or decorative corner treatment. Thus, L-shaped shin guard 810 can be added to beam 807, as indicated by arrows 820, and secured in place by, for example, adhesives or fasteners. Shin guards 810 can be metallic plastic or even reflective to produce decorative effects, as well as to provide impact protection, to smooth and/or to seal or pot the corner bends. Shin guard 810 could even encircle the beam or other three-dimensional structure. Attached shin guards can assist in load transfer across the bends.

In the cross braced box beam 807 of FIGS. 27A-27G, the cross bracing sheet portions 806 are bent to an "X" configuration and then captured or trapped within the folded beam to provide internal bracing. Another approach to the bracing of structures having adjacent walls in different planes is to employ swing-out sheet portions.

Figure 34A:
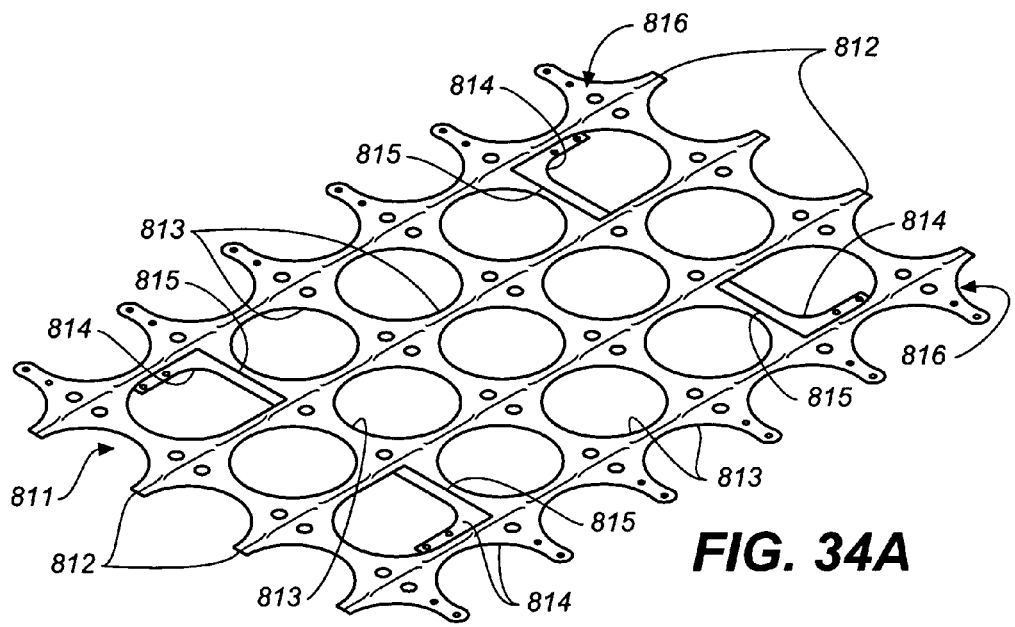
FIG. 34A-34E are top perspective views of a sheet of material including swing-out bracing and shown as it is being bent into a swing-out braced box-beam.

FIGS. 34A-34E illustrate the use of swing-out bracing in another box beam that also has a pattern of weight-saving cutouts. In FIG. 34A, sheet 811 has been slit using the present invention with a plurality of bend lines 812. Sheet 811 has further been cut or stamped with cutouts or weight saving openings 813. Additionally, in order to provide bracing of the folded walls of the beam, a plurality of swing-out sheet portions 814 have been provided which can be bent around bend lines 815.

Figure 34B:
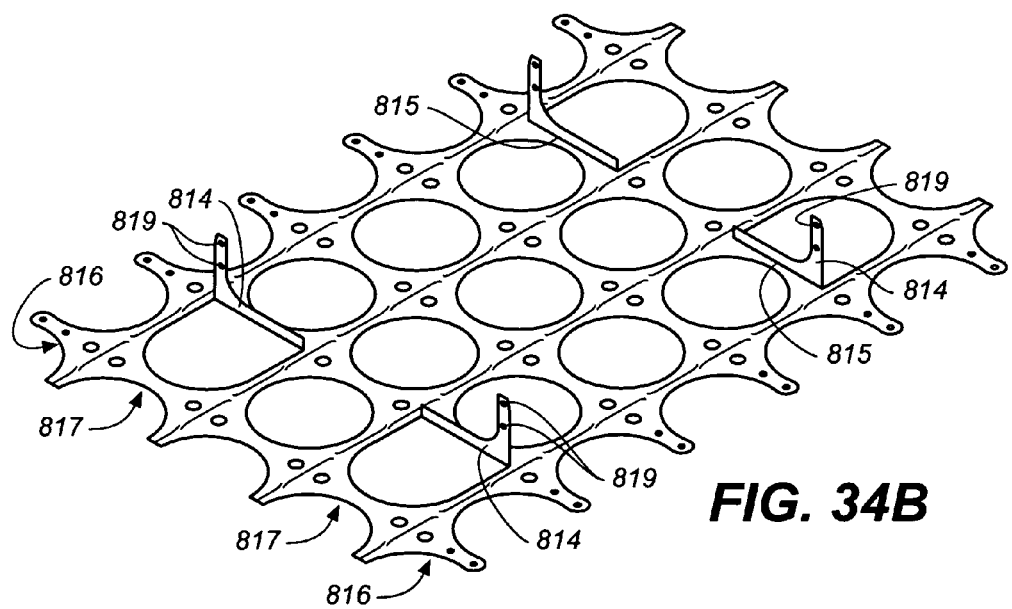
Figure 34C:
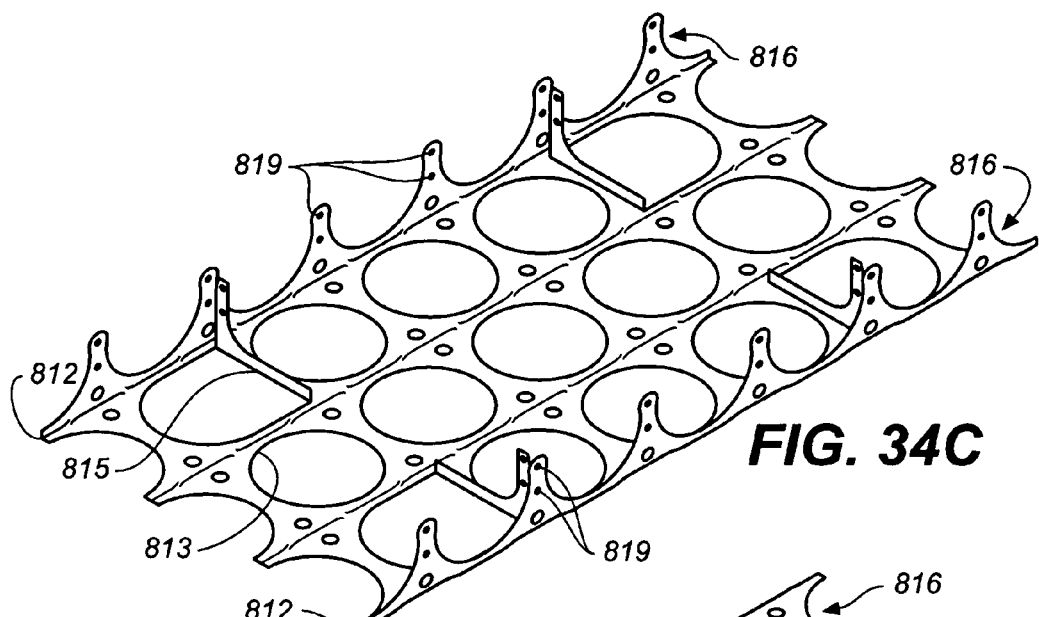
Figure 34D:
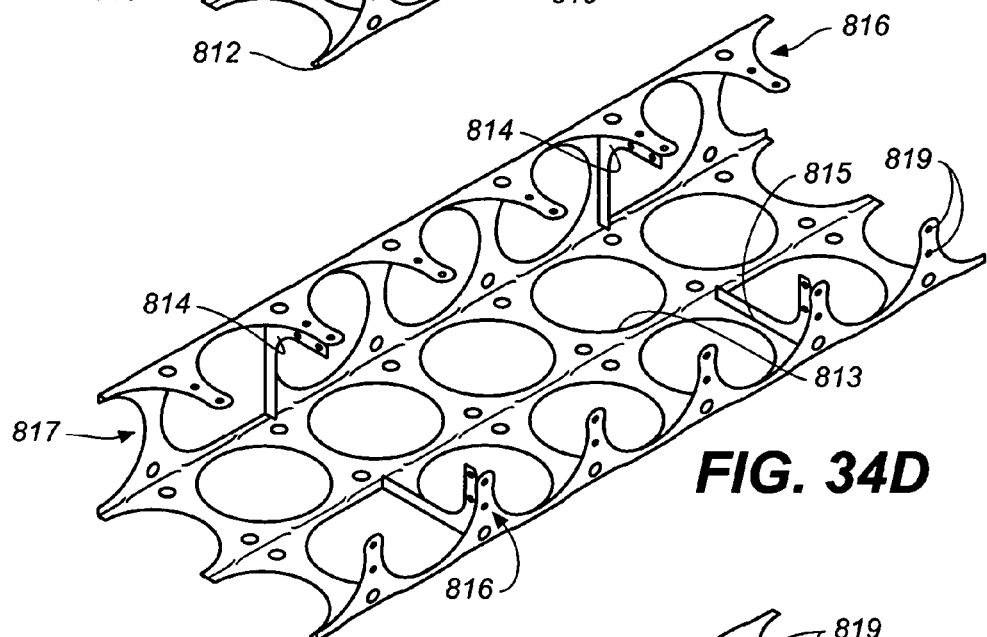
Figure 34E:
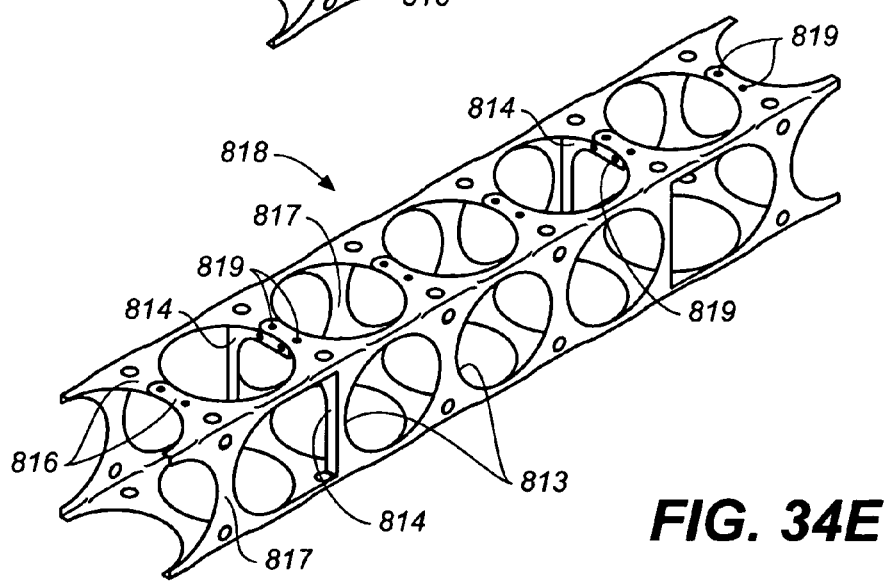

In FIG. 34B swing-outs 814 have been folded or swung out of the plane of sheet 811 around bend lines 815, while in FIG. 34C, the outside edges 816 of the sheet have been bent to a vertical orientation around bend lines 812. In FIG. 34D one side wall portion 817 of sheet 811 has been bent again around a bend 812, and in FIG. 34E the other side wall portion 817 has been bent around another bend line 812 to complete the box beam 818.

The last bending step, namely, bending from the configuration of FIG. 34D to that of 34E, causes edge portions 816 to overlap and causes swing-outs 814 to overlap. Both edges 816 and swing-out 814 can be provided with fastener-receiving openings 819 which will become aligned or superimposed as the beam is folded to the FIG. 34E condition by reason of the high precision or accuracy possible when employing the edge-to-face bending technique of the present invention. Thus, fasteners, such as rivets or screws, not shown, can be inserted into opening 819 to secure edges 816 together against unfolding of beam 819, and to secure swing-outs 814 together to provide bracing between mutually perpendicular walls of the beam, as well as bracing across the beam. As will be apparent, the number of bracing swing-outs can be increased from that shown in the illustrated embodiment, and the use of swing-outs to brace adjacent walls in different planes has application to many structures other than box-beams.

Figure 29:
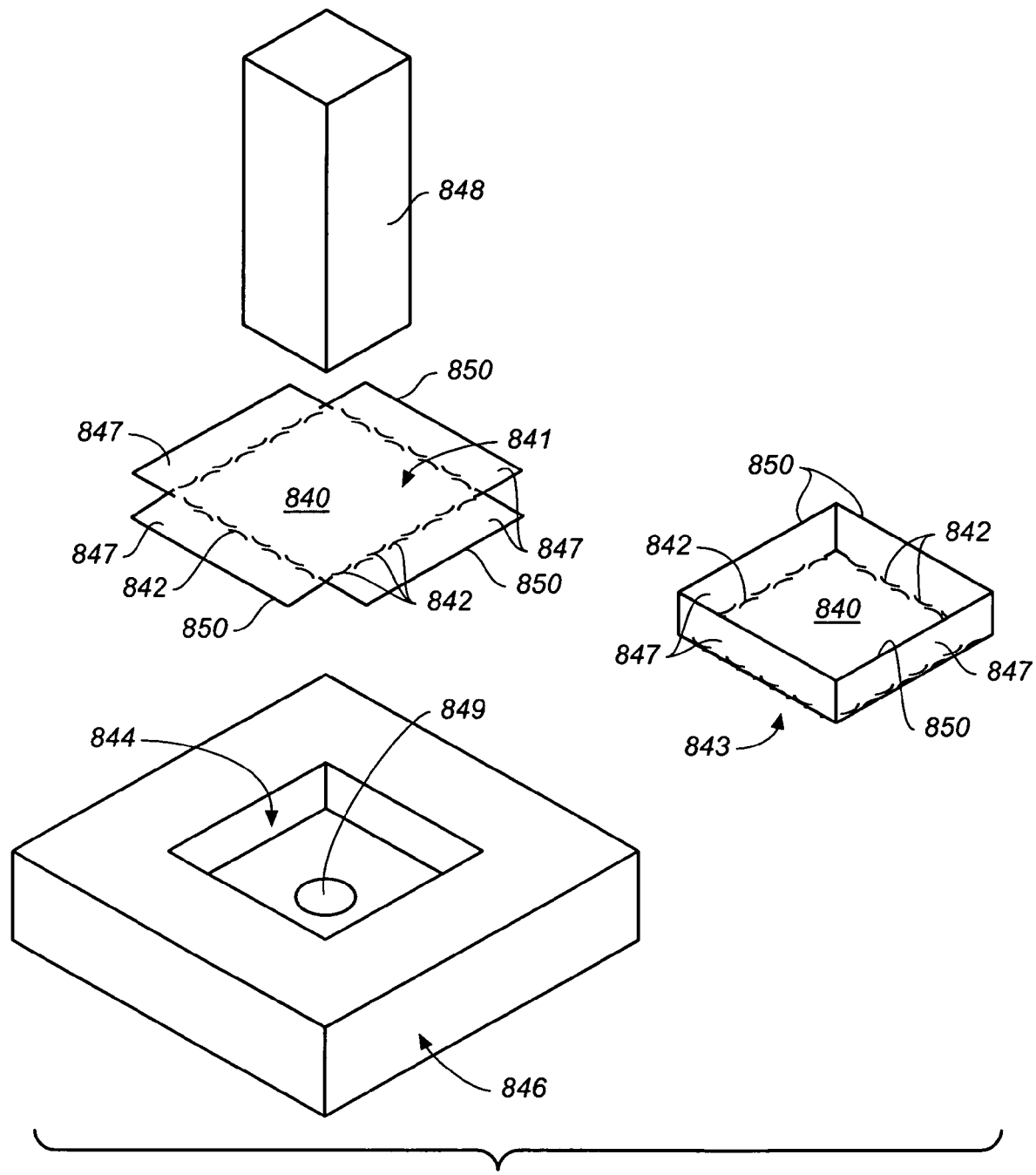
FIG. 29 is a top perspective, schematic representation of one embodiment of equipment suitable for low-force bending or folding of the slit sheet of the present invention.
Figure 30:
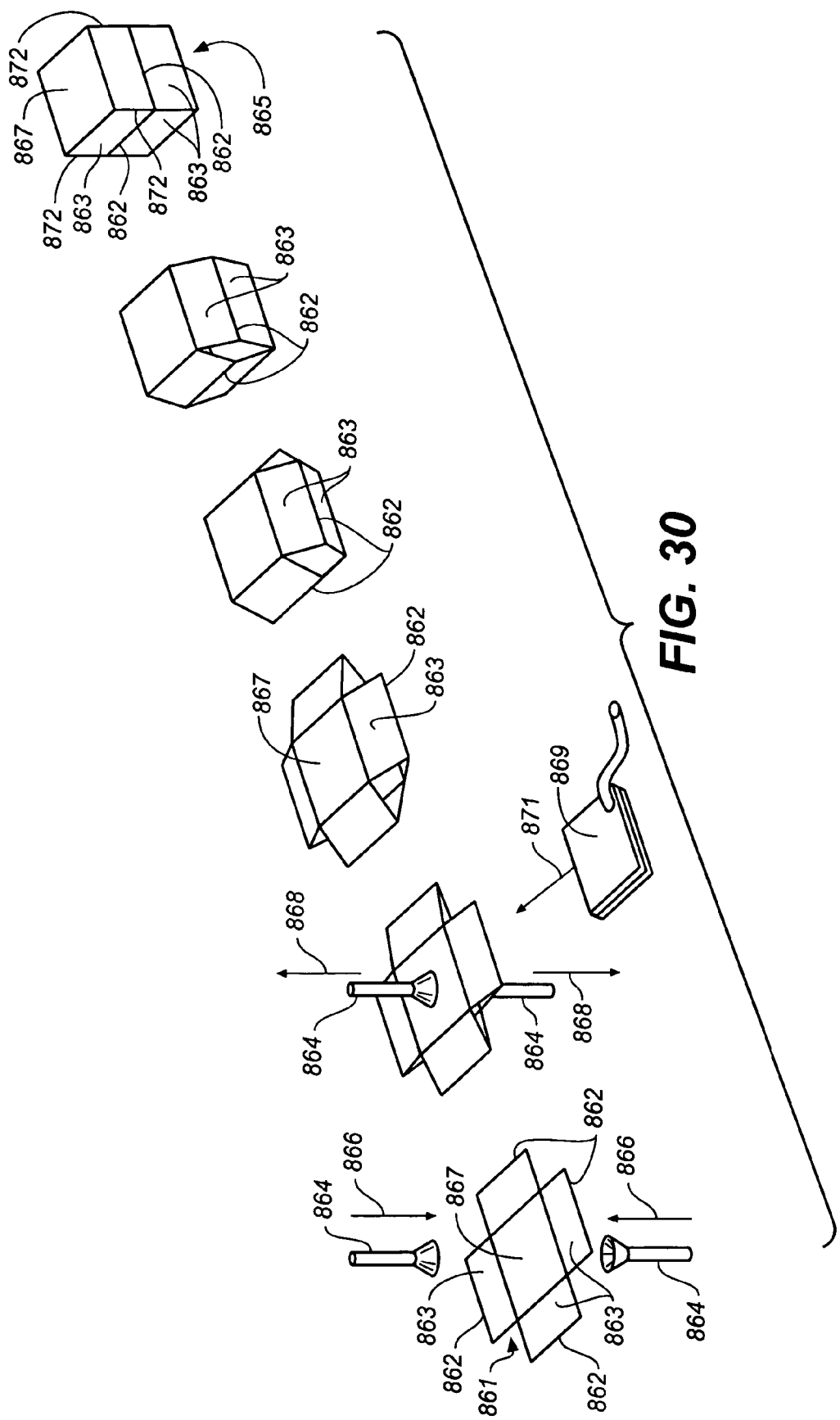
FIG. 30 is a top perspective, schematic representation of another embodiment of sheet bending or folding process of the present invention.

Turning now to FIGS. 29 and 30, the advantages of low-force sheet bending enabled by the present invention can be illustrated. In FIG. 29, a sheet of material 841 is shown which has a plurality of arcuate slits 842 formed along bend lines in a manner above described. Formation of box 843 from sheet 841 can be easily accomplished using low-force techniques.

Sheet 843 can be placed over opening 844 in die 846 and the four sides 847 of the box simultaneously bent to upright positions. An actuator driven plunger 848 can be employed or a vacuum source coupled to apply a vacuum to die 846 through conduit 849 used. Little or no clamping of sheet 841 to die 846 is required; only positioning of sheet 841 so that the bend lines are in mating relationship with opening 844 in the die. This can be accomplished, for example, by providing indexing pins (not shown) on the top surface of the die proximate the corners of opening $44. The indexing pins would engage sheet 844 at the apexes between sides 847 of sheet 841.

Depending upon the material being bent and its thickness, a negative pressure at conduit 849 will be sufficient to pull sheet 841 down into the die and thereby bend sides 847 up, or for thicker sheets and stronger materials, plunger 848 may also be used or required to effect bending.

Box 843 can be used, for example, as RFI shields for small circuit boards, such as the ones commonly found in hand-held cell phones, have been made by the prior art technique of progressive die stamping. The advantage of progressive die stamping is that sufficient precision can be achieved and it is suitable to low cost, mass production. However, with the rapid change in products that face this market, new shield designs require that the hard tooling be frequently replaced. This is especially problematic at the development end of the product life cycle where many changes occur before the final design is chosen. Another difficulty with relying on hard tooling is that the ramp-up to full production must wait until the hard tooling is available. This can be as much as eight weeks, which is very expensive in a market with rapid design changes and short product life. Yet another problem with the progressive die stamping has to do with accessibility to the underlying components for diagnostics or repair. If a significant fraction of a chip batch is faulty and may need repair, a two-piece RFI shield unit is employed with a low profile fence, soldered to the circuit and a "shoe box lid" covering it with an interference fit. This disadvantage is that the fence below take some horizontal "real estate" away from the circuit board and two pieces are always more expensive to manufacture than one. Another prior art solution to accessibility is the method of using a row of circular perforations in the shield lid that can be severed to allow an area of the lid to be hinged upward along one side. This perforated door approach crates the possibility of some RFI leakage and it is difficult to cut and reseal the lid.

Box 843 of FIG. 29 shows a solution to the aforementioned problems using the techniques of the present invention. The RFI shields manufactured using arcuate slit assisted bending methods can be rapidly prototyped without hard tooling using a CAD system for design and a CNC cutting process such as a laser cutter. Folding to the required shape can be readily accomplished by hand tools or the fabrication equipment of FIG. 29.

The ramp-up to full production can be accomplished immediately by laser cutting the initial production volumes required to enter the marker. Lower cost stamping tools to stamp out the biased tongue-tabs needed for the geometry disclosed can be fabricated during the ramp-up phase that initially is supplied by a CNC cut solution. In this way, the cost of design, ramp-up, and production can be lowered relative to the current practice of waiting for progressive cavity dies to be manufactured.

Another advantage of the present invention is the built-in access door for servicing the parts within. By severing the straps defined by slits 842 around three sides of shield 843, and having previously soldered edges 850 of the low profile rectangular box 843 to the circuit board, the panel 840 of box 843 can be hinged 90 degrees to allow for temporary service access. When repairs are complete, the lid or panel 840 can be closed again and re-soldered at the corners. Most metal alloys suitable for RFI shielding will allow for eight or more accesses in this manner before the hinged straps fail.

In FIG. 30 a series of steps is shown in which a sheet 861, which has been slit according to the present invention, can be popped up into a box using a pneumatic bladder or vacuum grippers.

Sheet 861 is shown in a flat form at the left side of the sequence of FIG. 30. Sheet 861 is, in fact, two identical sheets which have been coupled together at bend lines 826 at the outer edges of sides 863 of the sheets, as will become apparent as the box is formed. Sheet 861 can be transported in the substantially flat state shown on the left end of the sequence and then, at the use site, popped up to the three-dimensional box 865 shown at the right hand side of the sequence. This in-the-field formation of box 865 can be easily accomplished using pneumatics or hydraulics because the bending of sheet 861 requires only the minimal force necessary to bend the oblique bending straps.

One bending technique would be to employ suction or vacuum grippers 864 which are moved, as indicated by arrows 866, down into contact with a planar central sheet portion 867 of sheet 861. A vacuum is applied to suction grippers 864 and then the grippers are moved apart, as indicated by arrows 868 until box 865 is fully distended, as shown at the right hand side of FIG. 30.

Another approach is to insert an expansible bladder 869 into the slightly distended box, as shown by arrow 871. Such insertion can be accomplished before transportation or in the field. Bladder 869 is then inflated pneumatically or hydraulically and the box gradually distended or bent up to the condition shown at the right hand side of FIG. 30.

Box 865 can be secured in the configuration shown at the right hand side of FIG. 30 by, for example, welding, brazing or adhesively securing side panels 863 at corners 872.

A further advantage of the high precision bending or folding process of the present invention is that geometric information may be embedded in the planar material at the same time that the low-force, high precision bending structures are fabricated. This information may be accurately and predictably communicated into an anticipated 3D spatial relationship at very low cost.

In the past, symbols and geometric conventions have been used to convey information about the assembly of structures. One aspect of the present invention is that the bending or folding instructions may be imparted to the flat parts of the sheet material at the same time that they are formed with bending slits or grooves. Alternatively, folding instructions may be imparted to the flat parts through a secondary process such as printing, labeling, or tagging. Additionally, information may be embedded in the flat form that is intended to instruct the assembly process of similarly precision-bent structures or the adjoining of parts from non-folded prior art and future art fabrication methods.

For example, a continuous pre-engineered wall structured may be formed from a single sheet of material that is folded into top and bottom joists with folded-up studs. All anticipated windows, doors and electrical boxes can be embedded as physical geometric information in the flat part for subsequent folding and assembly into the building. A convention may be established that a round hole in the structure is indicative of electrical conduit that will later be threaded through the hole. A round-cornered square hole may be indicative of hot water copper pipe that should be passed through the wall. In this way, the feature is not only located in the flat part, but it is very accurately translated into correct 3D relationship, and finally, such conventions communicate to trades people, who are not involved with the structural erection of the building, where their activities intersect with the structure. Moreover, communication of such information anticipates the trades people's activity so that they do not have to modify and repair the structure as they thread their infrastructure through the building.

FIGS. 32A-32E illustrate an embodiment of a stud wall which can be folded out of a single sheet of material using the sheet bending method of the present invention. In FIGS. 32A-32E no attempt has been made to illustrate openings or the like which are precisely positioned and shaped to communicate information, but such data can be precisely located during the sheet slitting process. It should also be noted that the folded sheet of FIG. 32E can either be a stud wall with studs joined to joists or a ladder with rungs joined to side rails.

Figure 32A:
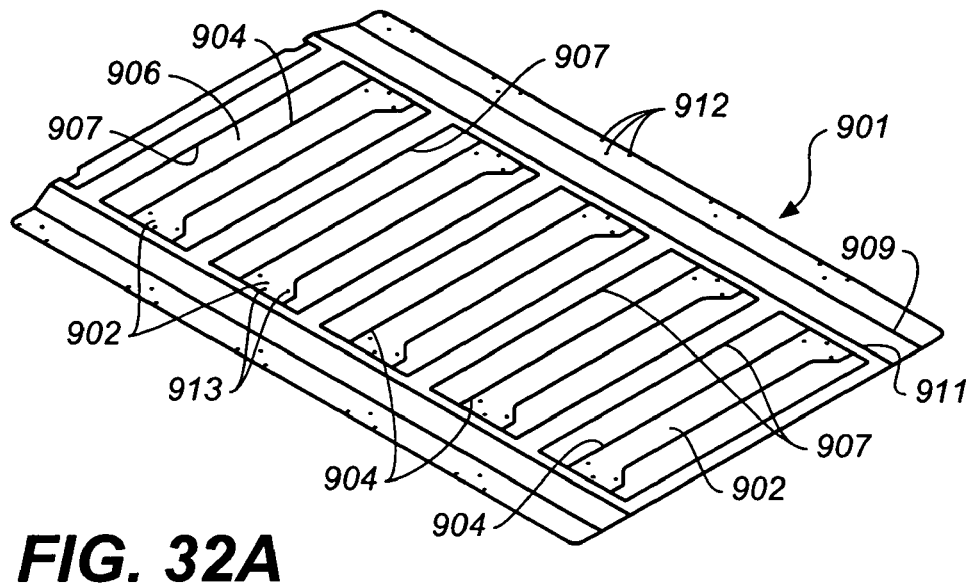
FIGS. 32A-32E are top perspective views of a sheet of material constructed in accordance with the present invention as it is being bent into a stud wall/ladder.

Turning to FIG. 32A, sheet of material 901 has been slit along a plurality of bend lines to enable formation of a stud wall or ladder structure. The slits are formed and positioned as taught herein.

Figure 32B:
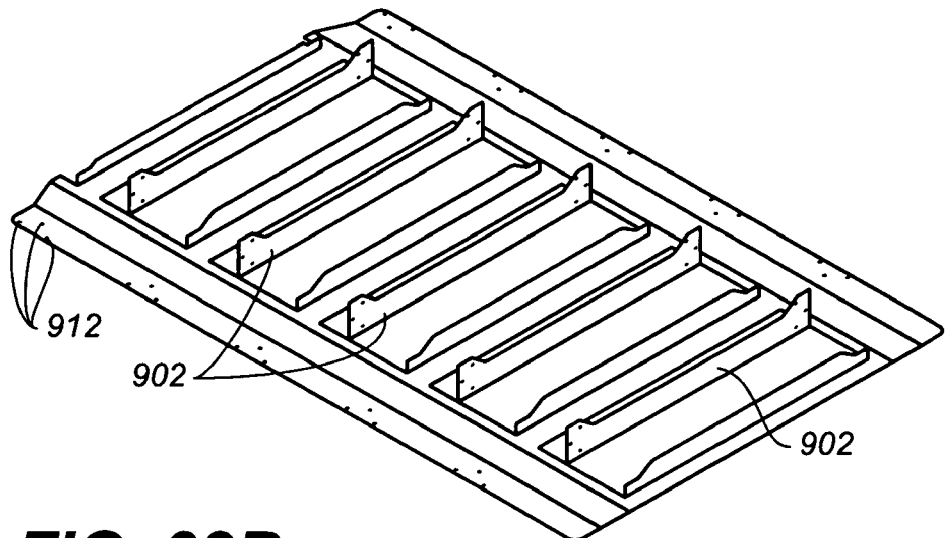
Figure 32C:
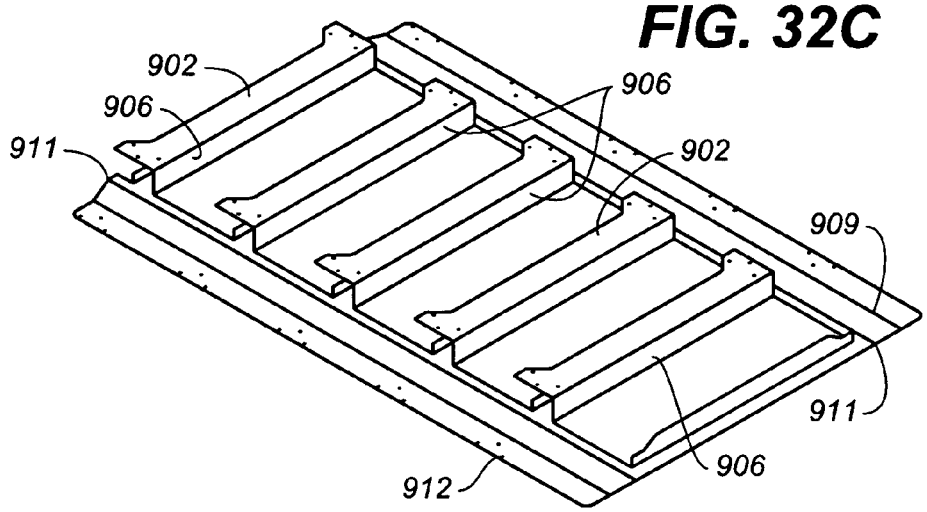
Figure 32D:
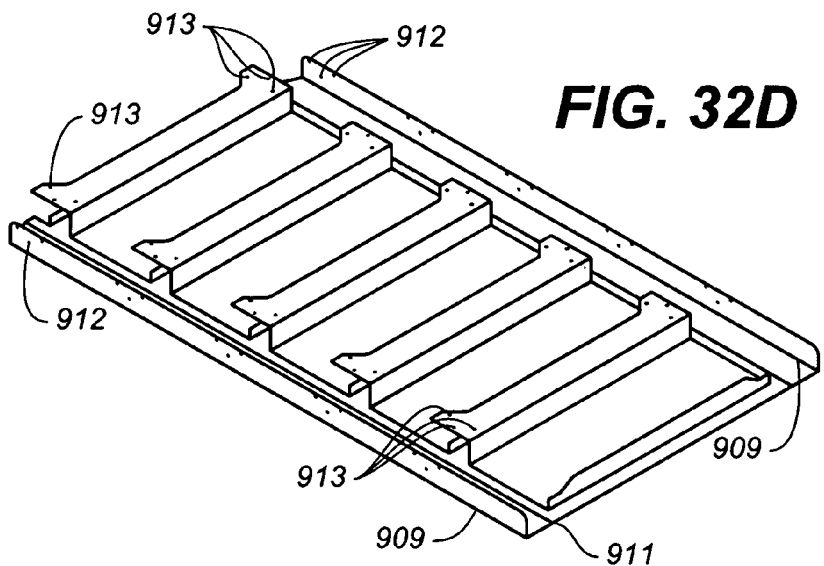
Figure 32E:
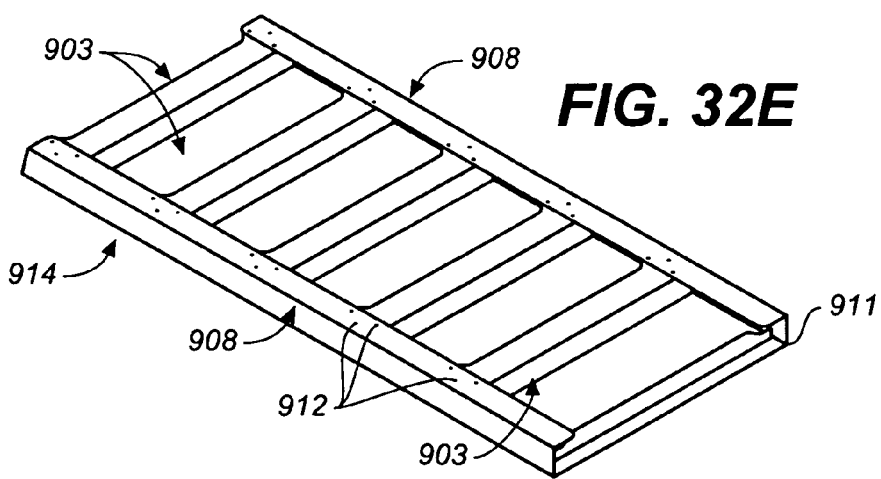

In FIG. 32B the side wall portions 902 of eventual studs or ladder rung 903 have been folded up along bend lines 904 from flat sheet 901. The next step is to fold up an additional end wall or step portion 906 along bend line 907, as shown in FIG. 32C. In FIG. 32D the joists or ladder rails 908 are folded up along bend line 909, and finally the joists/rails 908 are folded again along bend line 911 in FIG. 32E. This last fold causes openings 912 in joist/rails 908 to be superimposed in aligned or registered relation to openings 913 (FIG. 32D) in side walls 902 of the studs/rungs 903. Fasteners, such as rivets or screws can be used to secure the joist/rails 908 to the studs/rungs 903 and thereby secure the assembly in a load bearing three-dimensional form 914.

When used as a ladder, rails 908 are vertically extending while rungs 903 are horizontal. When used as a stud wall, joists 908 are horizontal and studs 903 are vertically extending. As will be appreciated, the rungs/studs and rails/joists also would be scaled appropriately to the application.

As set forth above, most uses of the slitting process and slit sheets of the present invention will require that a plurality of slits be placed in offset relation along opposite sides of the desired bend line. This approach will produce the most accurate or precise sheet stock bends since three will be two opposed and spaced apart actual fulcrums that precisely cause the position of the virtual fulcrum to be between the actual fulcrums on the desired bend line.

While there is a very minor loss of bending precision, the technique of the present invention can also be employed using a single slit and bending straps configured to produce bending of the sheet of material along a bend line, while edge-to-face engagement of the sheet portions across the slit occurs. This single slit bending is illustrated in FIGS. 35 and 36.

Figure 35:
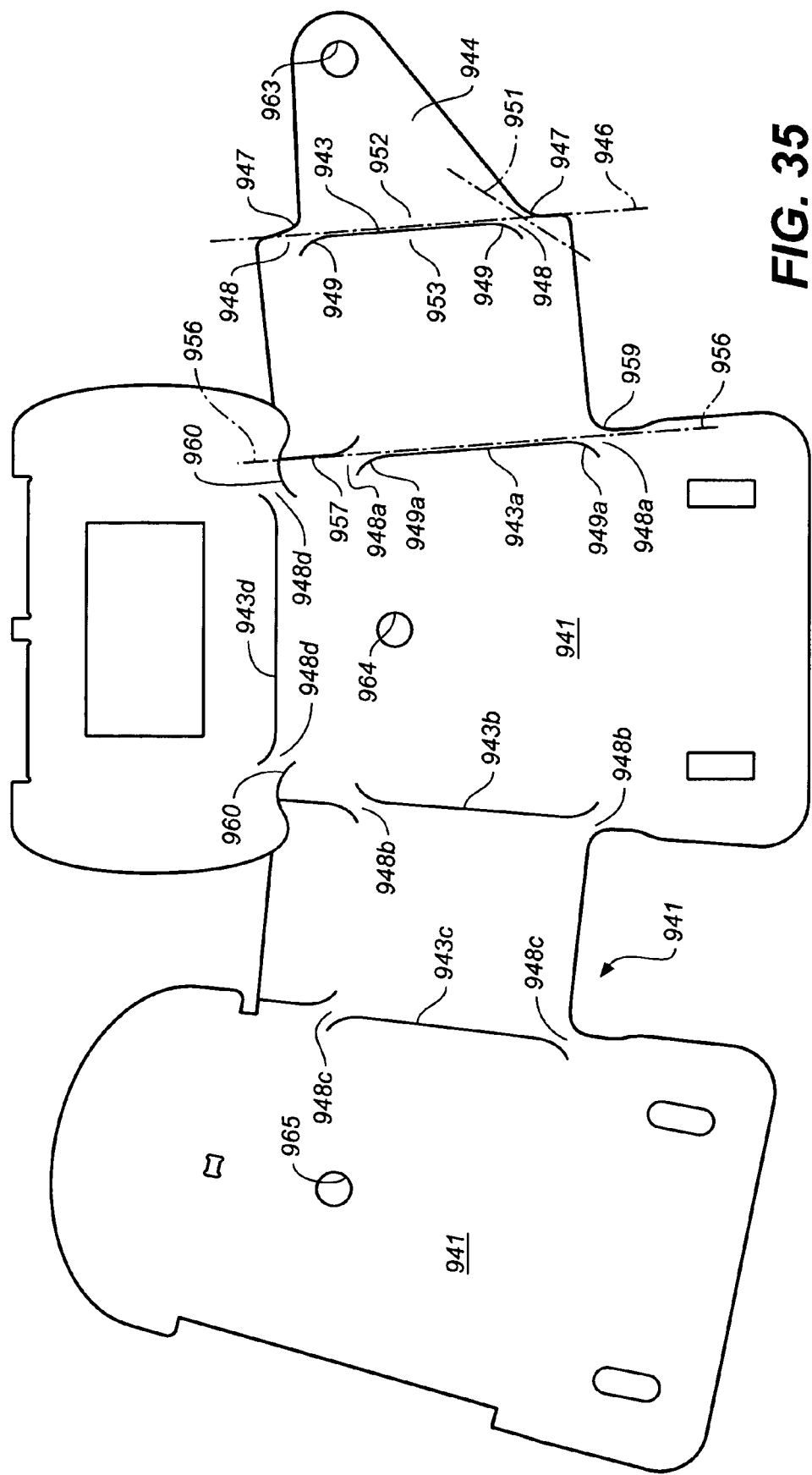
FIG. 35 is a top plan view of a sheet of material slit in accordance with the present invention and including a single slit embodiment
Figure 36:
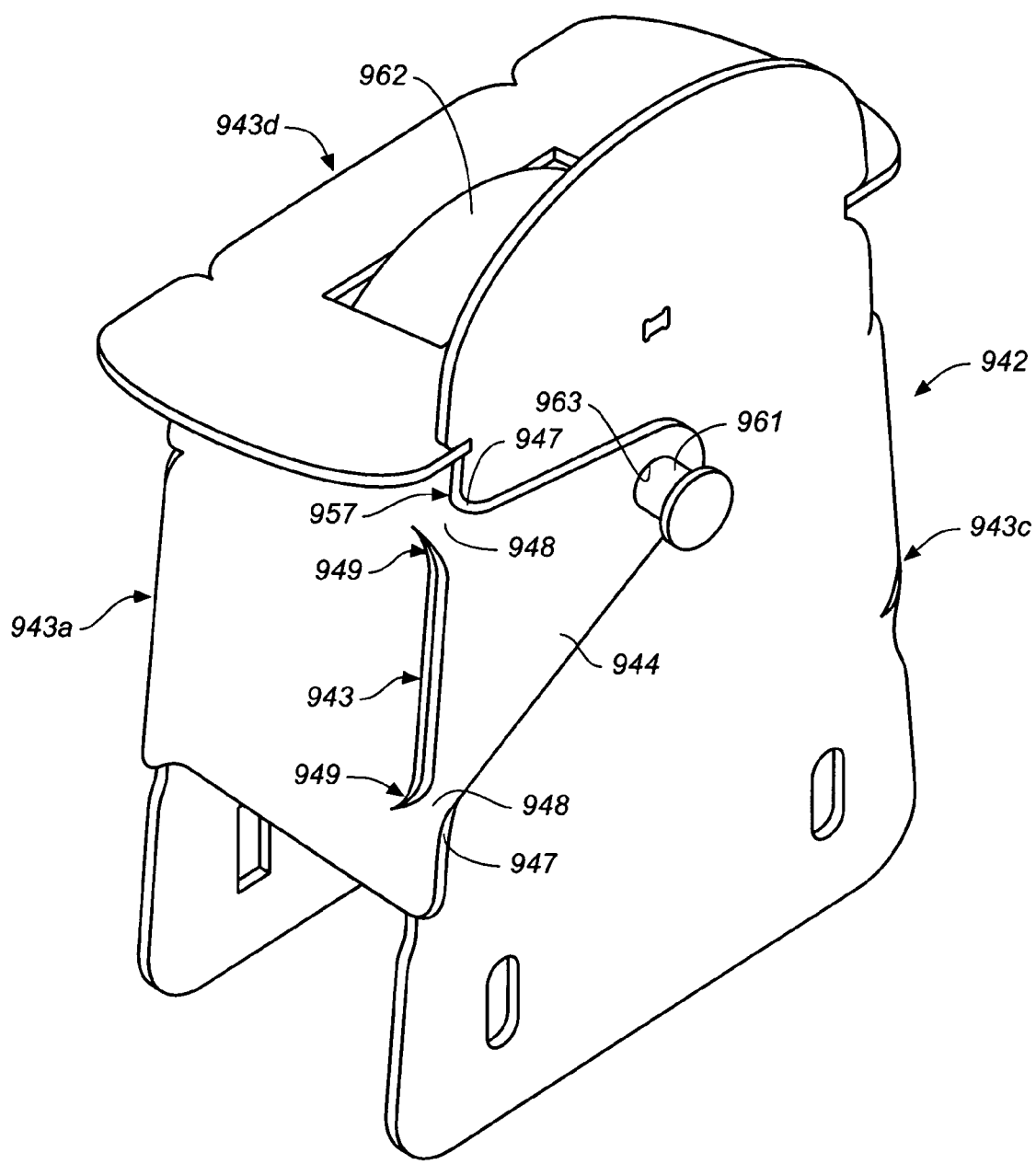
FIG. 36 is a top perspective view of the sheet of FIG. 35 as bent into a roller housing.

In FIG. 35 a sheet of material 941 is shown which has been slit for bending into a wheel roller housing, generally designated 942, as shown in FIG. 36. Sheet 941 includes a slit 943 for bending of ear 944 about bend line 946. As will be seen, there is no slit on the side of bend line 946 opposed to slit 943. Nevertheless, ear 944 includes two shoulders 947 that define bending straps 948 with arcuate end portion 949 of slit 943. It also will be apparent that the central axes 951 of bending straps 948 are oblique to bending line 946 in oppositely skewed directions.

When ear 944 is bent into the page for FIG. 35, oblique straps 948 will bend and twist and at the same time pull or draw lip 952 on the ear side of slit 943 up into engagement with the face of tongue 953 on the body side of the slit. Thus, sliding edge-to-face engagement again is produced by reason of oblique bending straps 948, correctly scaled and shaped.

Sheet 941 has other examples of arcuate bending slits which combine with partial opposed sits or edges of the sheet to provide bending straps that will produce edge-to-face bending. For bending line 956, for example, slit 943a is opposed at one end by a partial slit 957 having an arcuate end 958 that combines with arcuate end 949a to define an oblique bending strap 948a. At the opposite end of slit 943a an arcuate edge portion 959 combines with arcuate slit end 949a to define another oppositely skewed strap 948a.

The result of the configuration of straps 948a is edge-to-face bending about bend line 956.

Slit 943b is formed as a mirror image of slit 943a with an arcuate edge and partial slit cooperating to define oblique bending straps 948b. Similarly, slit 943c cooperates with an edge and partial slit to define oblique bending straps 948c that ensure edge-to-face bending. Finally, slit 943d cooperated with slit portions 960 to define obliquely oriented bending straps 948d.

The single slit embodiment of the present apparatus and method as illustrated in FIG. 35 is somewhat less precise in the positioning of the bend on desired bending line, but the loss of accuracy is not significant for many applications. In the structure illustrated in FIG. 36, an axle 961 for roller 962 passes through openings 963, 964 and 965 (FIG. 35) which must come into alignment when sheet 941 is bent into the three-dimensional housing 942 of FIG. 36. The single slit embodiment, therefore, will produce bends which are still sufficiently precise as to enable alignment of openings 963, 964 and 965 to within a few thousandths of an inch for insertion of axle 961 therethrough.

Figure 37:
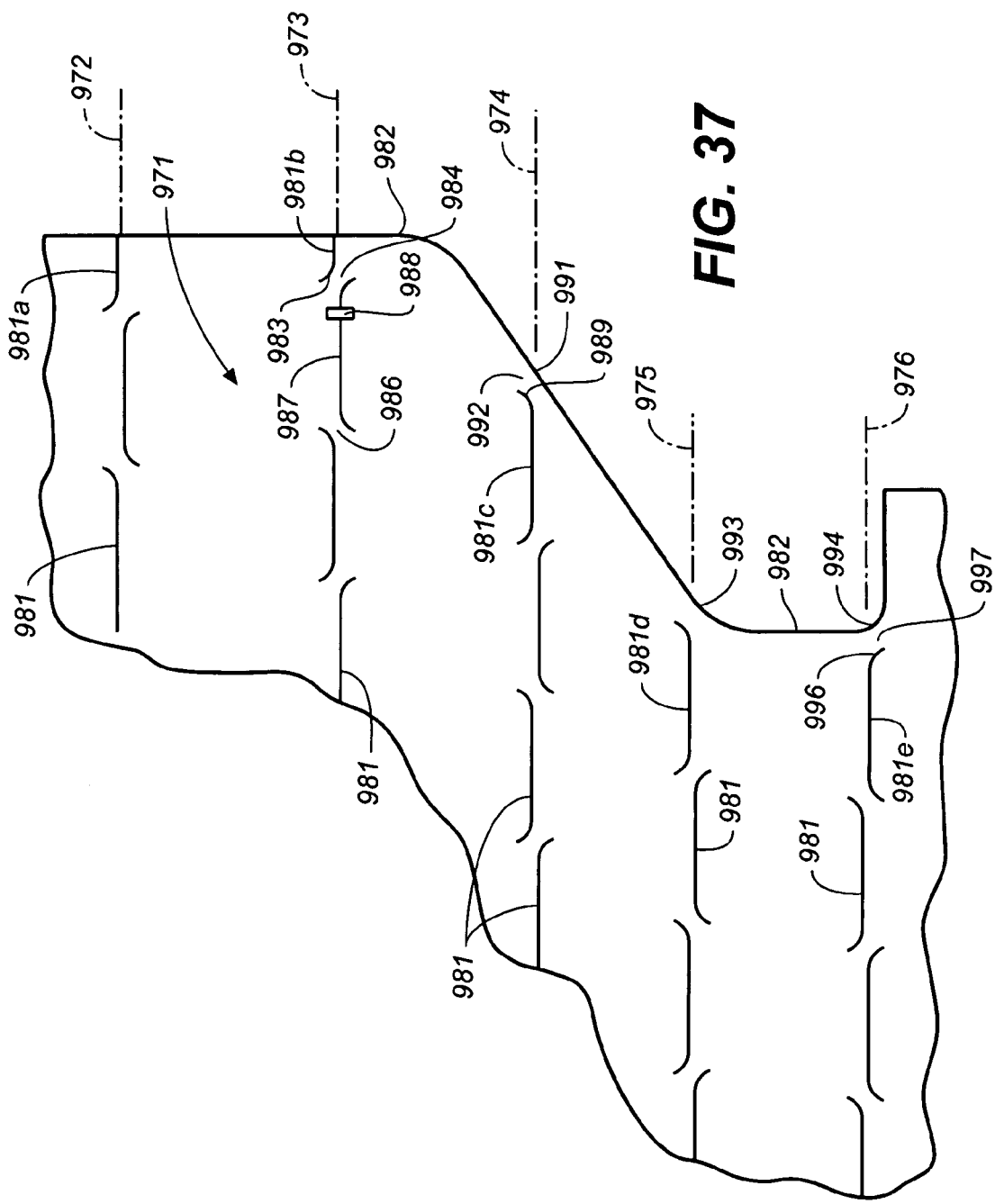
FIG. 37 is a fragmentary top plan view of a sheet of material having differing bend line termination slit configurations.

In FIG. 37, bend line termination or edge-effects related to the slitting process and apparatus of the present invention are illustrated. A sheet of material 971 is shown with five bend lines 972-976. Slits 981 are formed in the sheet along the bend lines as described above. The edge 982 of sheet 971 should be considered when designing the slit layout because it can influence the positioning of the slits.

On bend line 972 slits 981 were given a length and spacing such that a partial slit 981a opens to edge 982 of the sheet of material. This is an acceptable bend line termination strategy. On bend line 973, partial slit 981b again opens to edge 982, but the partial slit 981b is long enough to include arcuate end 983 so that a bending strap 984 is present to oppose bending strap 986. Slit 987 can also be seen to have a rectangular opening 988 extending across the slit. Opening 988 is in the central portion of slit 987 and therefore will not significantly influence bending straps 984 or 986, nor will it effect edge-to-face bending.

On bend line 974, slit 981c has an arcuate end 989 which defines with sloping edge portion 991 an oblique bending strap 992. A similar geometry is shown for slit 981d and edge portion 993. The use of an edge of a sheet to partially define a bending strap is also employed in connection with the slits of FIG. 35, as above described.

Finally, on bend line 976 arcuate edge portion 994 cooperates with arcuate end 996 of slit 981e to define strap 997. Thus, the edge portion 994 requires a slit layout which inverts slit 981e from the orientation of slit 981d and illustrates that the finite nature of the slits requires that edge effects be considered when laying out the slits. In most cases, slit length can be slightly adjusted to produce the desired bend line termination or edge effect.

Figure 31B:
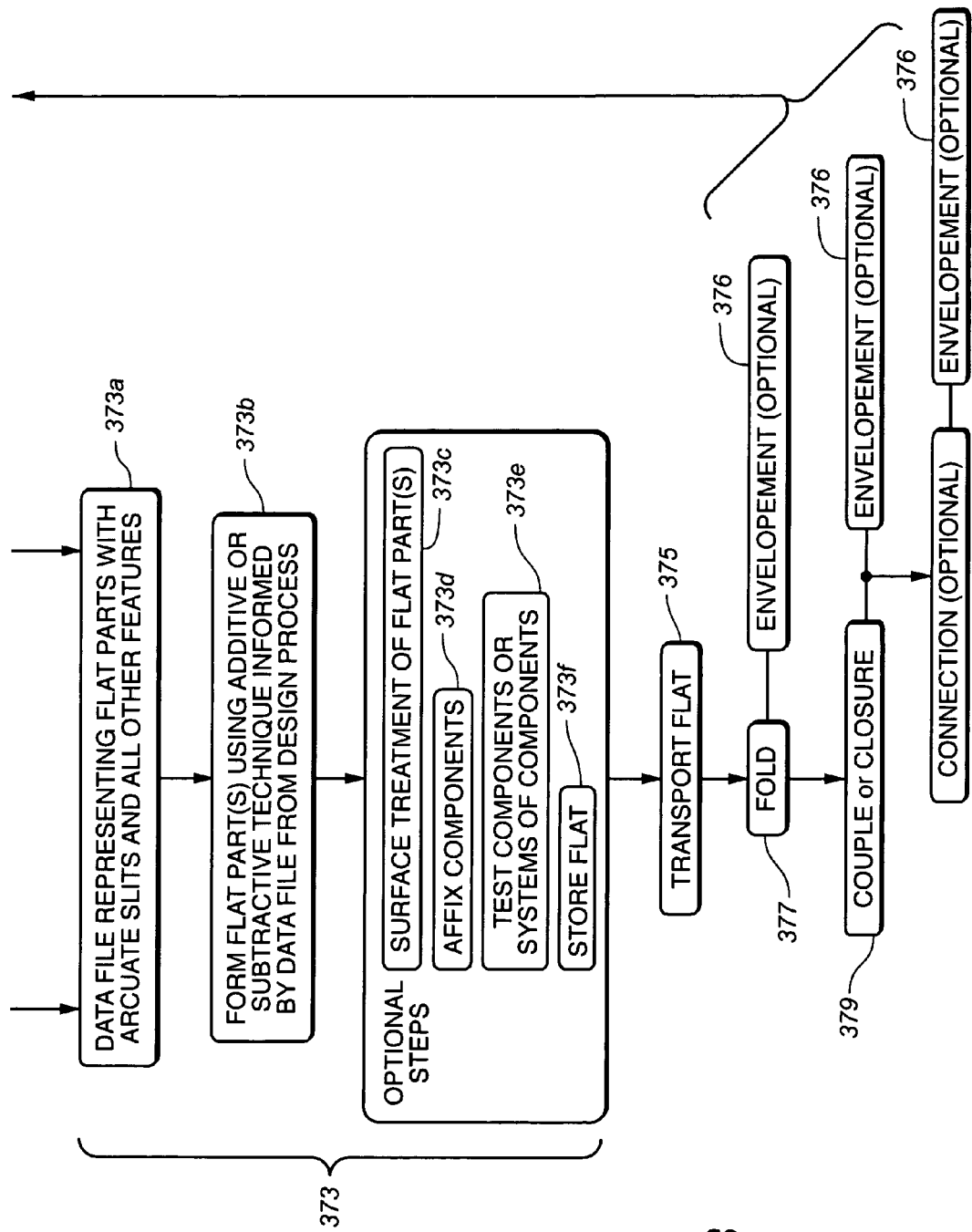
FIG. 31 is a flow diagram of one aspect of the interactive design, fabrication and assembly processes for slit sheet material bending of the present invention.

In a further aspect of the present invention, as schematically shown in FIG. 31, a method is provided for forming three-dimensional structures. The first step is designing the three-dimensional structure. This involves an initial sub-step 370a of imagining the design. Once conceptualized, designing will often, but not necessarily, proceed with a step 370b or 370c in which CAD or computer implemented designing takes place. The step 371 of selecting a sheet of material and its thickness optionally can occur before or during CAD design steps 370b or 370c.

As can be seen in FIG. 31, CAD design steps 370b and 370c can include various alternative sub-steps. Thus, a common approach is sub-step $370b_1$ in which the conceptual design is built in 3-D CAD and then flattened. Alternatively at step $370b_2$, the design can be built up by successively bending sheet flanges or portions. One can also design in 2-D and declare or locate the bend lines, which is sub-step $370b_3$. Placement of the proper or best-designed slits or grooves of the present invention can be done through software, at step $370b_4$ or manually at the step $370b_5$.

The design process of the present invention can also be based upon a selection, usually by computer or a CAD software program, at sub-step $370c_1$, among a plurality of stored designs and/or parts. The CAD system can then, at sub-step $370c_2$, modify the selected part to achieve the new or desired design, if modification is required. Finally, at sub-step $370c_3$ the part is unfolded by the software into a flat state.

Once designed, the next step is a slitting or grooving step 373, preferably by employing a CNC controller to drive a sheet stock slitting apparatus. Thus, at sub-step 373a data, representing the flat part and the designed slits or grooves, are transferred from the CAD or CAM systems to a CNC controller. The controller then controls slitting and other formation steps for the cutting and fabricating equipment. At sub-step 373b, therefore, the flat part is formed using additive (molding, casting, stereo lithography) or subtractive (slitting, cutting) or severing (punching, stamping, die cutting) fabrication technique.

Optionally, the formed flat sheet can also undergo such steps as surface treatment 373c, affixation of components 373d, testing $373e_4$ and storage 373f, usually in a flat or coiled condition.

Often a transportation step 375 will occur before the sheet material is bent or folded at step 377. The slit sheet stock is most efficiently transported from the fabrication site to a remote bending and assembly site in a flat or coiled condition.

Bending or folding 377 is precise and low-force. For most structures bending occurs along a plurality of bend lines and often continues until two portions of the sheet are abutting, at which point they can be coupled together at the abutting portions of the sheet to produce a rigid load-bearing three-dimensional structure at step 379. Optionally, the structure can be secured in a three-dimensional, load bearing configuration by an enveloping step, which couples the folded part together by encircling it.

Envelopment can be used for at least three strategies. In the present invention, the angle of a fold is not informed by the geometry of slits that form it. (Notwithstanding the technique of using a slit tilt angle to affect maximum contact area of edge to face engagement for a particular angle of folding, as shown in FIG. 24.) The angle of each fold is generally dictated by at least three interlocking planes. In some cases there is no opportunity to interlock three orthogonally independent planes, so an alternate method of defining a restricted rotational angle is needed. One method is to fold the structure against a reference structure of known angular relationship and lock the angle(s) into place by methods of adhesive(s), brazing, welding, soldering, or attaching structural shin guards to the inside or outside of the fold. Another method is to use an interior structure of defined angular form and bend the structure around it, that is to envelop the interior structure. This second method is referred to in the design and fabrication process diagram of FIG. 31, by reference numeral 376a, b. In this embodiment of envelopment, the interior part may be left in place (376b) or in some cases, it aids in the folding process only and is subsequently removed (376a).

Another use for envelopment is to capture, which is the process of docking together a folded sheet structure of the present invention with a functional part that may or may not be formed by the present invention, by enfolding or enveloping parts or modules within another structure. For example, FIG. 16 illustrates but one of many "capture" opportunities of the enabling feature of envelopment in the present invention 376b. Thus, column 631 is enveloped by folded sheet 611.

Yet another class of envelopment can occur, when connections are made between two or more modules of folded plate construction of the present invention, or between two or more components that include at least one structure of folded plate construction of the present invention. The three-dimensional positional accuracy of features formed in a planar material of the present invention, combined with the enveloping nature of the closure or coupling process, enable a method of joining together multiple pieces with a very high rate of success that does not require secondary cut and fit adjustments. This is distinct from the capacity of the present invention to align fastening features, such as holes, tabs and slots. It is a method of joining together by wrapping around.

The process of the present invention can also include an iterative step 380. The ability to create low-cost three-dimensional parts using the present method affords the designer the practical luxury of being able to tweak the design before settling on a production design.

The slit-base bending method and apparatus of the present invention are capable of highly precise bending tolerances. The original slits can be laid out with extreme precision using a CNC machine to control, for example, a laser, or water jet cutter, stamping or punching die, and the bends which are produced will be located with ±0.005 inches tolerance while working with macroscopic parts. This is at least as good or better than can be achieved using a press brake and a highly skilled operator. One additional advantage of using a stamping die is that the die can be wedge-shaped to compress the slit transversely or in the kerf width direction. This will compress the sheet material locally at the slit for better fatigue resistance. Such transverse compression also must be considered when designing a kerf width to produce edge-to-face contact during bending. It also is possible to follow laser or water jet cutting by a transverse compression of the slit with a wedge shaped stamping die to enhance fatigue resistance.

Moreover, when using the bending scheme of the present invention, the tolerances errors do not accumulate, as would be the case for a press brake. Alternatively, the slits or grooves can be cast or molded into a sheet of material or cast three-dimensional member having a sheet-like extension or flap that needed to be folded.

While working with materials of near microscopic or microscopic dimensions, other forming methods commonly used in the field of microelectronics and MEMS such a e-beam lithography and etching may be used to effect the required geometry of the present invention with extreme accuracy.

Rather than manipulating a laser beam (or sheet of material) to produce curved grooves or slits, such beams can also be optionally controlled or shaped to the desired configuration and used to cut grooves or slits without beam movement. The power requirements presently make this most feasible for light gauge sheets of metals or plastics.

Fabrication techniques in the method of the present invention also may include steps such as deburring the slits or grooves, solvent etching, anodizing, treating to prevent surface corrosion, and applying compliant coatings, such as paints, polymers, and various caulking compounds.

From the above description it also will be understood that another aspect of the method for precision bending of a sheet material of the present invention includes the step of forming a plurality of longitudinally extending slits or grooves in axially spaced relation in a direction extending along and proximate a bend line to define bending strap webs between pairs of longitudinally adjacent slits. In one embodiment, the longitudinally extending slits are each formed by longitudinally extending slit segments that are connected by at least one transversely extending slit segment. In a second embodiment, the slits or grooves are arcs or have end portions which diverge away from the bend line to define bending straps, which are preferably oblique to the bend line and increasing in width. In both embodiments, the straps can produce bending about virtual fulcrums with resulting edge-to-face engagement of the sheet material on opposite sides of the slits. The number and length of the bending straps webs and slits or grooves also can be varied considerably within the scope of the present invention. The width or cross-sectional area of the bending straps and the transverse divergence of the straps also can be varied independently of the transverse spacing between slits. An additional step of the present method is bending of the sheet of material substantially along the bend line across the bending web.

The method of the present invention can be applied to various types of sheet stock. It is particularly well suited for use with metal sheet stock, such as aluminum or steel, which can have substantial thickness and a variety of tempers (for example, 2 inch carbon steel, 6061 aluminum with a T6 temper, some ceramics and composites). Certain types of plastic or polymer sheets and plastically deformable composite sheets, however, also may be suitable for bending using the method of the present invention. The properties of these materials are relative to a given temperature and fluctuations in temperature may be required to make a particular material suitable in the context of the present invention. The present method and resulting sheets of slit material are particularly well suited for precision bending at locations remote of the slitter or groover. Moreover, the bends may be produced precisely without using a press brake.

Sheet stock can also be press brake bent, as well as slit or grooved, for later bending by the fabricator. This allows the sheet stock to be shipped in a flat or nested configuration for bending at a remote manufacturing site to complete the enclosure. Press brake bends can be stronger than unreinforced slit bends so that a combination of the two can be used to enhance the strength of the resulting product, with the press brake bends being positioned, for example, along the sheet edges. The slit or grooved bends can only be partially bent to open outwardly slightly so that such sheets can still be nested for shipping.

The bent product has overlapping edge-to-face engagement and support. This enhances the ability of the product to withstand loading from various directions without significant stressing of the bending straps. If further strength is required, or for cosmetic reasons, the bent sheet material can also be reinforced, for example by welding or otherwise attaching a shin guard or bent sheet along the bend line. It should be noted that one of the advantages of forming slits with essentially zero kerf, is that the bent sheet has fewer openings therethrough along the bend line. Thus, welding or filling along the bend line for cosmetic reasons is less likely to be required.

Figure 33:
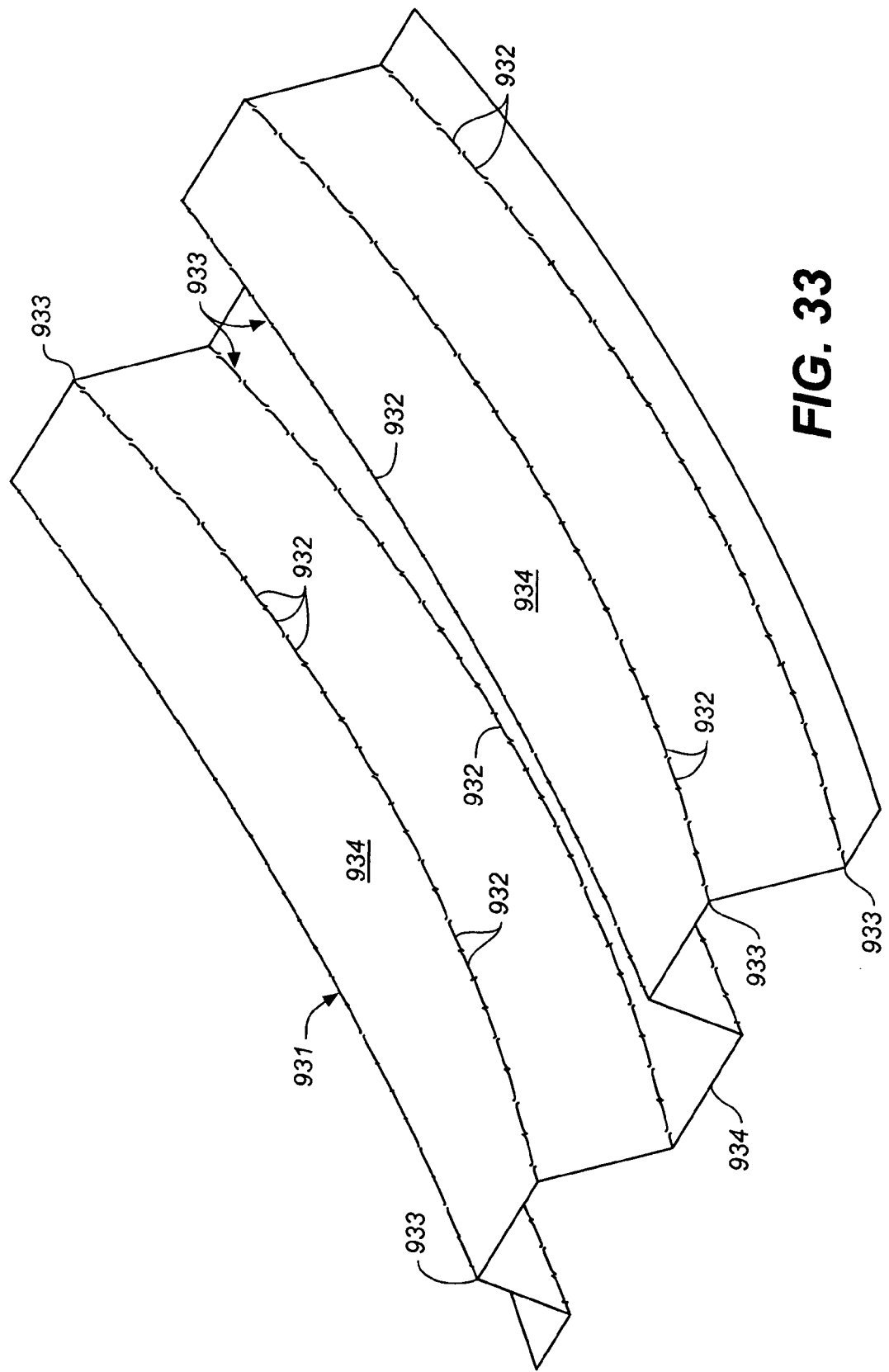
FIG. 33 is a top perspective view of a curved corrugated deck or panel constructed in accordance with the present invention.

It will be noted that while straight line bends have thus far been illustrated, arcuate bends can also be achieved. One technique for producing curved bend lines is shown in FIG. 33, namely, to layout identical strap-defining structures along a curved bend line so the virtual fulcrums fall on the desired curved centerline.

Sheet 931 has been slit with identical slits 932 which are positioned on opposite sides of curved bend lines 933 and folded into a corrugated panel. Slits 932 are shown as having a form similar to the sits of FIG. 6 with a central portion that is linear and diverging or curving away end portions. Slits 932, however, are laid out bend lines. As radius of curvature of bend lines 933 decreases, the length of slits 932 along bend lines 932 can be shortened to better approximate the curve.

It should be noted that the corrugated sheet 931 has a hat-shaped cross section which is often found in roll formed corrugated panels. When used as a decking structure, this construction is not as desirable as the continuous panel of FIG. 20, because chord sheet portions 934 only comprise about one-half the overall panel mass, but in other applications it has advantages and requires less material.

A second technique is to use non-identical strap-defining slits to shape the bending straps to produce a smooth curved bend. The bent sheet will have curved surfaces on both sides of the bend line. If stepped slits are used, the longitudinally extending slit segments can be shortened.

Figure 38A:
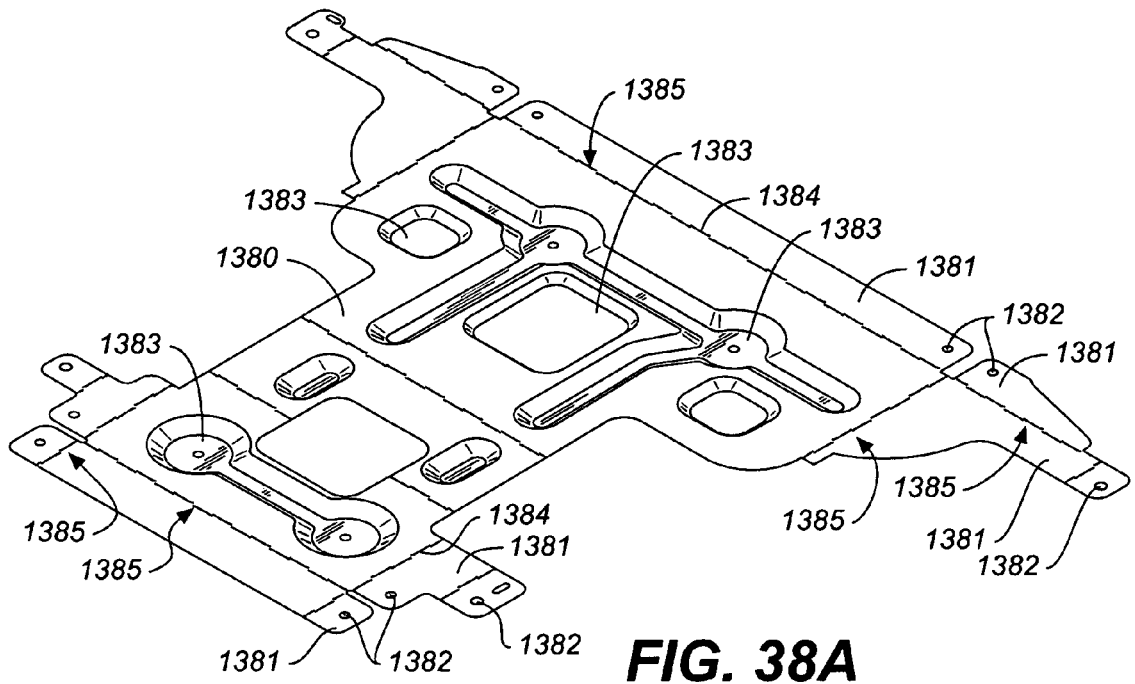
FIG. 38A is a top perspective view of a sheet of material constructed in accordance with the present invention before being bent into a chassis.
Figure 38B:
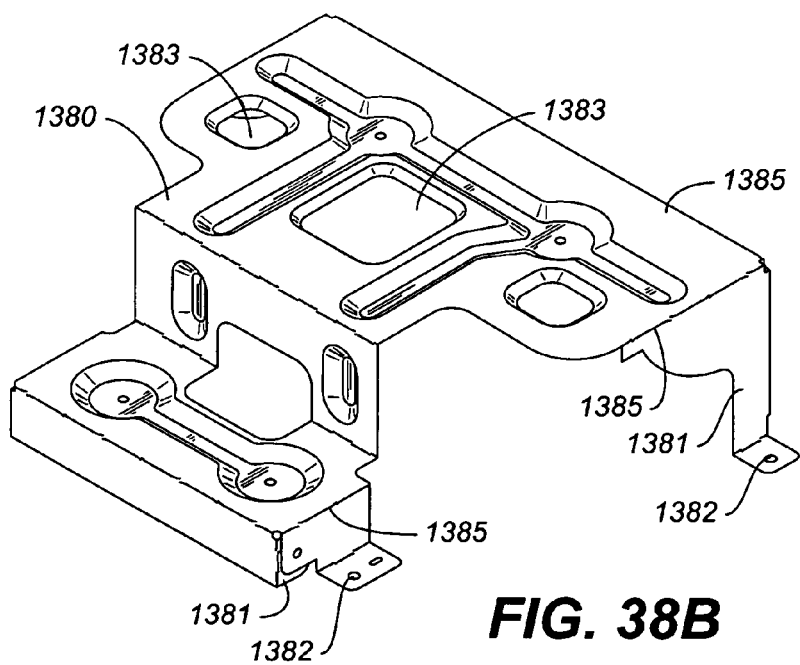
FIG. 38B is a schematic, top perspective view of a sheet of material as in FIG. 38A after being bent into a chassis.
Figure 38C:
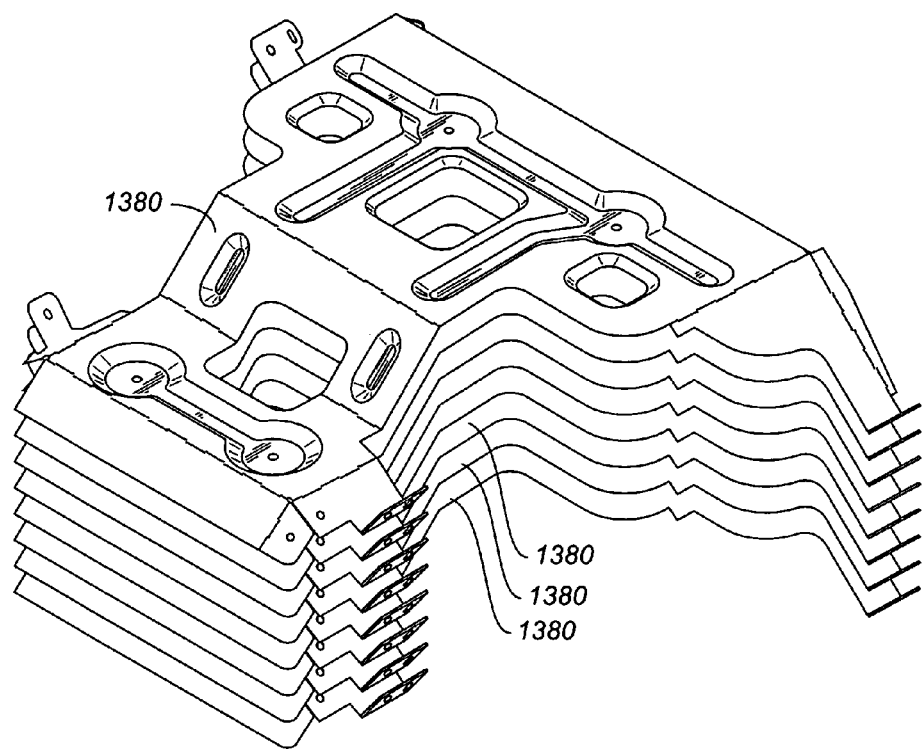
FIG. 38C is a top perspective view of several sheets of material as in FIG. 38A after being bent into a transitionary form of a chassis and stacked.

FIG. 38A-FIG. 38C illustrate another embodiment of a chassis, with FIG. 38B and FIG. 38C being schematic in that details shown in FIG. 38A are omitted for clarity. In this embodiment, sheet 1380 is shaped to form a three-dimensional object having structural leg or frame members. As can be seen in FIG. 38B, the resulting three-dimensional object having substantially open sides which may facilitate access to components that are supported on or within the chassis, and which open sides may also reduce material necessary to produce a given three-dimensional item.

The peripheral shape of sheet 1380 may be formed by any suitable means including punching, stamping, roll-forming, machining, laser cutting, water jet cutting, and the like. Furthermore, sheet 1380 is also formed with conventional surface features including conventional stamped features such as stamped zones 1383. Stamped zones 1383 provide clearance means for various components to be positioned within or on the chassis in a well known manner. In particular, the stamped zones may be formed and dimensioned to accommodate the geometry of articles to be affixed to the chassis. For example, a component may be located within a particular stamped zone by a fastener which extends through an aperture located within the stamped zone or other suitable means. As FIG. 38A shows, embodiments of the chassis include stamped zones 1383. In different embodiments, the stamped zones may be cosmetic, or formed and dimensioned to stiffen or otherwise modify the structural properties of the chassis, including the attachment tabs. Many variations can be used in accordance with the present invention.

Both FIG. 38A and FIG. 38B show sheet 1380 to include attachment tabs 1381 and fastener-receiving openings 1382 on the tabs and on portions of the sheet adjacent the tabs. Respective openings may be aligned with one another and fitted with fasteners to secure the assembly in a load bearing three-dimensional form.

Sheet 1380 also includes bending strap-defining structures 1384 which form precision bend lines 1385. FIG. 38A shows the sheet after formation of the bending strap-defining structures and stamped zones. FIG. 38B, by comparison, shows the three-dimensional chassis after complete bending along the bend lines. FIG. 38C shows several chassis in an incomplete, intermediate form in which chassis lay one within another to form a stack for shipping purposes.

In FIG. 38A, sheet 380 is flat. To form a three-dimensional structure from the two-dimensional (or more precisely quasi two-dimensional) sheet, one bends the sheet along bend lines 1385. After full bending, the chassis has a stepped, or zigzag, configuration, as FIG. 38B shows. Moreover, as shown, at least some of the attachment tabs interleave with other adjacent attachment tabs such that corresponding fastener-receiving openings 1381 align. With fasteners (not shown) placed in the fastener-receiving openings, the chassis forms a rigid three-dimensional support frame. In different embodiments, the chassis may be attached to external elements (for example by attachment tabs, as in FIG. 38B and/or other components may be affixed to the chassis.

FIG. 38C shows several sheets 1380 in an incomplete, transitionary form between a flat sheet, as in FIG. 38A, and a fully formed article, as in FIG. 38B. In the transitionary, or intermediate, form, the sheet has been only partially bent. Such incomplete formation is advantageous because, when partially bent, chassis engage one into another to form a stable stack. Stackability is very advantageous with respect to storage or shipping. Full formation, as in FIG. 38B, may be accomplished eventually by further bending of the sheet.

Figure 39A:
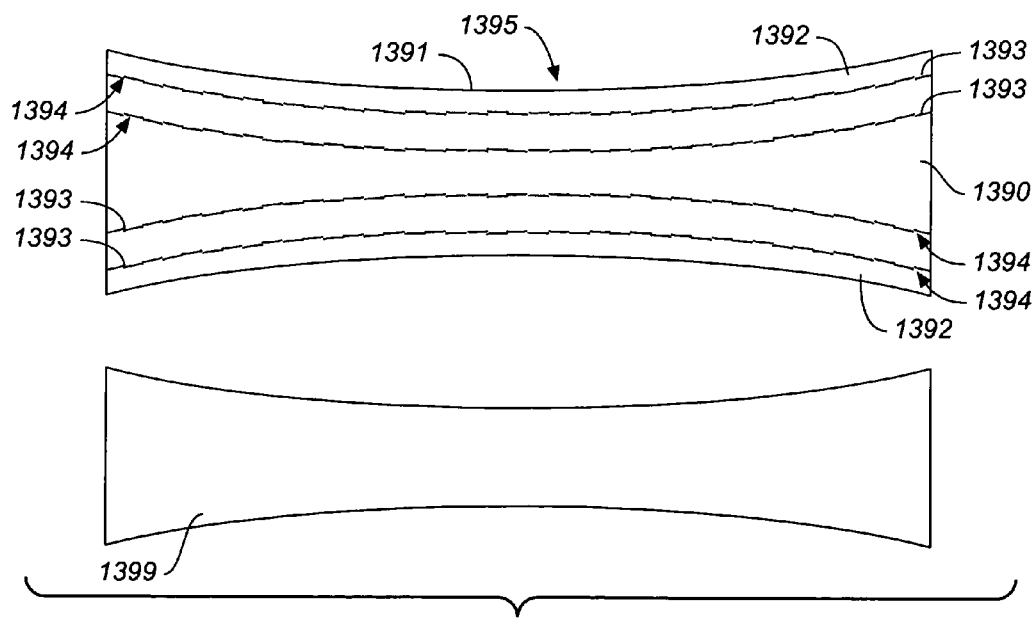
FIG. 39A is a top view of two sheets of material constructed in accordance with the present invention before being formed and joined into a curved beam.
Figure 39B:
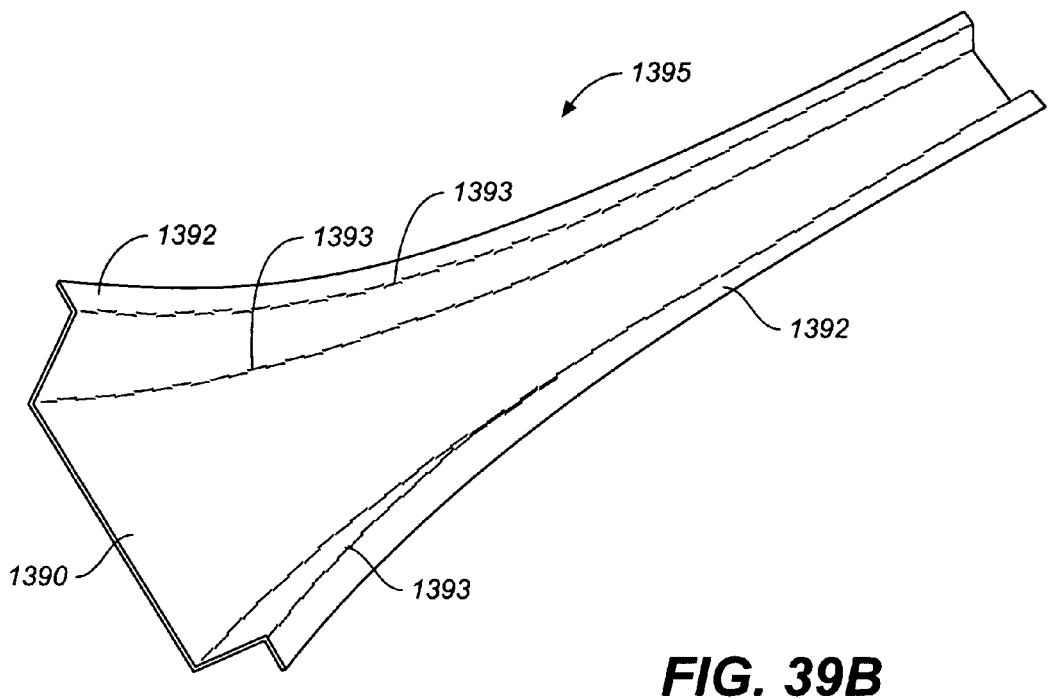
FIG. 39B is a top perspective view of a curved channel constructed in accordance with the present invention from a sheet similar to that shown in FIG. 39A.

In another embodiment of the present invention shown in FIG. 39A and FIG. 39B, respectively, a sheet of material may be configured to become a three-dimensional curved channel. Both figures show sheet 1390 having a sheet periphery 1391, flange 1392, bend curve 1393, bending strap-defining structures 1394 and channel profile 1395. FIG. 39A also shows second sheet of material 1399, which may or may not be fashioned from the same sheet as sheet 1390. FIG. 39A shows the sheet after formation of the bending strap-defining structures in the sheet but before sheet 1390 has been bent into its three-dimensional configuration. FIG. 39B, by comparison, shows the three-dimensional curved channel after bending the sheet along the bend lines.

As shown in FIG. 39A, sheet 1390 includes bending strap-defining structures 1394 (indicated only schematically because of scale) laid out to form bend curves 1393, which in this embodiment are non-linear. In different embodiments, bend curves may be entirely non-linear, or comprise linear and non-linear portions. Particular bend curves may be symmetrical or asymmetrical with other bend curves or portions of themselves. Bend curves may also be in the form of families of curves in sheet 1390. As well, sheet periphery 1391 may in different embodiments be straight or curved. Many layout variations can be utilized in accordance with the present invention.

FIG. 39B shows an embodiment of a three-dimensional curved channel 1395 after bending sheet 1390 along bend curves 1393. Note that FIG. 39B shows an embodiment formed by bending a flat sheet having a shape that corresponds to roughly one half of the embodiment of sheet 1390 from FIG. 39A. In FIG. 39B, a cross section of the channel is in the shape of a top hat and a cross-sectional area of the channel varies monotonically along the length of the channel. In other embodiments, the cross-sectional area may vary in a non-monotonic manner. For example, the cross-sectional area may converge and diverge. See, for example, the sheet of FIG. 39A. A range of embodiments of curved channel 1395 is sealed to be fluid-tight, as described earlier, and is therefore useful for fluid transport.

Depending on the material properties of sheet 1390 and the geometry of bend curves 1393, bending or folding the sheet into a three-dimensional structure may cause sheet curvature out of the plane of the unfolded sheet. Such displacement is believed to be a result of the sheet material's equilibrium state being disturbed by bending. On bending, the sheet reacts to internal stresses induced by bending along the bend lines, and may deform in the process of reaching a new equilibrium state, for example, reaching an "over-center" type state in which bending causes the sheet to "snap" into a particular geometry. In different embodiments, sheet material and bend line geometry aids or inhibits such deformation, according to design and intended use.

Figure 39C:
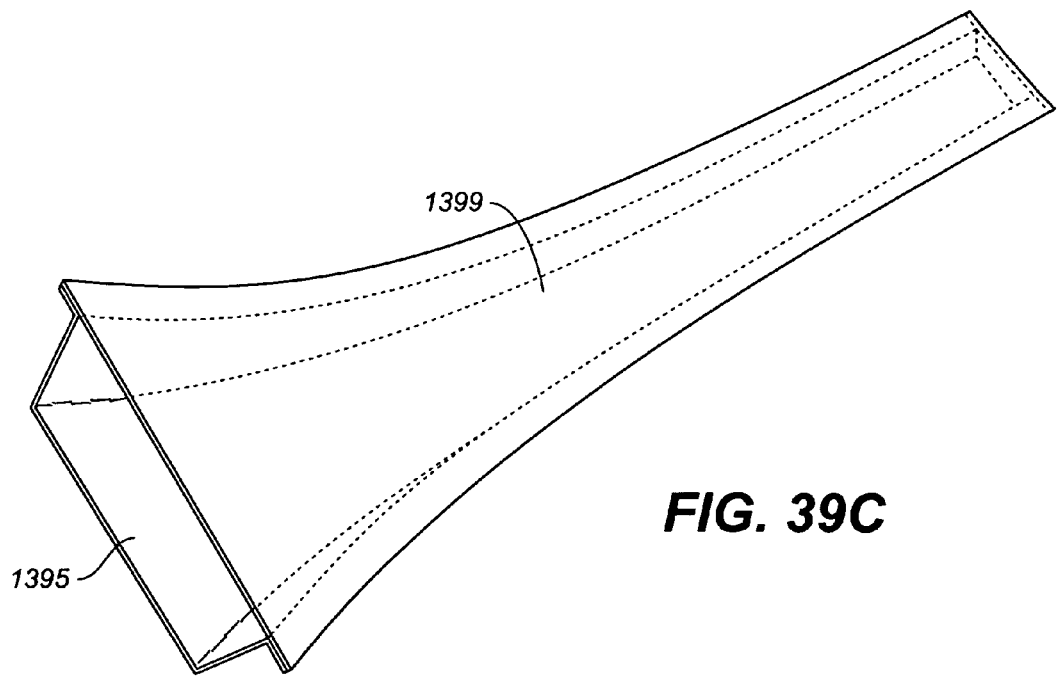
FIG. 39C is a top perspective view of a closed, hollow curved beam constructed in accordance with the present invention from two sheets similar to those shown in FIG. 39A.

FIG. 39C shows an embodiment of curved channel 1395 fastened to a second sheet of material 1399 in order to increase structural rigidity and form a hollow beam. See, in another embodiment, second sheet 1399 in FIG. 39A. In a particularly straight-forward example based on the curved channel embodiment shown in FIG. 38B, a flat sheet is laid on top of flange 1392 (see FIG. 39B) to cover the channel; and is fastened to the flange by fastening means well-known in the art such as tack welding or screws or rivets or bolts or pins or adhesives (not shown for clarity). The result is a hollow closed structure having enhanced bending and torsional stiffness compared to curved channel 1395 as an open structure.

Different embodiments combine curved channel 1395 with second sheet 1399 that is not flat. The results are closed, hollow structures, many of which are well-suited to be used as beams. For example, two identical curved channels fastened along flanges 1392 form a curved box beam. Many such variations can be utilized in accordance with the present invention.

As well, some embodiments of hollow closed structures include fill material placed inside of the hollow structure to effect further stiffening. For example, a hollow closed structure may be filled with foam, or a fill material comprising metal or plastic or fibrous material and a foaming agent. These and many other variations can be utilized in accordance with the present invention.

Turning now to other embodiments, individual structural members such as beams or channels or "L" shaped forms made with a single fold of a sheet may be joined by well-known means such as welding or brazing or fasteners. However, the origami-like process of precision forming three-dimensional structures from a two-dimensional sheet, as described in detail above, enables lightweight monocoque frameworks comprising load-bearing members formed from a single sheet, not several sheets. For example, box beams, whether curved or straight, also can be used in exoskeletal designs in order to provide high strength-to-weight advantages. Rather than using a solid beam or framework with its attendant weight, hollow, folded or bent beams can have corresponding strength but lower weight. If desired, such hollow beams also can be filled as described above.

Figure 40A:
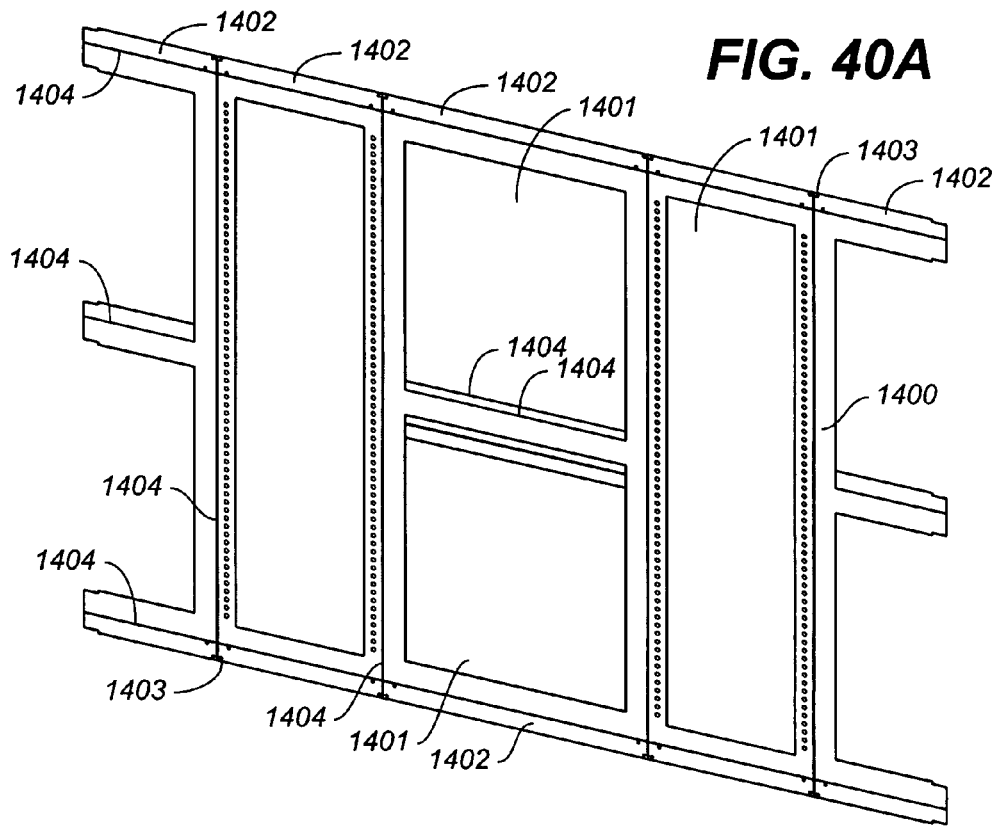

FIG. 40A-FIG. 40H illustrates an example of forming an exoskeletal framework from a single sheet of material. In some aspects, the principles of this embodiment are similar to those exemplified by the ladder structure illustrated in FIG. 32A but may result in a simplified structure particularly suited for frame-like structures. FIG. 40A shows a single sheet of material prepared for folding. As a series, the subsequent figures show the folding process that results in a three-dimensional closed framework. FIG. 40A-FIG. 40H are schematic in that the details of bending strap-defining structures along bend lines are not shown. Different embodiments of such structures are described in detail above.

In FIG. 40A-FIG. 40H, sheet 1400, removed portions 1401, attachment tabs 1402, fastener-receiving openings 1403, bend lines 1404, folded portions 1405-1407, and clasps 1408 are shown. In FIG. 40A, the sheet has been formed with bending strap-defining structures and bend lines as described in detail above. Also, removed portions 1401 have been cut out to enable a final frame-like structure that is closed upon itself, but otherwise open.

Figure 40B:
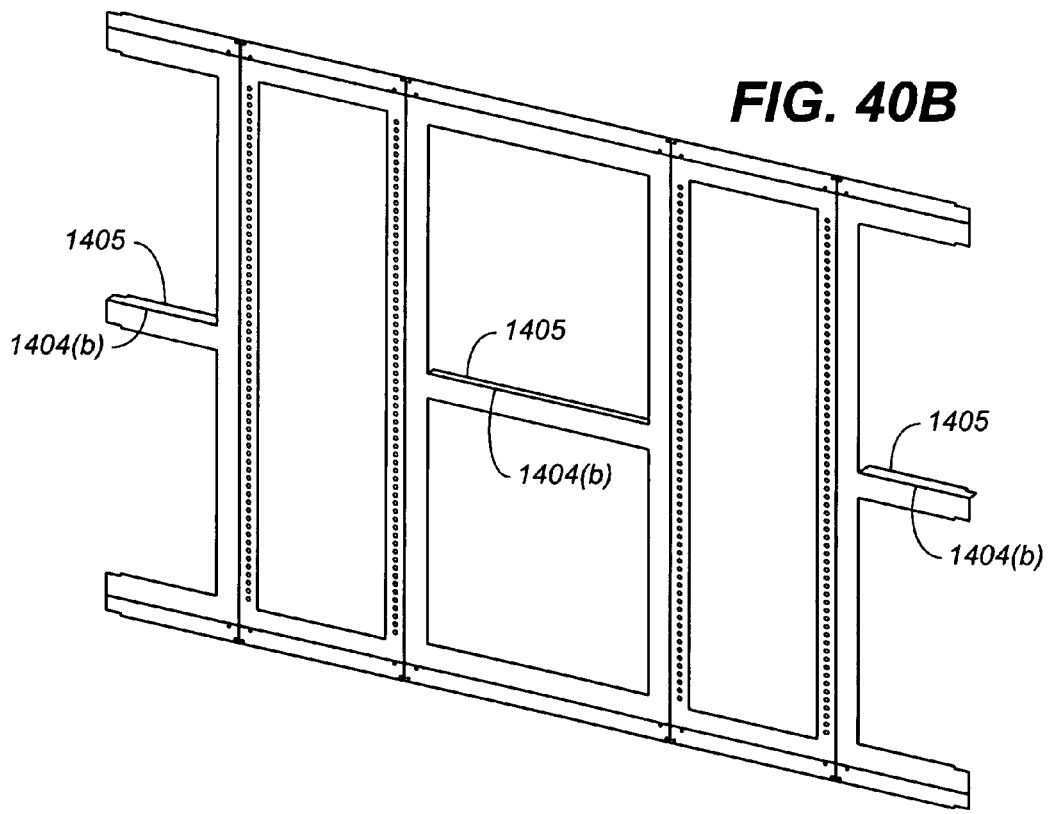
Figure 40C:
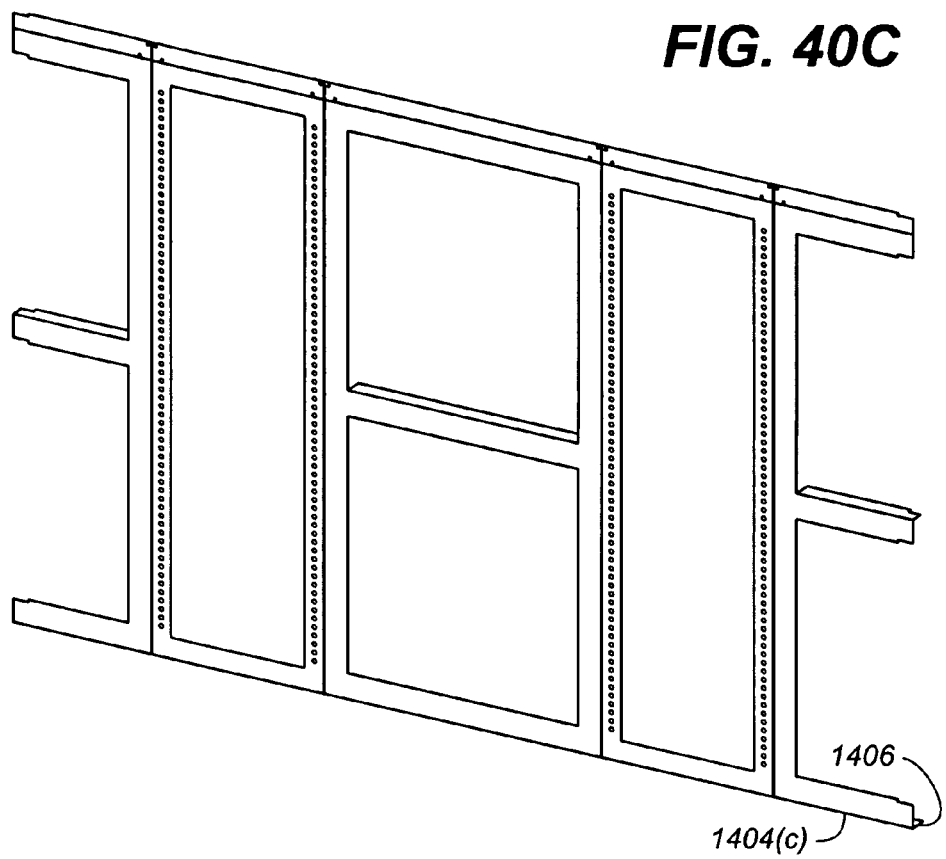
Figure 40D:
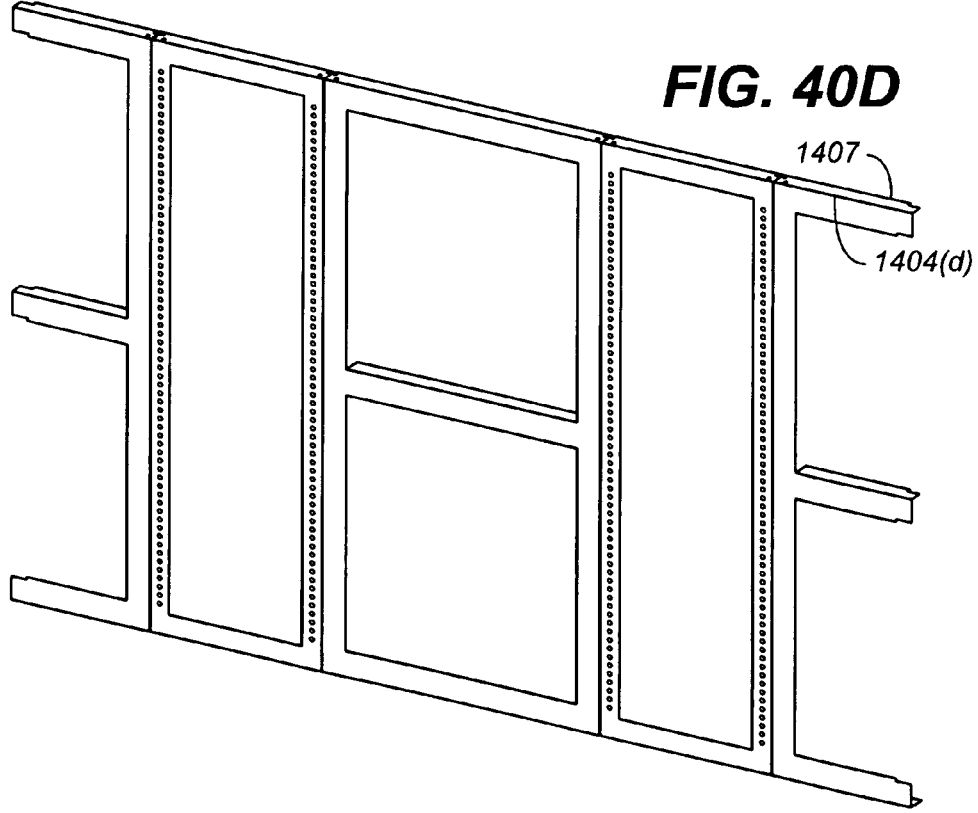
Figure 40E:
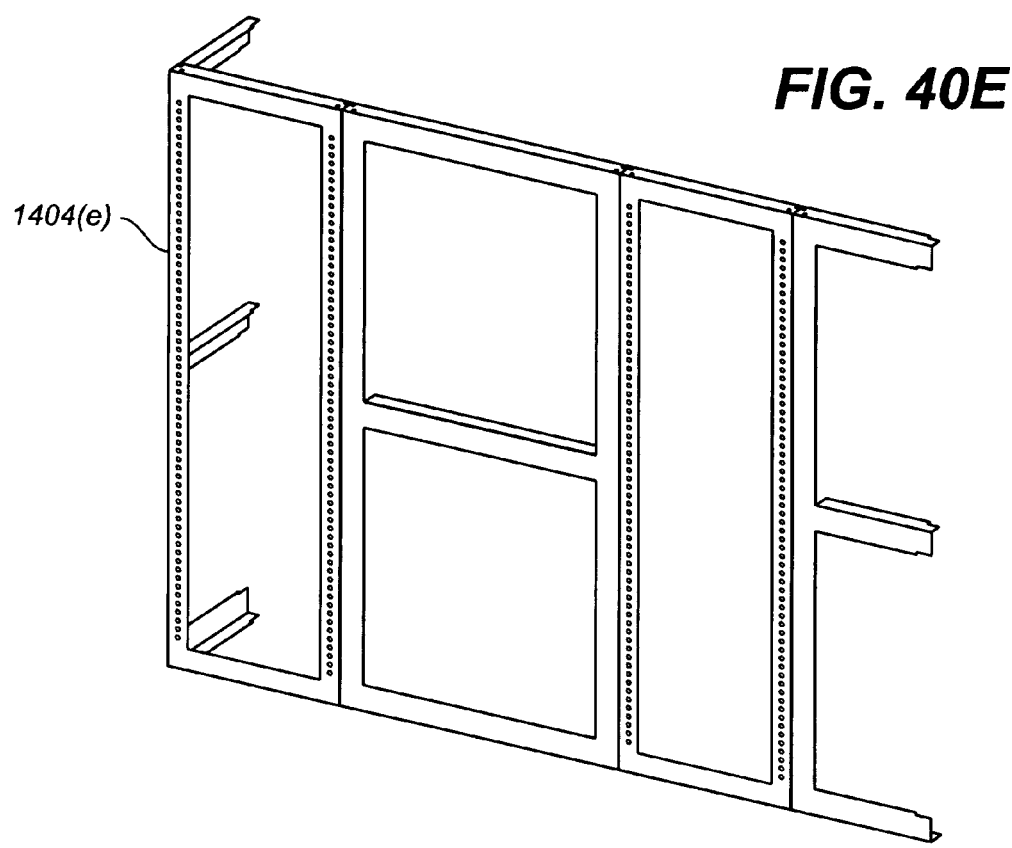
Figure 40F:
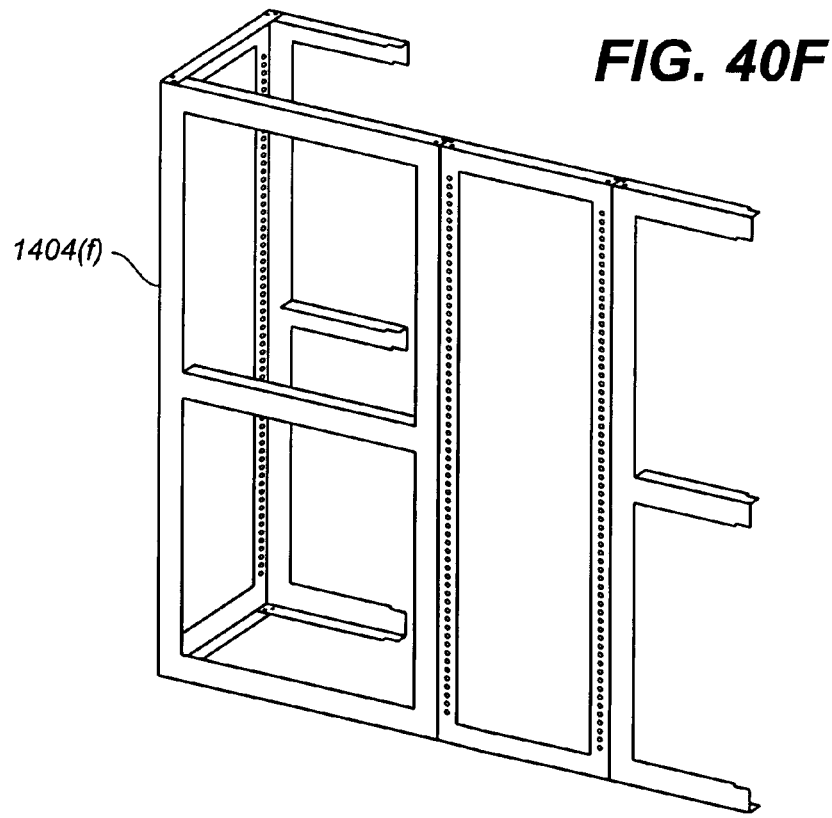

FIG. 40B-FIG. 40H illustrate one embodiment of a folding sequence. In FIG. 40B, folded portions 1405 are bent along bend lines 1404($b$) to form a member with an "L" cross section. Likewise, FIG. 40C-FIG. 40D show folded portions 1406-1407 bent along bend lines 1404($c$)-($d$), respectively. As a result, members with "L" shaped cross sections are on top, bottom and middle portions of sheet 1400. Continuing the sequence, the two-dimensional sheet is formed into a three-dimensional skeletal structure by folding along bend lines 1404($e$)-($h$), as in FIG. 40E-FIG. 40H. In each of these steps, attachment tabs 1402 extend one over another in an interleaved manner such that fastener receiving openings 1403 (see FIG. 40A) in the attachment tabs line up. Once aligned, fasteners introduced into the fastener receiving openings and clasps 1408 secure this embodiment of a skeletal framework against unfolding. Many alternatives for securing such a structure are possible and can be utilized in accordance with the present invention.

According to a broad aspect of the principles described here, form may follow function in that the form and attendant rigidity of a folded single sheet may be tailored to intended use. For example, in the embodiment shown in FIG. 40A-FIG. 40H, cross sections of the members of the framework are "L" shaped. In other embodiments, framework members have differing cross sections including, but not limited to, "C" shaped, triangular-shaped and box-shaped cross sections, as well as differing attendant bending and torsional rigidities, all according to intended use.

FIG. 41 shows a corner portion of an embodiment of a skeletal framework, which is similar to the embodiment shown in FIG. 40A-FIG. 40H. The embodiment in FIG. 41, however, includes members having different bending and torsional rigidities by virtue of different cross section geometry. FIG. 41 also shows a folding sequence a)-e) for the corner portion.

FIG. 41 shows "L" shaped cross section portions 1411, channel cross section portion 1412, bend lines 1413 and 1413($b$)-($e$), channel wall 1415, attachment tab 1416, surface slot 1414, sheet surface 1419, and edge slot 1417. In FIG. 41, bend strap-defining structures lay along the bend lines, but are omitted for clarity and instead schematically shown as centerlines extending along the fold lines. See above for details as to bend strap-defining structures.

In FIG. 41, "L" cross section portions 1411 result from bending along one bend line, and are like "L" cross section portions in the embodiment shown in FIG. 40. In contrast, the embodiment of FIG. 41 includes channel cross section 1413 folded upon sheet surface 1419 by bending along several bend lines. The result, as shown, is a closed box beam, which has different bending and torsional rigidity than "L" cross section portions. Including such box beams as cross members is advantageous in supporting heavy transverse loads, for example in an equipment rack. Alternate cross section shapes, such as polygons, can be utilized in accordance with the present invention.

FIG. 41$a$)-$e$) illustrates a folding sequence that is similar to the folding sequence in FIG. 40A-H. In FIG. 41$a$), sheet 1419 is flat. Folding along bend lines 1413($b$)-($c$) according to FIG. 41$b$)-$c$) results in formation of channel cross section portion 1412. In the particular embodiment shown, portions of channel wall 1415 are formed and dimensioned to include edge slots 1417, which mate as shown with corresponding surface slots 1414. Once mated, a fastener such as, for example, a rivet may by introduced into both slots to increase the structure's rigidity. See FIG. 42A-FIG.42C for more detail.

FIG. 41$c$)-$d$) shows another aspect of securing portions of a skeletal structure to increase the structure's rigidity. Attachment tab 1416, once bent into position along bend line 1413, couples one "L" cross section portion 1411 to channel cross section portion 1412 with a fastener such as a screw (not shown). As with attachment tabs like those shown in FIG. 40, this coupling contributes to tying the entire skeletal structure together, thereby distributing loads and increasing the structure's rigidity. As in FIG. 40, contact between attachment tabs and other portions of the structure is sheet surface to sheet surface with a fastener therethrough. One will appreciate that numerous other overlapped sheet portions may be fastened in a like manner.

FIG. 42A-FIG. 42C show details of a corner portion of the skeletal framework embodiment in FIG. 41$b$). FIG. 42A shows channel wall 1415, sheet surface 1419, bending line 1413($b$), surface slot 1414, edge slot 1417, edge slot walls 1420, and nubs 1421. FIG. 42B-FIG. 42C show details around the edge slot region for two embodiments. As in FIG. 42A, FIG. 42B-FIG. 42C show edge slot 1417, edge slot walls 1420, and nubs 1421. In addition, FIG. 42B shows shoulder regions 1422 of the edge slot walls, and FIG. 42C shows flare regions 1423 of the edge slot walls.

As described above, folding to the position shown in FIG. 41$c$) from that shown in FIG. 41$b$) and FIG. 42A involves nubs 1421 engaging and passing through corresponding surface slots 1414. Once mated and aligned, a fastener such a rivet or a screw (not shown) may be placed into the mated surface and edge slots to engage portions of slot walls 1420 in differing manners according to different embodiments. Coupled in accordance with the present invention in any number of manners, the resulting structure is comparatively more rigid.

FIG. 42B and FIG. 42C illustrate two examples. FIG. 42B shows an embodiment including shoulder regions 1422 of edge slot walls 1420. The shoulder regions are located at a base portion of edge slot 1417 and provide a land for the purpose of receiving and engaging a fastener edge (not shown), for example a rivet edge. FIG. 42C shows an alternate embodiment including flare regions 1423 of edge slot walls 1420. The flare regions of the slot walls are located at a base portion of edge slot 1417 and provide a flared surface to receive a fastener such as a screw (not shown). Applying torque to the screw results in screw threads engaging slot walls 1420 along the length of edge slot 1417. In most embodiments, tapping threads in the slot wall prior to fastening is not necessary because channel wall 1415 is thin.

Figure 43A:
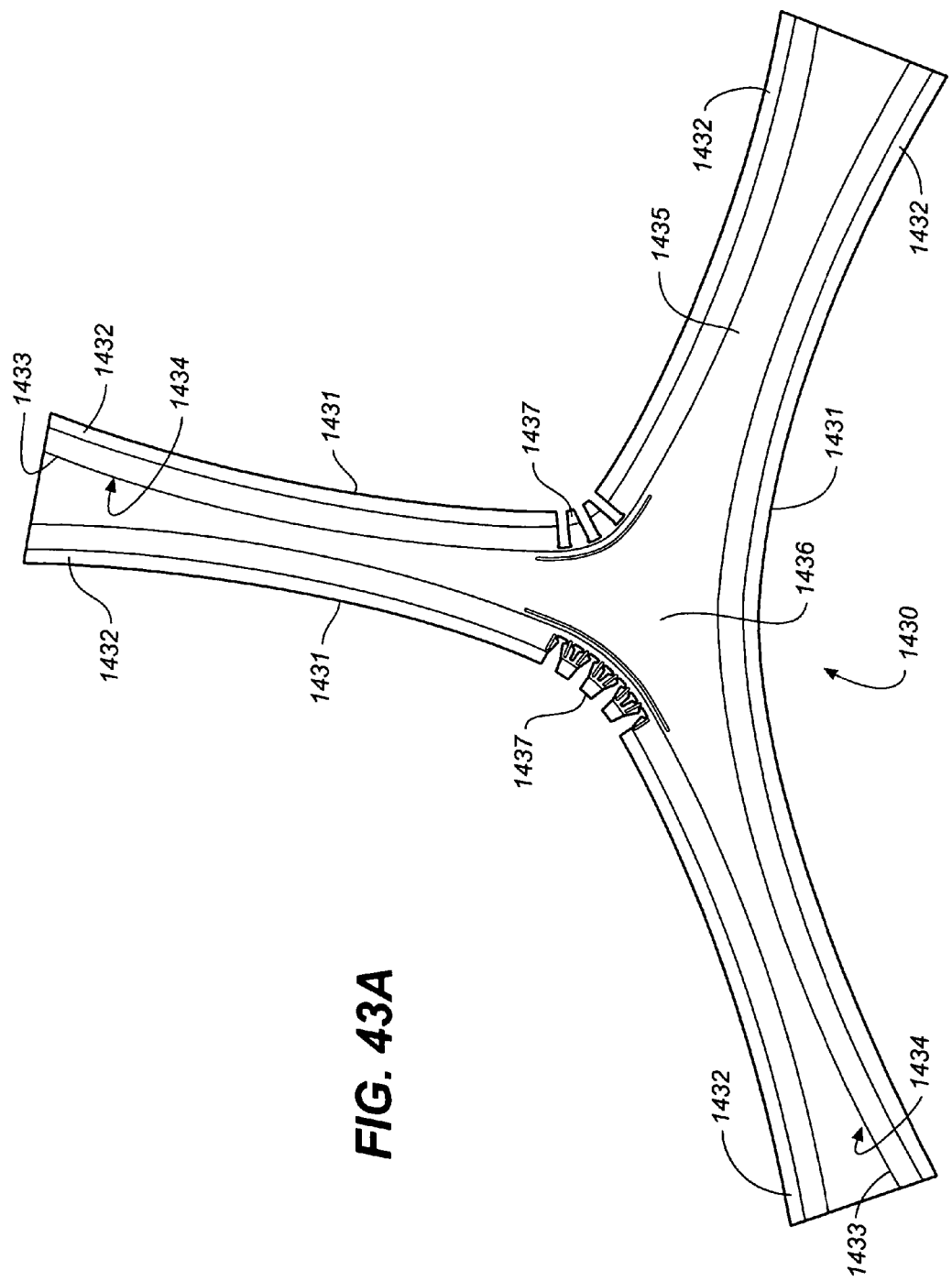
FIG. 43A is a top view of a sheet of material constructed in accordance with the present invention before being formed into a curved exoskeletal structure.
Figure 43B:
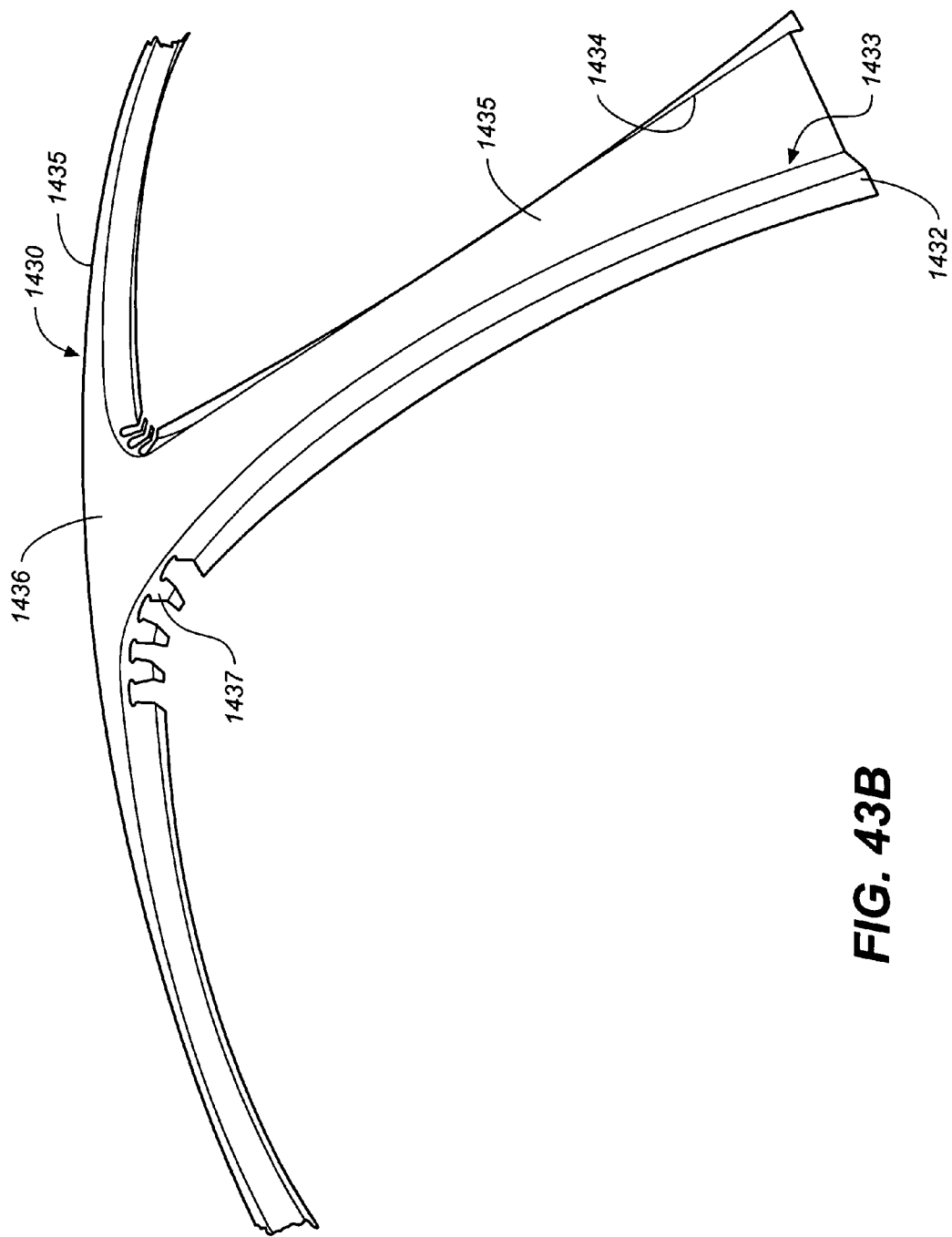
FIG. 43B is a perspective view of a sheet of material as shown in FIG. 43A after being formed into a curved exoskeletal structure.

FIG. 40-FIG. 42C illustrate framework embodiments that include linear structural members, however, one will appreciate that curved structural members may by used. Other embodiments include a framework of curved structural members formed from a single sheet. In one example, FIG. 43A-FIG. 43C show an embodiment with three curved channels. In other examples, such channels may be secured to a second sheet of material to form a hollow closed structure, as described above. Further, such hollow structures may be filled with a stiffening filler material, which is also described above.

FIG. 43A and FIG. 43B, respectively, show a sheet of material before and after folding to become an exoskeletal framework of three-dimensional curved channels. Both figures show sheet 1430, sheet periphery 143 1, flanges 1432, bend curves 1433, bending strap-defining structures 1434, channels 1435, nexus region 1436, and finger tabs 1437. FIG. 43A shows the sheet after formation of the bending strap-defining structures in the sheet. FIG. 43B, by comparison, shows the three-dimensional curved channel after bending the sheet along the bend lines. Details of the bending strap-defining structures, however, are omitted in both figures for clarity.

As shown in FIG. 43B, channels 1435 are curved and extend out of the original plane of sheet 1430 after bending along the bend curves at least partially due to the curvature of the bend lines. As shown, the deformation out of the original plane is profound in this embodiment. Alternate embodiments may deform to a greater or lesser degree depending on material properties, layouts of bend curves or pressing or forming unrelated to bending along bend curves. Also, while the embodiment in FIG. 43A-FIG. 43B has channels with converging-diverging cross sections, other embodiments have converging channels, or a combination of converging channels and converging-diverging channels. One will appreciate that various geometries may be used in accordance with the present invention.

FIG. 43C shows details of a central region of the exoskeletal framework in FIG. 43B. Like FIG. 43A and FIG. 43B, FIG. 43C shows sheet 1430, sheet periphery 143 1, flanges 1432, bend curves 1433, bending strap-defining structures 1434, channels 1435, nexus region 1436, and finger tabs 1437. In addition, FIG. 43C shows stiffening ribs 1438, finger tab opening 1439, and curved finger tab portion 1440. As before, details of the bending strap-defining structures are omitted for clarity.

In FIG. 43C, portions of sheet 1430 have been removed to form finger tabs 1437. The finger tabs enable the framework to accommodate sheet deformation, especially deformation out of the original plane of the sheet. That is, the plane of the sheet prior to bending (see FIG. 43A). Accordingly, the finger tabs are preferably located adjacent to relatively high curvature portions of bend lines 1433. In the embodiment of FIG. 43C, the greatest deformation is proximal to nexus region 1436. Accordingly, finger tabs 1437 are proximal to the nexus region. Other embodiments, however, may include finger tabs at different or additional locations, depending on the desired deformation.

Nexus region 1436 takes a range of shapes in differing embodiments of skeletal frameworks. As compared to the nexus region in FIG. 43A, other embodiments have a more elliptical or circular nexus region. Still other embodiments have a nexus region that is more polygonal than that of the embodiment in FIG. 43A. In yet another range of embodiments, the nexus region is a hub-like, separable, discrete piece. With a hub-like nexus region, the hub-like piece is formed and dimensioned to receive structural members such as beams or channels. The structural members may be attached to the hub as described above, or in numerous ways that are in accordance with the invention.

As described, embodiments of a skeletal framework may be highly curved. In some embodiments, any one or more than one of finger tabs 1437 include curved portion 1440 at a distal end. Such a curved portion is advantageous for some embodiments because it better accommodates securing to another curved piece; for example when forming a hollow closed structure as described in detail above. With a curved portion, the distal ends of finger tabs may follow the same or similar curvature as flange 1432 when the framework structure extends out of the original plane of sheet 1430. See FIG. 43A-FIG. 43B. Without such a curved portion, the distal ends of finger tabs are flat; which may or may not be adequate for securing the finger tab to another piece, depending on the degree of curvature of the overall skeletal framework.

In some embodiments, one or more than one of the finger tabs 1437 are stamped. Stamping may form curved portion 1440, as well turn distal ends of a finger tab out of the original plane of sheet 1430. In stamping the sheet in and around nexus (or hub) region 1436, with respect to finger tabs 1437 or otherwise, progressive dies may be utilized.

The embodiment of FIG. 43C also includes stiffening ribs 1438. Preferably, ribs are stamped into sheet 1430 with the effect of stiffening the sheet by altering the local cross section geometry. In an alternative, material may be added to the sheet to form a stiffening rib.

In different embodiments, stiffening ribs may be located along bend lines 1433 and/or along finger tabs 1437. The embodiment in FIG. 43C shows a stiffening rib proximate to a bend line 1433, and in substantial alignment with the bend line. In this instance, a stiffening rib is advantageous because of the comparatively high curvature of nexus region 1436. Without stiffening, the sheet may buckle.

Likewise, FIG. 43C shows stiffening ribs located proximal to and within finger tabs 1437. Within a finger tab, stiffening ribs are preferably constructed in pairs oriented such that respective longitudinal axes of the stiffening ribs intersect at or beyond a distal end of the finger tab. As FIG. 43C suggests, such orientation has the effect of forming miniature columns within the finger tab, which experience shows to be advantageous for transferring stress without buckling. Further, the embodiment in FIG. 43C includes an opening in between two stiffening ribs in finger tabs, which is believed to be advantageous in forming a column-like structure in the finger tab. Other embodiments include finger tabs having stiffening structures such as flanges on all or a portion of the finger tab periphery. Such openings and stiffening ribs within a finger tab, or peripheral flanges, however, are not essential.

Figure 44:
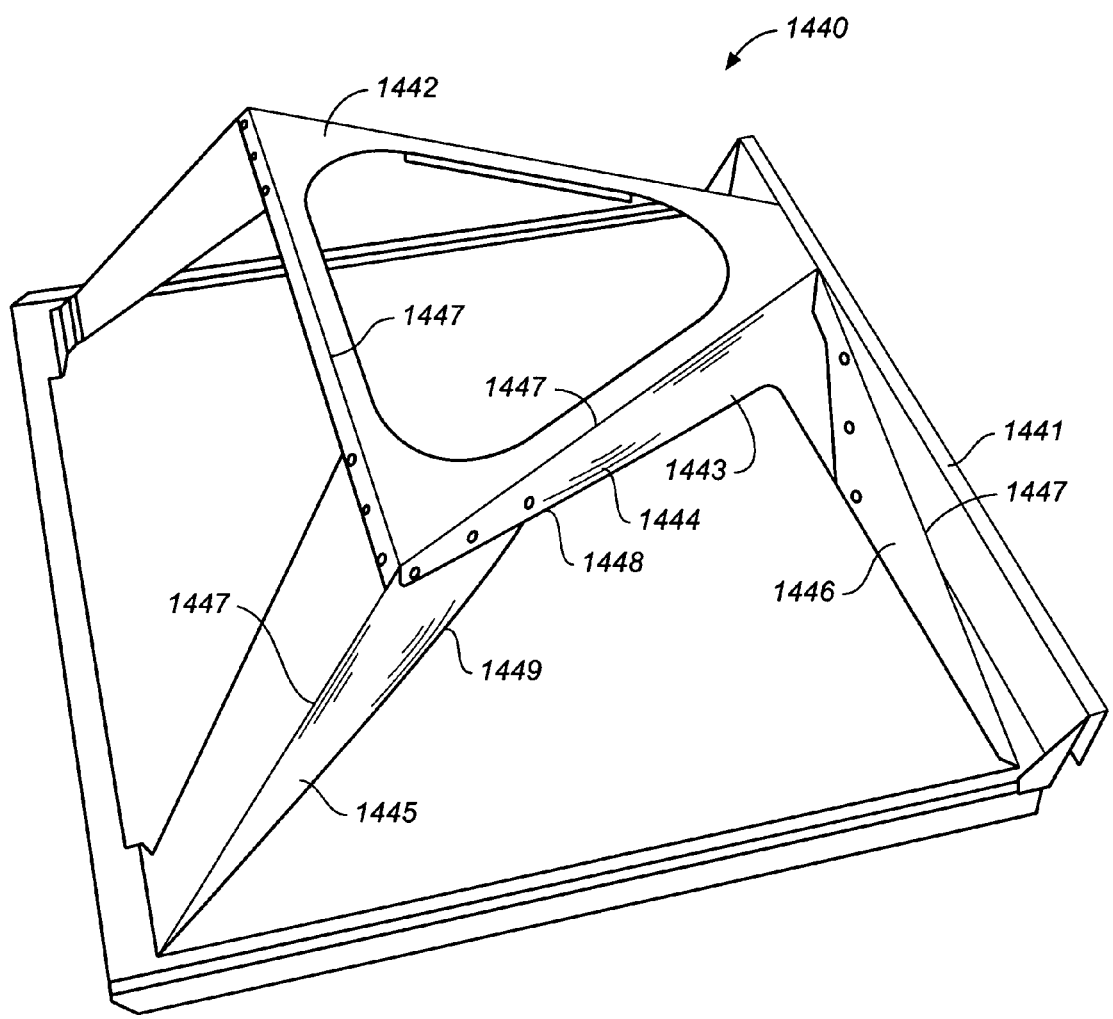
FIG. 44 is a perspective view of another sheet of material formed into a three dimensional structure in accordance with the present invention.

Turning now to FIG. 44, a three-dimensional skeletal framework 1440 is illustrated which is also formed by flat sheets of material. Skeletal framework 1440 is in the form of a stand that includes a base 1441 and a top 1442. Both the base and the top are formed from flat sheets of material that has been provided with bend lines in a manner similar to that discussed above. In some instances, it may be possible to form the top from the same sheet of material from which the base is formed. Once the base and the sheet have been bent along their bend lines to form three-dimension structures, they are assembled together to form the illustrated framework 1440. During assembly, the base and top are affixed by suitable fasteners such as rivets, screws, nuts-and-bolts, adhesives, and/or other suitable means.

In this embodiment, the sheet material(s) are configured to allow for and to accommodate the warping of planar panels upon assembly of the top and base. For example, top 1442 is formed form a flat sheet of material populated with bend lines in a manner that is discussed above. According, all portions of the top are originally planar. For example, panel 1443 is originally a planar panel prior to assembly. During assembly, panel 1443 develops an area of warpage 1444 once its ends are affixed to upper ends of legs 1445 and 1445, as can be seen in FIG. 44. In particular, the panel 1443 warps such that its leftmost surfaces conform with the uppermost surfaces of leg 1445, while its rightmost surfaces conform with the uppermost surfaces of leg 1446. As legs 1445 and 1446 are skewed with respect to one another, the surface of panel 1443 warps in order to accommodate the non-planar surfaces of legs 1445 and 1446. With reference to FIG. 44, panel 1443 warps significantly in area 1444, however, one will appreciate that the panel may also warp, in varying degrees outside of area 1444. On will appreciate that legs 1445 and 1445 may also warp in a similar manner in varying amounts.

The configuration of framework 1440 utilizes the relatively thin-wall properties of sheet materials to allow for warpage, and thus allow for a wide variety of designs having complex geometries. While bend lines 1447 are substantially linear, once base 1441 and top 1442 are bent along their respective bend lines and assembled, base 1441 and top 1442 include panels having complex geometries with compound-curved surfaces and edges. For example, edges 1448 and 1449 trace skew curves, that is, curves which do not lie in one plane. One will appreciate that such a "warping" configuration may be utilized for a wide variety of three-dimensional structures and a wide variety of geometrical shapes.

The distribution and width of bending straps may vary along the length of a given bend-line for a variety of reasons including a variation in the trade-off between the local force required for bending and the residual strength of the un-reinforced bend. For example, adjacent features that may be opportunistically formed at the same time as the bending straps of the present invention may approach the bend-line so closely that the nearest bending straps are best formed with less frequency near the approaching feature or with thinner straps to maintain planarity of the bent material.

Finally, the bent structures of the present invention can be easily unbent. This allows three-dimensional structures to be disassembled or unfabricated for transport to another site or for recycling of the sheet material. It has been found that the bent sheet material can often be straightened out, or even subject to a bend reversal, and thereafter re-bent through 5 to 10 or more cycles. This allows bending or fabrication of a structure at one site and then unbending, transportation and re-bending at a second site. The ease of unbending also enables structures to be unbent and sent to a recycling center for reuse of the sheet material and removed components.

For convenience in explanation and accurate definition in the appended claims, the terms "up" or "upper", "down" or "lower", "inside" and "outside" are used to describe features of the present invention with reference to the positions of such features as displayed in the figures.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A thee-dimensional structure comprising:
   a sheet of material having a plurality of bending strap-defining structures formed therein, the strap-defining structures being positioned to define a plurality of bending lines, each bending line having adjacent strap-defining structures defining a bending strap having a longitudinal strap axis oriented and positioned to extend across the bend line, and the strap-defining structures being configured and positioned to produce bending of the sheet of material along the bend lines;
   a first portion having a monolithically-formed first fastening structure, at least one of the bending lines, and a substantially planar surface; and
   a second portion fastened to the first portion, the second portion having a monolithically-formed second fastening structure, at least one of the bending lines, and a substantially planar surface, the second planar surface being skewed relative to the first planar surface;
   wherein the first fastening structure is aligned with said second fastening structure, at least one of the first portion and said second portion includes an area of warpage caused by alignment of said first and second fastening structures.

2. The structure as defined in claim 1, wherein at least one bend line is having a linear portion.

3. The structure as defined in claim 1 wherein,
   at least a portion of a periphery of the sheet is curved.

4. The structure as defined in claim 1 wherein,
   the strap-defining structures are slits formed to extend though the sheet of material.

5. The structure as defined in claim 4 wherein,
   the slits have a kerf dimension and jog distance causing edge-to-face engagement of the sheet of material on opposite sides of the slits during bending of the sheet of material.

6. The structure as defined in claim 1 wherein,
   the strap-defining structures are grooves formed to a depth not extending through the sheet of material.

7. The structure as defined in claim 1 wherein,
   a plurality of the bend lines are configured and dimensioned to form an exoskeletal structure to provide structural integrity of the three-dimensional structure.

8. The structure as defined in claim 7 wherein,
   the exoskeletal structure is a chassis having a component-receiving opening dimensioned and configured to support a component.

9. The structure as defined in claim 1 wherein,
   a plurality of bend lines are positioned such that the structural elements are configured and dimensioned to form a channel.

10. The structure as defined in claim 1 wherein,
    at least one bend line is configured and dimensioned to form an open structure.

11. The structure as defined in claim 10 wherein,
    the open structure formed has an L-shaped cross section from bending along one bend line.

12. The structure as defined in claim 10 wherein,
    the open structure has a channel-shaped cross section from bending along two bend lines.

13. The structure as defined in claim 10 wherein,
    the plurality of bend lines are configured and dimensioned to form a channel.

14. The structure as defined in claim 1 wherein,
a plurality of bend lines are configured and dimensioned to form a hollow open structure.

15. The structure as defined in claim 1 wherein,
the plurality of bend lines are configured and dimensioned to form a warped beam.

16. The structure as defined in claim 15 wherein,
the three-dimensional structure is a skeletal framework.

17. The structure as defined in claim 16 wherein,
the skeletal framework is a chassis and the beam is configured to support a load.

18. The structure as defined in claim 1, wherein the first portion is connected to the second portion by an intermediate portion, the intermediate portion further including an area of warpage.

19. The structure as defined in claim 1, wherein the first fastening structure is a fastener-receiving structure.

20. The structure as defined in claim 19, wherein the first fastening structure is an opening.

21. The structure as defined in claim 20, wherein the second fastening structure is a tab.

22. The structure as defined in claim 1, wherein the sheet of material is selected such that the warpage occurs substantially within the thin-wall properties of the sheet material.

23. The structure as defined in claim 1, wherein the strap-defining structures are slits formed to extend partially through the sheet of material.

24. The structure as defined in claim 23, wherein the slits are positioned on opposite sides of and proximate the bend line.

25. A method of forming a three-dimensional article from a two-dimensional sheet of material, the method comprising:
providing a sheet of material having a plurality of bending strap-defining structures formed therein, the strap-defining structures being positioned to define a plurality of bending lines, each bending line having adjacent strap-defining structures defining a bending strap having a longitudinal strap axis oriented and positioned to extend across the bend line, and the strap-defining structures being configured and positioned to produce bending of the sheet of material along the bend lines, the sheet of material further including:
a first portion having at least one of the bending lines, a first fastening structure, and a substantially planar surface; and
a second portion having at least one of the bending lines, a second fastening structure, and a substantially planar surface;
bending the sheet of material along the bend lines such that the first planar surface is skewed relative to the second planar surface;
aligning the first fastening structure with the second fastening structure; and
connecting the first planar surface to the second planar surface by affixing the first fastening structure with respect to the second fastening structure,
wherein at least one of the first planar surface and second planar surface develops an area of warpage during the aligning or the connecting caused by alignment of said first and second fastening structures.

26. The method as defined in claim 25, further including the step of:
providing an intermediate portion, wherein the first portion is connected to the second portion by the intermediate portion and the intermediate portion includes the area of warpage.

27. The method as defined in claim 25, wherein the strap-defining structures are slits extending in a thickness direction of the sheet of material.

28. The method as defined in claim 25, wherein the strap-defining structures are grooves formed to a depth not extending through the sheet of material.

* * * * *